(12) United States Patent
Jauvin et al.

(10) Patent No.: US 12,172,087 B2
(45) Date of Patent: Dec. 24, 2024

(54) SYSTEMS AND METHODS FOR IMPROVED PLAYER INTERACTION USING AUGMENTED REALITY

(71) Applicant: SQUARE ENIX LIMITED, London (GB)

(72) Inventors: Étienne Jauvin, Québec (CA); Dominique Ferland, Québec (CA); Nathalie Gauthier, Québec (CA)

(73) Assignee: SQUARE ENIX LIMITED, London (GB)

( * ) Notice: Subject to any disclaimer, the term of this patent is extended or adjusted under 35 U.S.C. 154(b) by 245 days.

(21) Appl. No.: 17/778,325

(22) PCT Filed: Nov. 25, 2020

(86) PCT No.: PCT/CA2020/051604
§ 371 (c)(1),
(2) Date: May 19, 2022

(87) PCT Pub. No.: WO2021/102566
PCT Pub. Date: Jun. 3, 2021

(65) Prior Publication Data
US 2023/0030260 A1      Feb. 2, 2023

Related U.S. Application Data

(60) Provisional application No. 62/939,889, filed on Nov. 25, 2019.

(51) Int. Cl.
*A63F 13/825*     (2014.01)
*A63F 13/53*      (2014.01)
*A63F 13/56*      (2014.01)
*A63F 13/65*      (2014.01)

(52) U.S. Cl.
CPC ............ *A63F 13/825* (2014.09); *A63F 13/53* (2014.09); *A63F 13/56* (2014.09); *A63F 13/65* (2014.09);
(Continued)

(58) Field of Classification Search
CPC ........ A63F 13/825; A63F 13/53; A63F 13/56; A63F 13/65; A63F 2300/303; A63F 2300/6607; A63F 2300/69
See application file for complete search history.

(56) References Cited

U.S. PATENT DOCUMENTS

| | | | | |
|---|---|---|---|---|
| 8,401,343 | B2 * | 3/2013 | Braun | A63F 13/655 705/7.27 |
| 2008/0200253 | A1 * | 8/2008 | Van Luchene | G07F 17/3232 463/42 |

(Continued)

FOREIGN PATENT DOCUMENTS

WO     2018/139906     8/2018

OTHER PUBLICATIONS

International Search Report (ISR) from International Searching Authority (Canadian Intellectual Property Office) in International Pat. Appl. No. PCT/CA2020/051604, dated Feb. 11, 2021.
(Continued)

*Primary Examiner* — David L Lewis
*Assistant Examiner* — Matthew D Hoel
(74) *Attorney, Agent, or Firm* — GREENBLUM & BERNSTEIN, P.L.C.

(57) ABSTRACT

A computer-implemented method, gaming device and computer-readable medium for an Augmented Reality (AR) application. The method includes maintaining an AR gaming environment during a gaming session. The method also includes receiving image data representing a real-world scene including one or more real-world objects. The method
(Continued)

also includes detecting in the image data at least one real-world object from a set of detectable real-world objects. The method further includes upon detection of the at least one real-world object in the image data, generating at least one virtual character in the AR gaming environment, the at least one virtual character having an association with the at least one real-world object.

26 Claims, 42 Drawing Sheets

(52) U.S. Cl.
CPC . *A63F 2300/303* (2013.01); *A63F 2300/6607* (2013.01); *A63F 2300/69* (2013.01)

(56) References Cited

U.S. PATENT DOCUMENTS

| | | | | |
|---|---|---|---|---|
| 2012/0244939 | A1* | 9/2012 | Braun | A63F 13/213 |
| | | | | 463/31 |
| 2016/0189397 | A1* | 6/2016 | Mullins | G06T 7/90 |
| | | | | 345/633 |
| 2018/0165977 | A1* | 6/2018 | Johansen | G09B 5/02 |
| 2018/0214767 | A1 | 8/2018 | Oh | |
| 2019/0099678 | A1 | 4/2019 | Khan et al. | |
| 2020/0086219 | A1 | 3/2020 | Shim et al. | |
| 2020/0376369 | A1* | 12/2020 | Reddan | G10L 15/1815 |

OTHER PUBLICATIONS

Written Opinion (WO) from International Searching Authority (Canadian Intellectual Property Office) in International Pat. Appl. No. PCT/CA2020/051604, dated Feb. 11, 2021.

International Preliminary Report on Patentability issued in connection with PCT Application No. PCT/CA2020/051604 on May 17, 2022.

Examiner's Report issued in connection with CA Patent Application No. 3,154,868 on Apr. 3, 2023.

Examiner's Report issued in connection with CA Patent Application No. 3,154,868 on Feb. 9, 2024.

* cited by examiner

| 1101 | 1103 | 1105 | 1107 | 1109 | 1111 | 1113 | 1115 1100 |
|---|---|---|---|---|---|---|---|
| Object Name | Currently Part of set of detectable real-world objects 58 | Object Family 501$_x$ | RW_Object Label 60$_x$ | Object Status | RW_ObjectID | Degree of Confidence 800 [%] | Virtual Object Generated |
| Spoon | Yes | 501$_1$ | Spoon | Detected | 302_1 | 60 | Yes |
| Whisk | Yes | 501$_1$ | Whisk | Detected | 303_1 | 70 | Yes |
| Bowl | Yes | 501$_1$ | Bowl | Undetectable | | | No |
| Spatula | Yes | 501$_1$ | Spatula | Undetectable | | | No |
| Remote Control | Yes | 501$_2$ | Remote Control | Detected | 302_2 | 89 | Yes |
| Loveseat | Yes | 501$_2$ | Loveseat | Detected | | 73 | No |
| Television | Yes | 501$_2$ | Television | Detected | | 92 | No |
| Coffee Table | Yes | 501$_2$ | Coffee Table | Detected | | 65 | No |
| Candle | No | 501$_3$ | | Undetectable | | | No |
| Shed | No | 501$_3$ | | Undetectable | | | No |
| Hose | No | 501$_4$ | | Undetectable | | | No |
| Cart | No | 501$_4$ | | Undetectable | | | No |
| Can | No | 501$_5$ | | | | | |
| Stapler | Yes | 501$_5$ | Stapler | Detected | 302_5 | 88 | No |
| Pencil | Yes | 501$_5$ | | Not Detected | | | No |
| ... | ... | ... | ... | ... | ... | ... | ... |

FIG. 11

| Name/ V_Object ID 1201 | Spark Family $700_x$ 1203 | Candidate Associated Real-World Object Labels $42_x$ 1205 | Character Data 37 1207 | Candidate Characteristics 56 1209 | Virtual Object Stauts 1211 |
|---|---|---|---|---|---|
| 502_1 | $701_1$ | | | | Generated |
| 503_1 | $701_1$ | | | | Generated |
| 504_1 | $701_1$ | | | | Generated |
| 305_1 | $701_1$ | | | | Generated |
| 502_2 | $701_2$ | | | | Generated |
| 503_2 | $701_2$ | | | | Not Generated |
| 504_2 | $701_2$ | | | | Not Generated |
| 505_2 | $701_2$ | | | | Not Generated |
| 506_2 | $701_2$ | | | | Not Generated |
| 502_3 | $701_3$ | | | | Locked |
| 503_3 | $701_3$ | | | | Locked |
| 502_4 | $701_4$ | | | | Locked |
| 503_4 | $701_4$ | | | | Locked |

| 1301 V_Object ID | 1303 RW_Object ID | 1305 RW_Object Label | 1307 Object Family 501$_x$ | 1309 Spark Family 700$_x$ | 1311 Value | 1313 Player ID | 1315 Time Generated (t=t$_{gen}$) | 1317 Spatial coordinates of RW_Object at (t=t$_{gen}$) |
|---|---|---|---|---|---|---|---|---|
| 502_1 | 302_1 | Spoon | 501$_1$ | 701$_1$ | 75 | 600_1 | T=10s | $x_i, y_i, z_i$ |
| 503_1 | 303_1 | Whisk | 501$_1$ | 701$_1$ | 50 | 600_2 | T=77s | $x_i, y_i, z_i$ |
| 502_2 | 302_2 | Remote | 501$_2$ | 701$_2$ | 20 | 600_1 | T=606s | $(XYZ)_{102}$ |
| 502$_5$ | 302_5 | Stapler | 501$_5$ | 701$_5$ | 33 | 600_1 | T=78s | $x_i, y_i, z_i$ |
| ... | ... | ... | ... | ... | ... | ... | ... | ... |

| 1319 Location of real-world object at (t=t$_{gen}$) | 1321 Location of the player at (t=t$_{det}$) | 1323 Distance of real-world object to player at (t=t$_{gen}$) | 1325 Current Spatial coordinates of RW_Object | 1327 Current Location of V_Object (location of anchor) |
|---|---|---|---|---|
| $x_i, y_i, z_i$ | $x_i, y_i, z_i$ | | $x_i, y_i, z_i$ | $x_i, y_i, z_i$ |
| $x_i, y_i, z_i$ | $x_i, y_i, z_i$ | | $x_i, y_i, z_i$ | $x_i, y_i, z_i$ |
| $x_i, y_i, z_i$ | $x_i, y_i, z_i$ | | $(XYZ)_{102}$ | $x_i, y_i, z_i$ |
| $x_i, y_i, z_i$ | $x_i, y_i, z_i$ | | $x_i, y_i, z_i$ | $x_i, y_i, z_i$ |
| ... | ... | ... | ... | ... |

FIG. 13

SYSTEMS AND METHODS FOR IMPROVED PLAYER INTERACTION USING AUGMENTED REALITY

CROSS-REFERENCE TO RELATED APPLICATIONS APPLICATION

This application is a National Stage of international PCT Patent Application No. PCT/CA2020/051604 filed on Nov. 25, 2020, which claims the benefit of U.S. Provisional Patent Application Ser. No. 62/939,889, filed on Nov. 25, 2019, and whose contents are incorporated by reference herein.

FIELD

The present application relates in general to computer games and, in particular, to interactive computer games that use augmented reality.

BACKGROUND

One of the main goals of a computer game is to deliver a rewarding gaming experience, characterized by high levels of player engagement and interest.

Augmented Reality (AR) refers to a technology that overlays computer-generated images of virtual objects onto images of the real-world obtained from a camera lens. For example, many applications exist whereby AR is employed by users to embellish images of real-world objects with computer-generated artistry. One such example is the AR filter provided within the Instagram™ and Snapchat™ applications.

The widespread use of mobile devices that incorporate positioning systems (e.g., Global Positioning System—GPS), digital compasses and accelerometers has led to a growth in the use of AR in mobile gaming. In particular, the use of AR in gaming allows players to view a juxtaposition of a virtual world (containing computer-generated images of virtual objects) and the real world (containing captured images of real-world objects). The use of AR in mobile gaming has evolved to include location-based apparition of virtual characters, with which the player then interacts as part of the underlying game strategy or plot. This has led to highly entertaining mobile games, generating significant revenue for the gaming industry ecosystem.

However, current mobile games that incorporate AR typically require the player to move to predefined locations that are resolvable by a positioning system. This can make the game cumbersome to play, particularly in a confined environment. Also, the outcome of the game depends more on the device being in a predetermined location and oriented in a certain way than on the visual content of the image. This leads to a high level of predictability which, over time, may make the game less entertaining to play.

It would therefore be of interest to the gaming industry to provide an AR-based mobile game that provides a greater range of possible experiences for players as a function of the visual content of their surrounding environment.

SUMMARY

According to various aspects, this disclosure relates to a method for execution by a processor of a computing system. The method comprises maintaining an Augmented Reality (AR) gaming environment during a gaming session and receiving image data representing a real-world scene including one or more real-world objects. The method also comprises detecting in the image data at least one real-world object from a set of detectable real-world objects and upon detection of the at least one real-world object in the image data, generating at least one virtual character in the AR gaming environment, the at least one virtual character having an association with the at least one real-world object.

In accordance with yet another aspect, this disclosure relates to a gaming device comprising at least one processor and a memory storing instructions for execution by the processor, at least one input device configured to receive input from a user, at least one output device configured for providing output to the user, the at least one processor configured to execute the instructions in the memory for implementing an interactive computer program that generates the output in response to the received input and, the interactive computer program including at least one process that comprises maintaining an Augmented Reality (AR) gaming environment during a gaming session and receiving image data representing a real-world scene including one or more real-world objects. The process also comprises detecting in the image data at least one real-world object from a set of detectable real-world objects. The process further comprises upon detection of the at least one real-world object in the image data, generating at least one virtual character in the AR gaming environment, the at least one virtual character having an association with the at least one real-world object.

In accordance with yet another aspect, this disclosure relates to a computer-readable storage medium comprising computer-readable instructions which, when read and executed by at least one processor of a gaming device, cause a gaming device to carry out a method in an interactive computer program that comprises maintaining an Augmented Reality (AR) gaming environment during a gaming session and receiving image data representing a real-world scene including one or more real-world objects. The method also comprises detecting in the image data at least one real-world object from a set of detectable real-world objects and upon detection of the at least one real-world object in the image data, generating at least one virtual character in the AR gaming environment, the at least one virtual character having an association with the at least one real-world object.

These and other aspects of this disclosure will now become apparent to those of ordinary skill in the art upon review of a description of embodiments in conjunction with accompanying drawings.

BRIEF DESCRIPTION OF THE DRAWINGS

For a more complete understanding of the present disclosure, reference is now made to the following description taken in conjunction with the accompanying drawings, in which:

FIG. 11 shows a table storing information regarding a set of detectable real-world objects, in accordance with a non-limiting embodiment;

FIG. 12 is a table storing information regarding virtual characters, in accordance with a non-limiting embodiment;

FIG. 13 is a table storing information regarding a connection between real-world objects and the virtual characters, in accordance with a non-limiting embodiment;

It is to be expressly understood that the description and drawings are only for purposes of illustrating certain embodiments and are an aid of understanding. They are not intended to and should not be limiting.

DESCRIPTION

Figure 7:
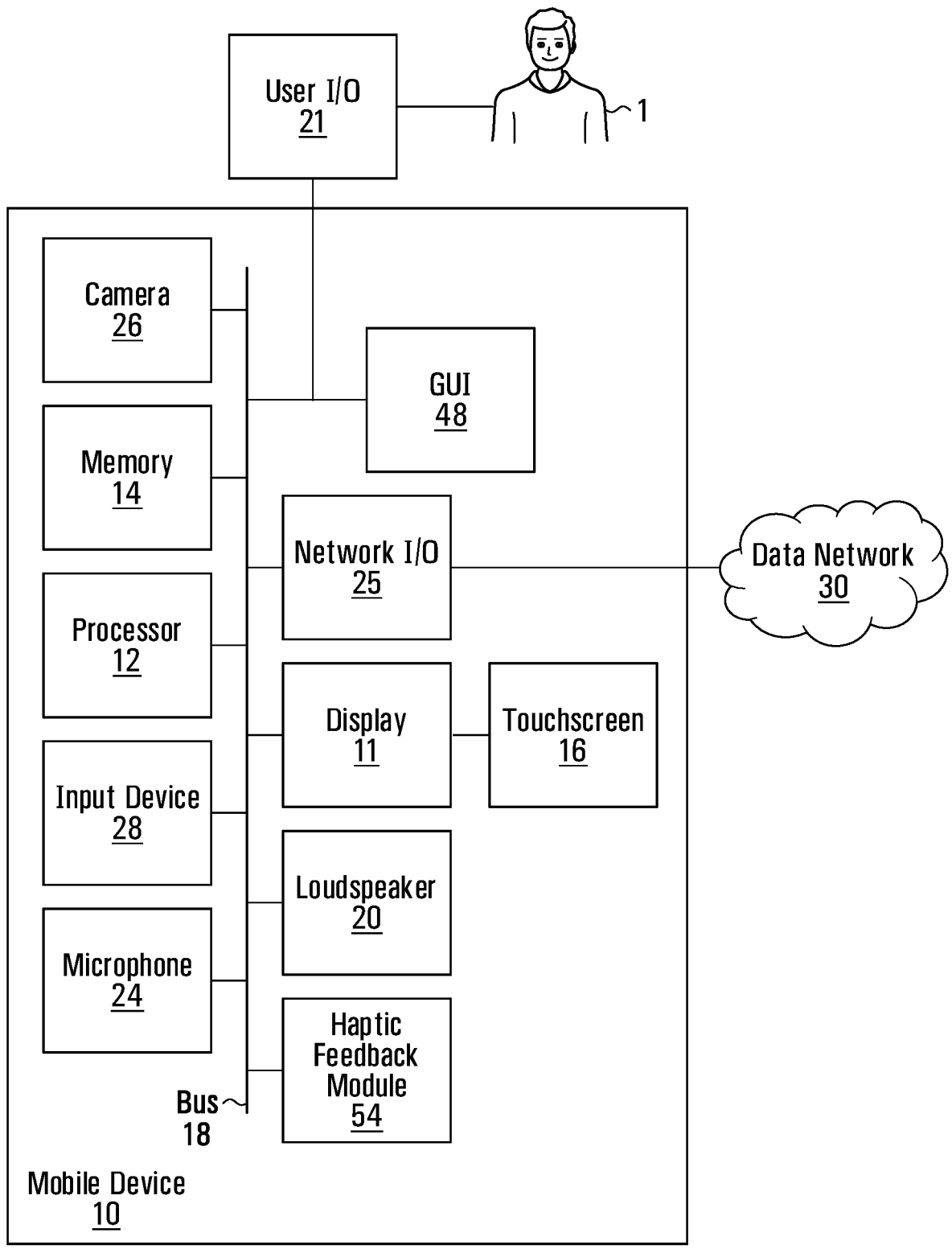
FIG. 7 is a block diagram illustrating a configuration of a mobile device for executing the AR application, in accordance with a non-limiting embodiment.

With reference to FIG. 7, there is shown a mobile device 10. In various embodiments, the mobile device 10 may be a smartphone, a tablet, a gaming console, a headset or so-called "smart" glasses or "smart" contact lenses, in accordance with some non-limiting possibilities.

The mobile device 10 comprises a memory 14 and at least one processor 12. The at least one processor 12 can include one or more central processing units (CPUs) and/or one or more graphics processing units (GPUs). The mobile device 10 may run an operating system such as Android® or iOS® or any other mobile operating system. A bus 18 may allow communication between the at least one processor 12 and the memory 14. The mobile device 10 also comprises a display 11 (e.g., a touchscreen 16), a camera 26, a microphone 24 and a loudspeaker 20.

The mobile device 10 may be connected to a data network 30 via a network input/output interface 25. Depending on the implementation, the data network 30 may be the internet, a local area network, a wireless network, a combination of such networks or still other forms of data networks.

A player 1 provides player inputs via at least one input device 28 (including one or more of a joystick, the touchscreen 16, a keyboard, a controller, the microphone 24, the camera 26 and/or a gesture sensor, for example). The display 11 (e.g. the touchscreen 16), the camera 26, the microphone 24 and the loudspeaker 20 may be connected to the at least one processor 12 via an input/output interface (I/O) 21 and the bus 18.

A mobile AR application may be viewed as an interactive computer program defined by computer-readable instructions 32 stored in the memory 14 and read and executed by the at least one processor 12. In some embodiments, a mobile AR application may be referred to as a mobile AR game.

Figure 8:
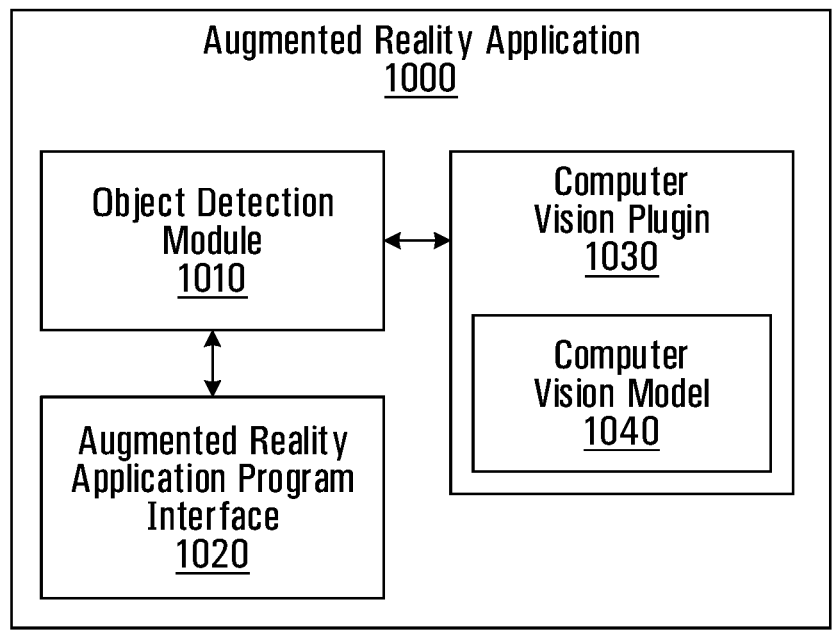
FIG. 8 is a block diagram conceptually illustrating components of the AR application, in accordance with a non-limiting embodiment.
Figure 9:
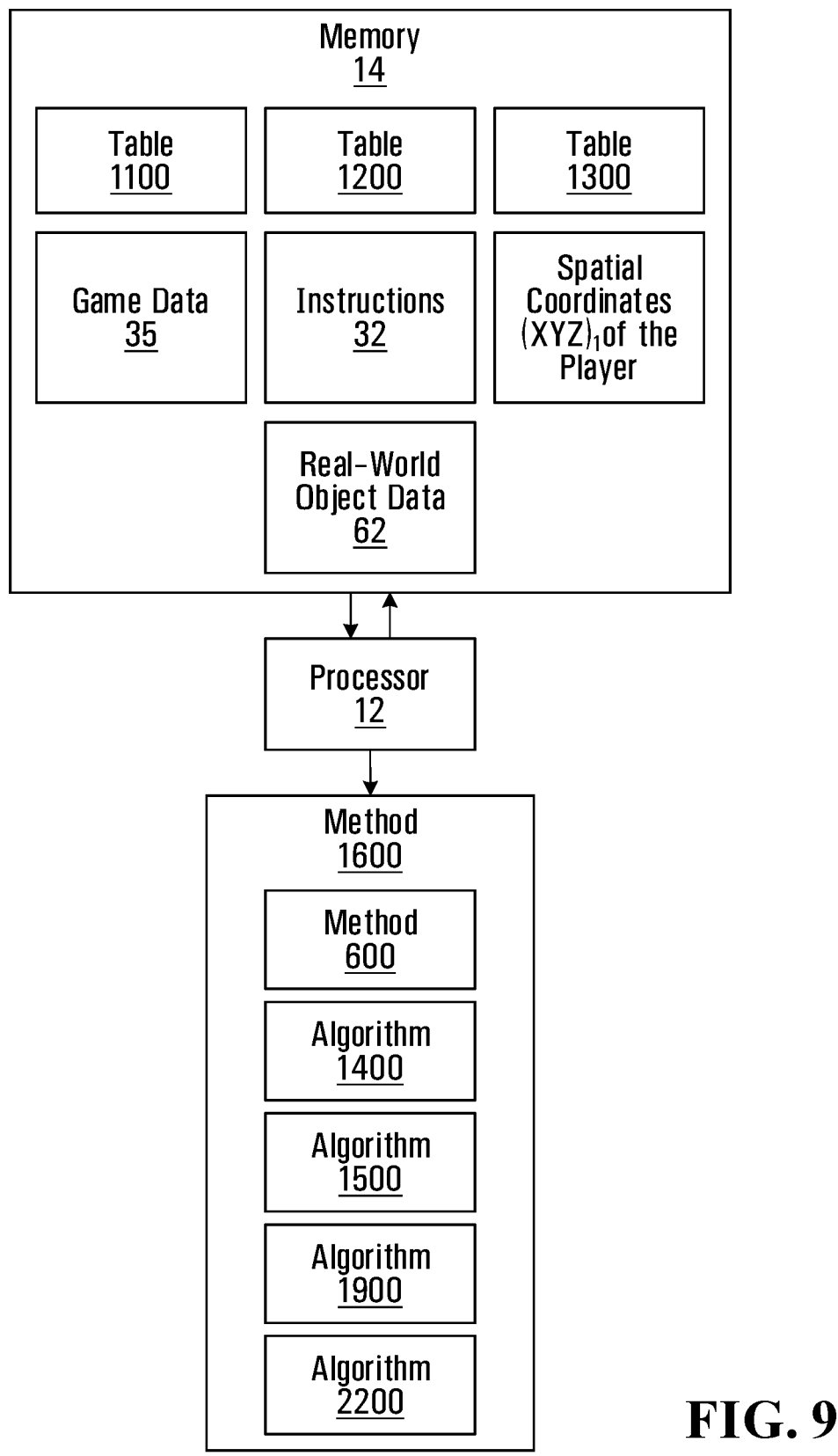
FIG. 9 is a block diagram showing a relationship between a memory of the mobile device and the process shown in FIG. 6, in accordance with a non-limiting embodiment.
Figure 10A:
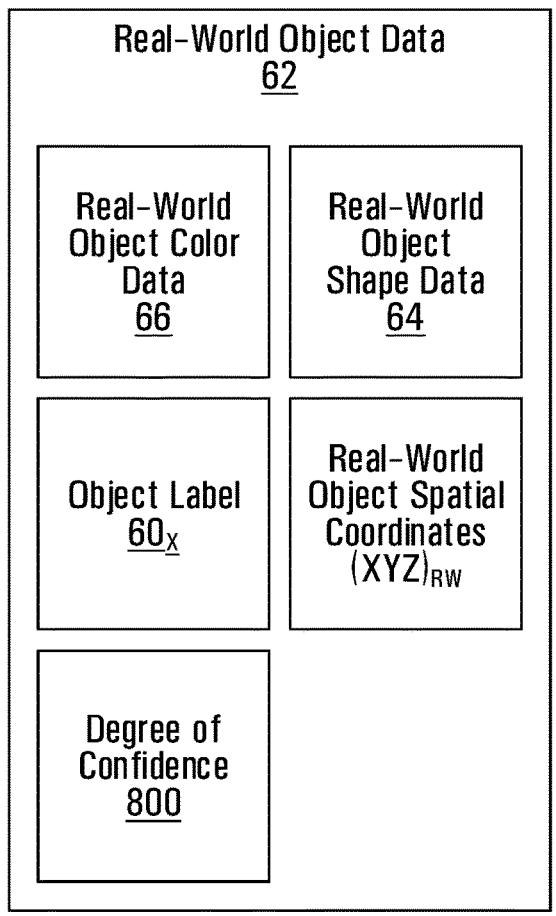
FIG. 10A is a block diagram conceptually illustrating examples of real-world object data, in accordance with a non-limiting embodiment.
Figure 10B:
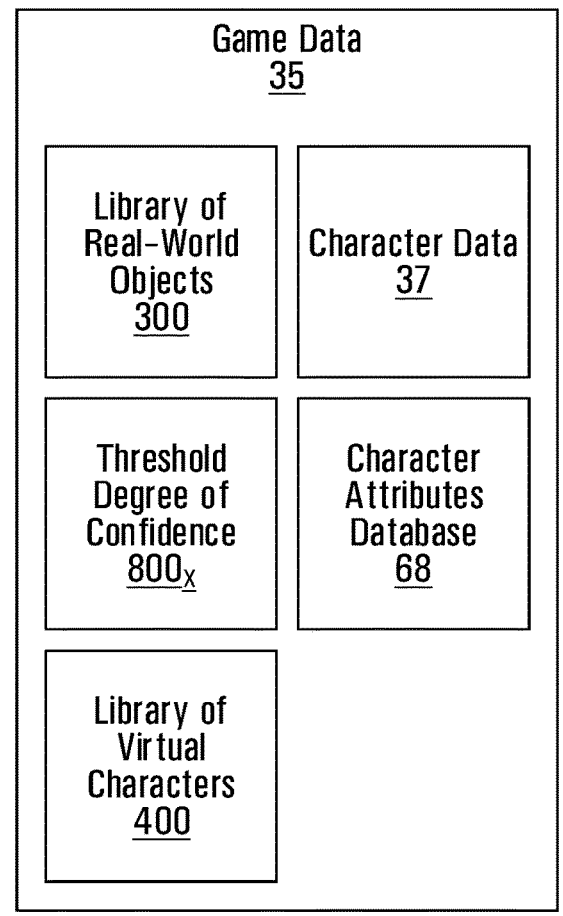
FIG. 10B is a block diagram conceptually illustrating examples of game data, in accordance with a non-limiting embodiment.
Figure 10C:
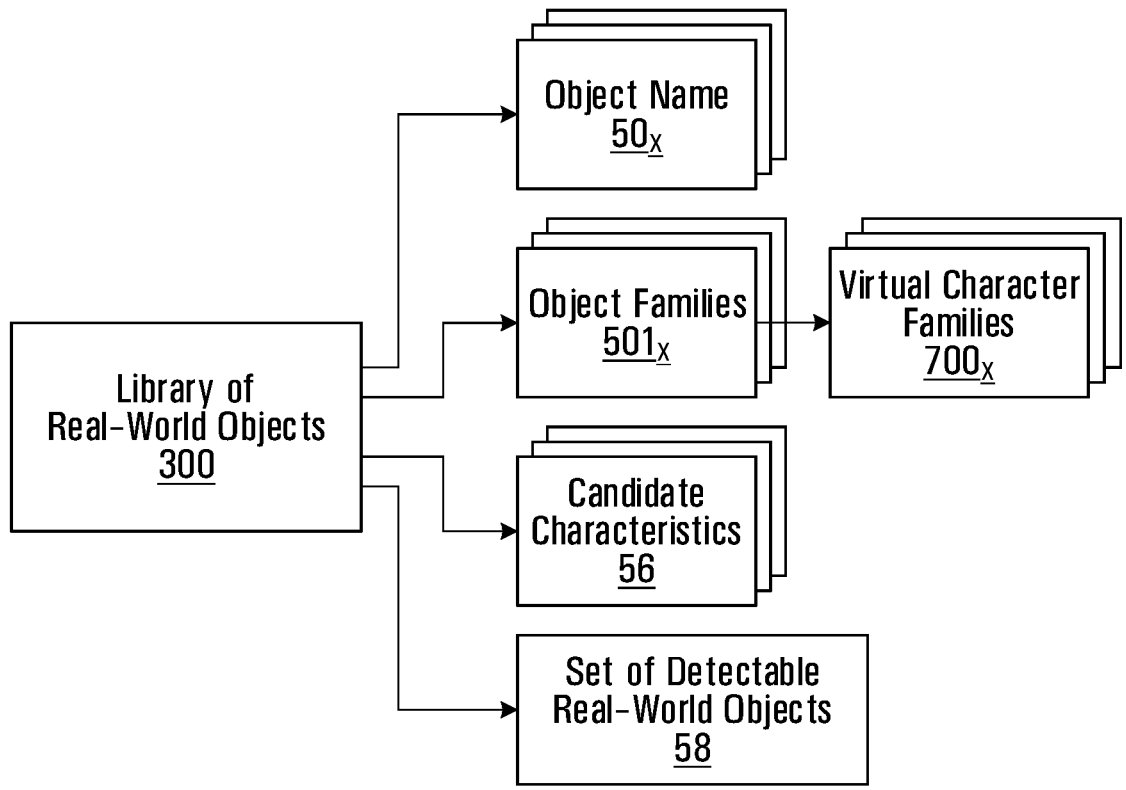
FIG. 10C is a conceptual illustration of an example of a library of real-world objects, in accordance with a non-limiting embodiment.
Figure 10D:
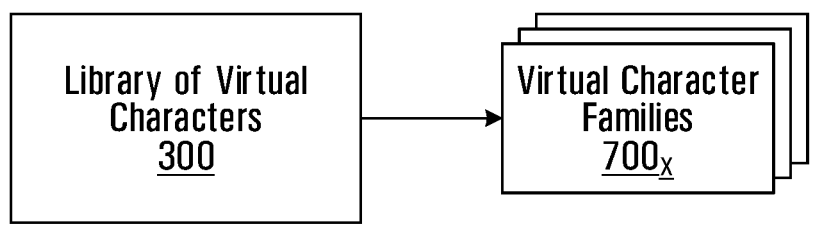
FIG. 10D is a conceptual illustration of an example of a library of virtual characters, in accordance with a non-limiting embodiment.
Figure 10E:
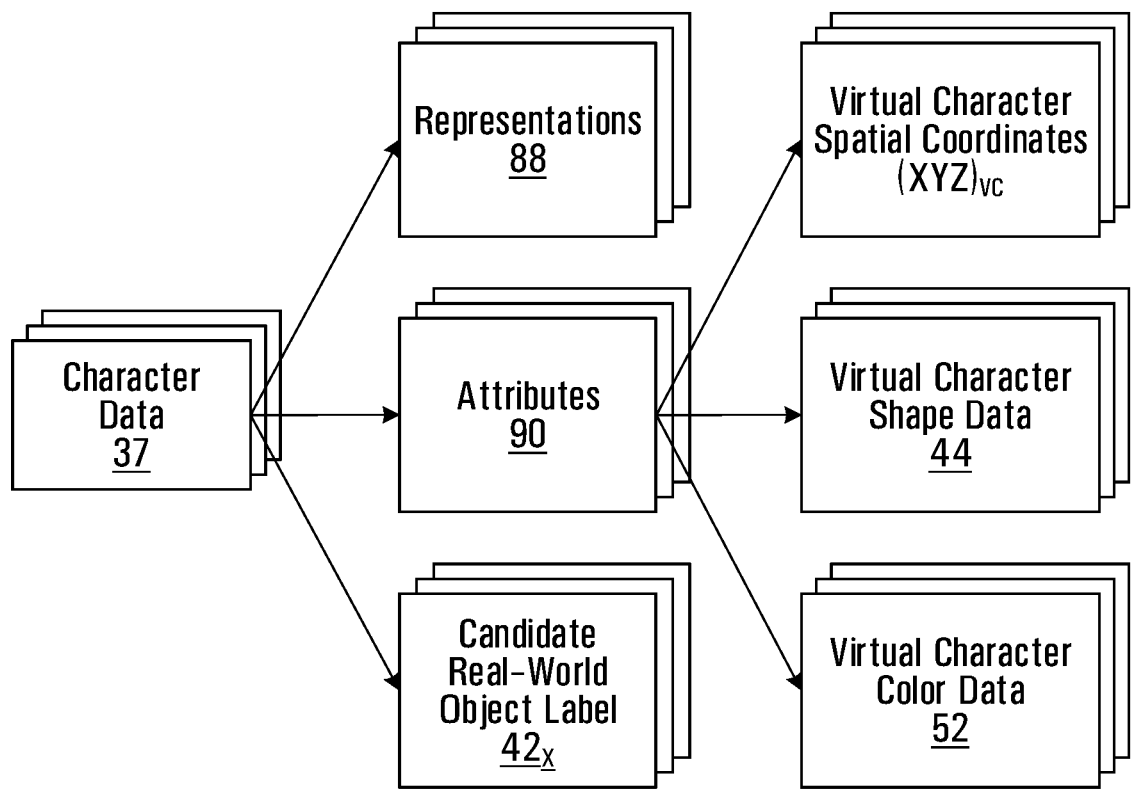
FIG. 10E is a conceptual illustration of character data, in accordance with a non-limiting embodiment.

In accordance with a non-limiting embodiment, FIG. 8 shows a block diagram of a mobile AR application 1000 which can be viewed as comprising a plurality of interconnected modules. The mobile AR application 1000 may comprise an Object Detection Module (ODM) 1010, a Computer Vision Plugin (CVP) 1030 and an AR Application Program Interface (AR API) 1020. In some embodiments, the ODM 1010 is a software processing block that carries out, together with the CVP 1030 and the AR API 1020, the method of FIG. 6.

The CVP 1030 can be any software component that adds computer vision functionality, such as computer vision machine learning, to the ODM 1010. Examples of computer vision functionality includes that provided by TensorFlow™ Lite on Android™ operating systems and CoreML™ on iOS™ operating systems.

The AR API 1020 can be any software component that provides, or otherwise allows access to, augmented reality functionality, such as point cloud data, to the ODM 1010. Examples of augmented reality functionality includes that provided by ARCore™ on Android™ operating systems and ARKit™ on iOS™ operating systems.

An image of a scene of an AR gaming environment 1005 may be captured by the mobile AR application 1000. Specifically, the ODM 1010 captures an image from a camera feed (i.e. a video frame) of the mobile device 10. The scene may comprise real-world objects that appear in the image of the scene. In some embodiments, one or more of the real-world objects may be an inanimate object (e.g., a table, a remote control, a hose etc.). In other embodiments, one or more of the real-world objects may be an animate object (e.g., a person, an animal etc.). Generally speaking, there is no particular limit on the number of real-world objects that may be in a given scene.

Figure 1A:
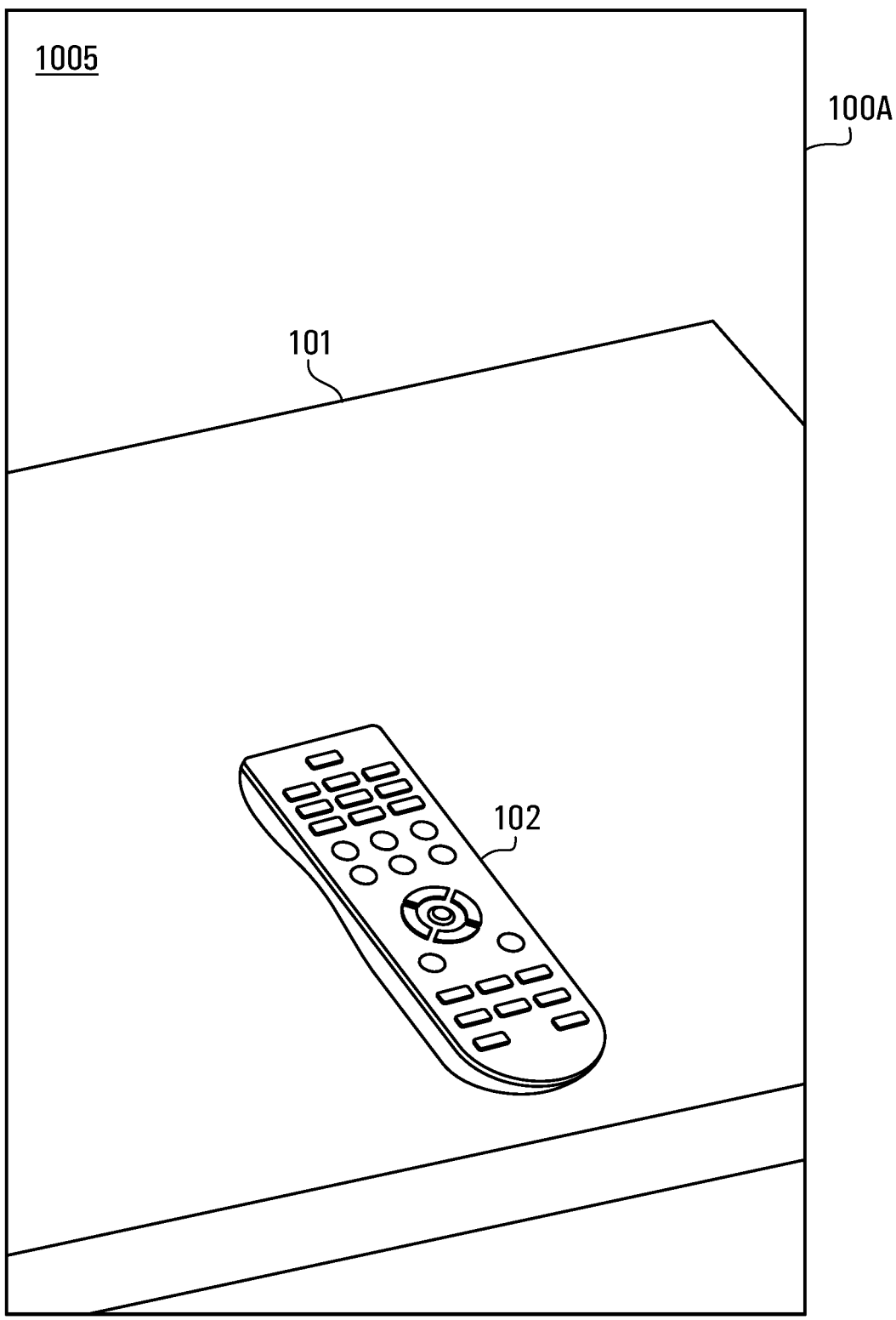
FIGS. 1A to 1D illustrate images of a first scene presented by an AR application in accordance with a non-limiting embodiment.

For example, FIG. 1A shows an image 100A of a first scene that may be captured and presented by the mobile AR application 1000 on the display 11 of the mobile device 10.

The image 100A is shown to include two real-world objects, namely a real-world table 101 and a real-world remote control 102.

Figure 1B:
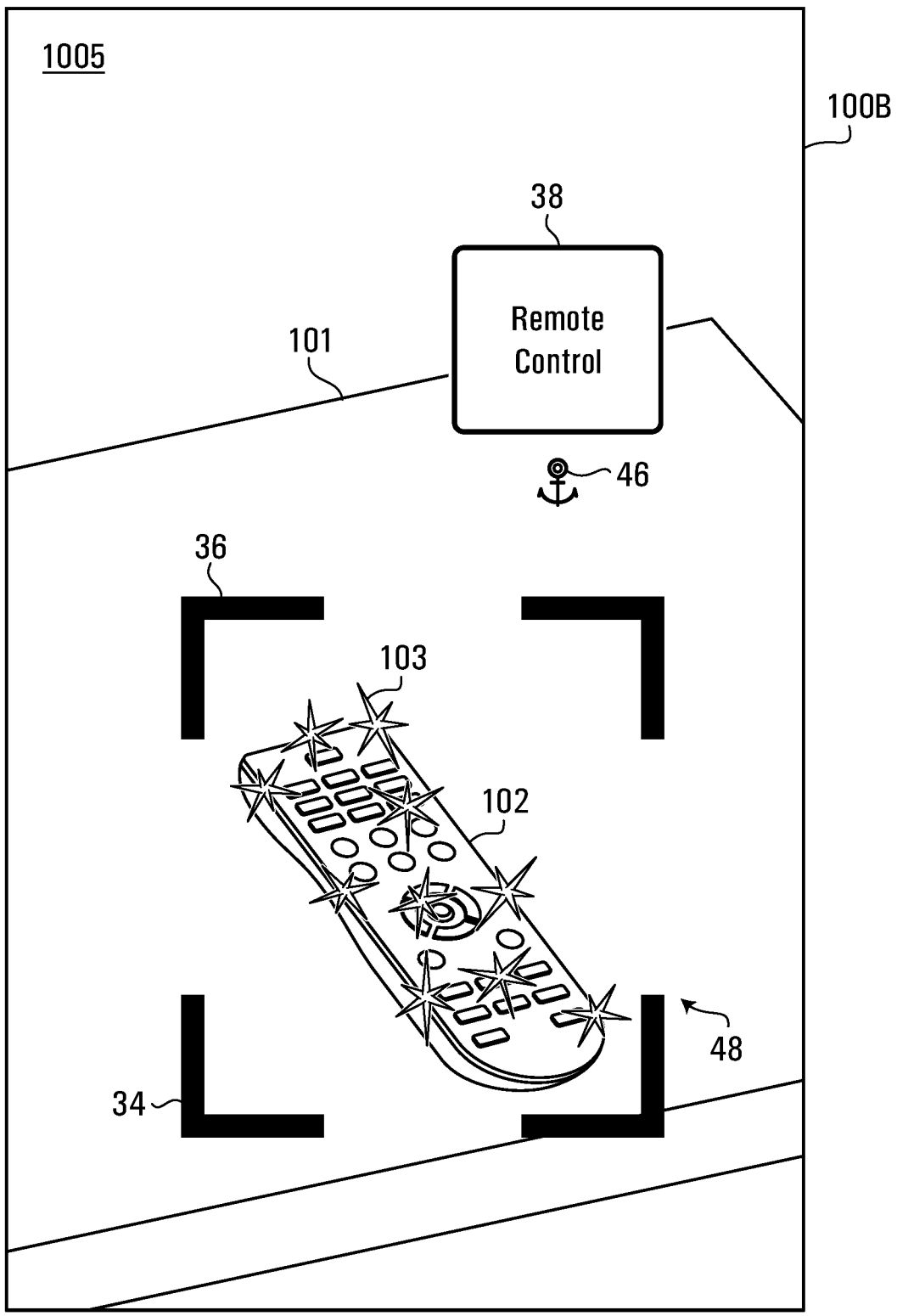
Figure 1C:
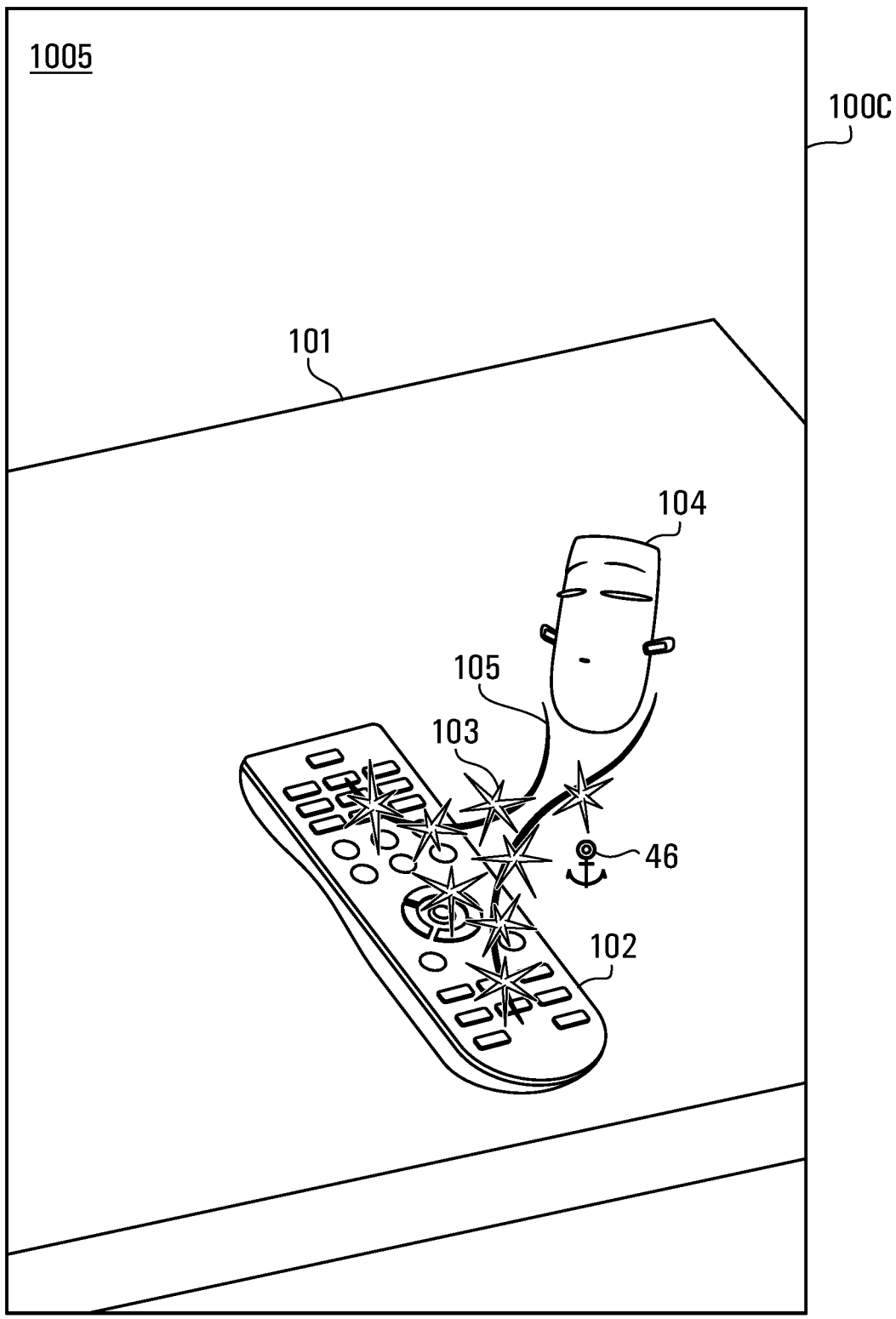
Figure 1D:
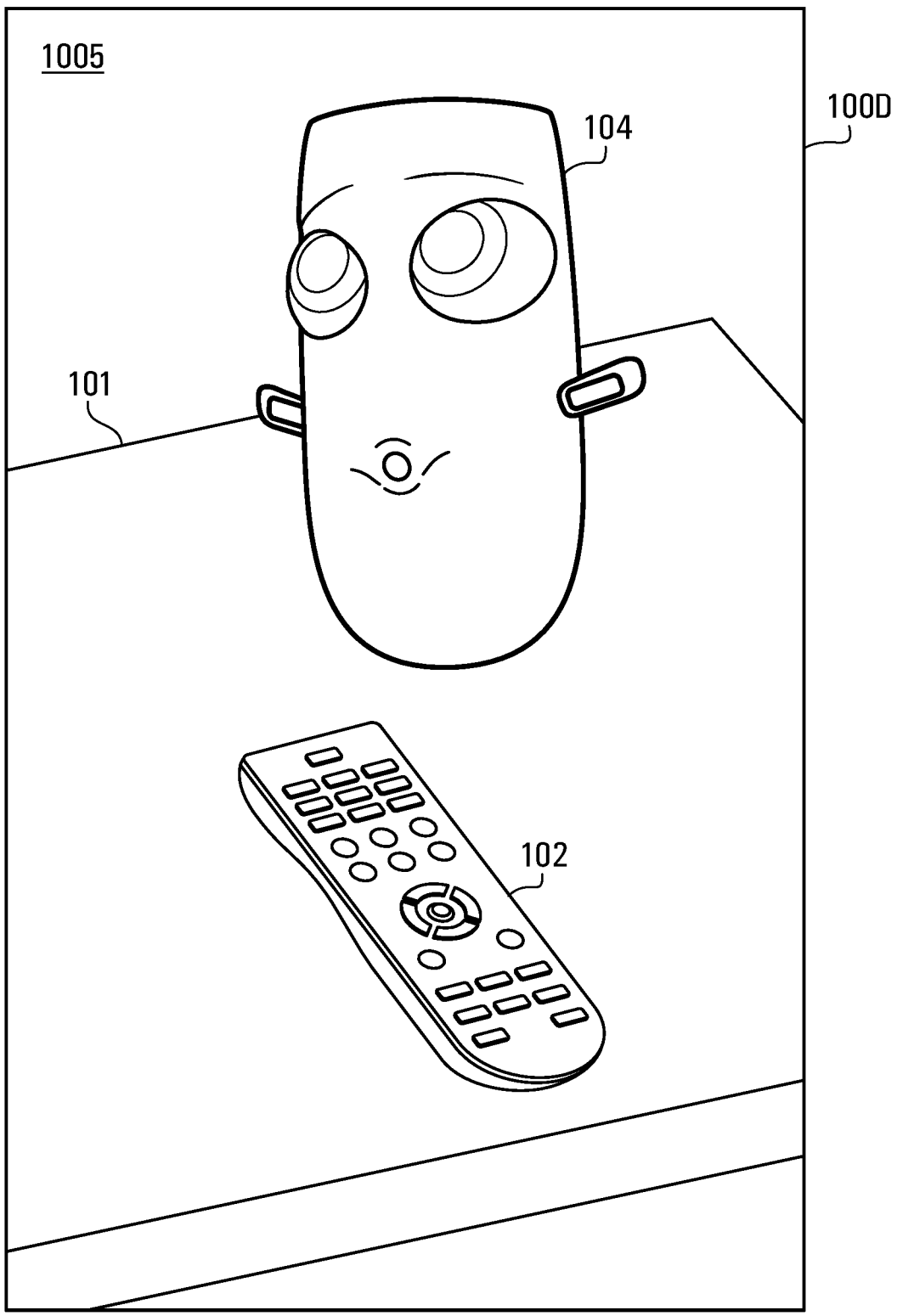

FIGS. 1B to 1D show subsequent images 100B to 100D of the scene presented by the mobile AR application 1000 on the display 11 of the mobile device 10. As the images progress, a virtual character 104 appears to be released from/spawned by the real-world remote control 102.

Figure 6:
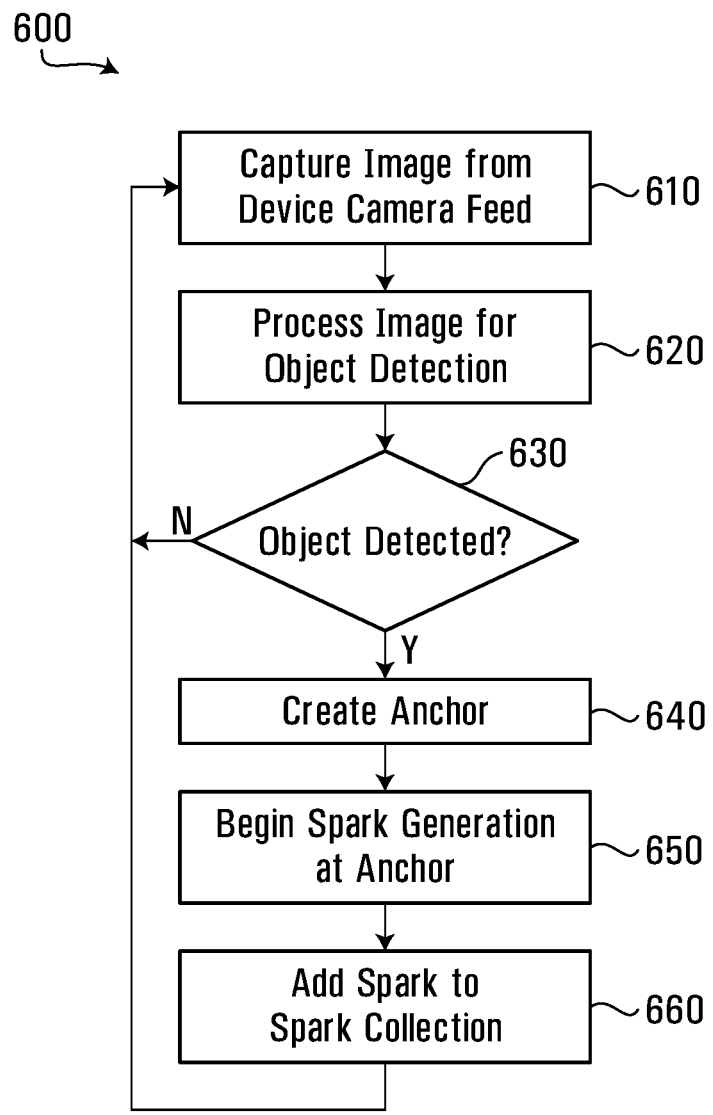
FIG. 6 is a flowchart showing steps of a method executed by the AR application, in accordance with a non-limiting embodiment.

The generation of virtual characters and their association with real-world objects are the outcome of a method 600 implemented by the mobile AR application 1000 that will now be described in further detail with reference to FIG. 6.

Step 610

The mobile AR application 1000 is configured to acquire or receive images captured by the camera 26 of the mobile device 10. As indicated above, the ODM 1010 captures an image from the camera feed (i.e. a video frame) of the mobile device 10. Generally speaking, the acquired camera images (or, more generally, "camera data") may—or may not—contain machine-recognizable real-world objects in a set of detectable real-world objects 58 associated with the mobile AR application 1000.

The set of detectable real-world objects 58 may be a subset of a set of real-world objects stored in a library of real-world objects 300 associated with the mobile AR application 1000. The library of real-world objects 300 may be encoded in game data 35 stored in the memory 14. Each real-world object in the library of real-world objects 300 (including each real-world object in the set of detectable real-world objects 58) may include identifying information. For example, an object name $50_x$ may be assigned to each real-world object in the library of real-world objects 300.

In some embodiments, the mobile AR application 1000 may be configured to categorize each real-world object in the library of real-world objects 300 (including each real-world object in the set of detectable real-world objects 58) into families of objects $501_x$ ("object families"). In some embodiments, the object family $501_x$ may be related to physical locations in the real world. In some embodiments, the object families $501_x$ may be related to the expected physical locations in the real world at which the player 1 may be likely to find such objects. For example, object family $501_x$ may include kitchen objects, living room objects, backyard objects and/or supermarket objects. The categorization of the real-world objects in the library of real-world objects 300 into object families $501_x$ may be encoded in the game data 35 by a game designer at the time of game design.

In the illustrated example embodiment, the camera images include the real-world table 101 and the real-world remote control 102. For the sake of the present example, the library of real-world objects 300 is assumed to include a real-world object identified with a "table" object name $50_x$ and a real-world object identified with a "remote control" object name $50_x$ however only the real-world object identified with the "remote control" object name $50_x$ is assumed to be in the set of detectable real-world objects 58.

The next step is step 620.

Step 620

The mobile AR application 1000 is configured to process the camera images acquired or received at step 610. Specifically, an attempt is made to detect, in the images, one or more real-world objects in the set of detectable real-world objects 58.

In some embodiments, attempted detection of a real-world object in the received images can be performed using a suitably trained computer vision model (CVM). For example, the ODM 1010 sends a request to the CVP 1030 to process a received image using a pre-trained CVM 1040. Specifically, the CVM 1040 attempts to identify known objects by examining shapes, colors and/or textures (patterns) in the received images from one or more perspectives. In one example of implementation of this embodiment, the known objects may include the real-world objects in the library of real-world objects 300.

Step 630

An output of the CVM 1040 indicates whether a real-world object has been detected. At step 630, the output of the CVM 1040 is assessed.

If the output of the CVM 1040 is positive, this is indicative that a real-world object has been detected in the captured images, and the next step is step 640. In the negative, the mobile AR application 1000 repeats steps 610 and 620 until step 630 yields a positive outcome.

If a particular real-world object has been detected in the scene, the CVM 1040 may be configured to assign an object label $60_x$ to the particular real-world object. The object label $60_x$ may also function as identification information related to the real-world object. The object label $60_x$ for the particular real-world object may be stored in the memory 14.

In the illustrated example embodiment, it is assumed that the real-world remote control 102 is ultimately detected and leads to a positive outcome of step 630. In this example, the mobile AR application 1000 is configured to assign the object label $60_x$ "remote control" to the real-world remote control 102.

Each detected real-world object may have an associated set of real-world object data 62 stored in the memory 14. The real-world object data 62 for each real-world object includes the object label $60_x$.

In view of the positive outcome of step 630 (i.e., a particular real-world object has been detected in the scene), the next step is step 640.

Step 640

At step 640, the AR API 1020 of the mobile AR application 1000 is configured to provide an anchor 46 for the eventual virtual character 104.

In the illustrated embodiment, the anchor 46 may be established in association with a position of the real-world remote control 102 in order to provide an anchor for the eventual virtual character 104. As such, spatial coordinates $(XYZ)_{RW}$ of the real-world remote control 102 and spatial coordinates $(XYZ)_{VC}$ of the eventual virtual character 104 may be generally the same or identical.

Once the anchor 46 is established generally at the position of the particular real-world object, in this embodiment, the mobile AR application 1000 is configured to convey to the player 1 information which indicates the presence of the particular real-world object on the display 11. To this end, the mobile AR application 1000 may provide feedback to the player 1 in response to the particular real-world object being detected. For example, the feedback may be an auditory, a visual or a haptic signal emitted by the mobile device 10.

In one example of implementation, a graphical user interface (GUI) 48 of the mobile AR application 1000 may be configured to display on the display 11 a visual indicator 34 to signal the presence of the particular real-world object to the player 1. The visual indicator 34 may be a graphical indicator 36 (e.g., a shape bounding the particular real-world object) and/or a textual indicator 38 (e.g., a text-based message to the player 1 indicating the presence of the particular real-world object). In other embodiments, once the anchor 46 is established, the mobile AR application 1000 does not convey to the player 1 information which indicates the presence of the particular real-world object on the display 11.

In some embodiments, once the particular real-world object is detected by the CVM 1040, the mobile AR application 1000 may be configured to provide the player 1 with an opportunity to provide input relating to the particular real-world object. For example, the mobile AR application 1000 may be responsive to the player 1 touching a portion of the display 11/the touchscreen 16 on which the particular real-world object is displayed. In other examples, the mobile AR application 1000 may be responsive to the player 1 providing input by touching other portions of the display 11/the touchscreen 16, or through any other suitable mechanism. In one non-limiting example, the mobile AR application 1000 may be configured to provide the player 1 with an opportunity to provide an audible command transmitted via the microphone 24 of the mobile device 10.

The next step is step 650.

Step 650

The mobile AR application 1000 creates an association between the particular real-world object and a virtual character (hereinafter referred to as an "associated virtual character"). This association may be triggered as a result of player input being provided (as described above), or independently of player input. Accordingly, the mobile AR application 1000 is configured to store in the memory 14 the association of the particular real-world object and the associated virtual character. In some embodiments, the mobile AR application 1000 is configured to simultaneously display the particular real-world object and the associated virtual character on the display 11.

In some embodiments, the mobile AR application 1000 may be configured to select the associated virtual character from a library of virtual characters 400 stored in the memory 14 of the mobile device 10. The library of virtual characters 400 may include one or more virtual characters which may be selected for association with a real-world object, such as the particular real-world object. The library of virtual characters 400 may be encoded in the game data 35 stored in the memory 14.

Each virtual character in the library of virtual characters 400 may include a representation 88, such as a 2-dimensional or 3-dimensional representation of the virtual character. Each virtual character in the library of virtual characters 400 may have other representations 88 such as non-graphical representations (e.g., numeric, geometric or mathematical representations). The game data 35 may include character data 37 related to each virtual character in the library of virtual characters 400. The character data 37 stores data relating to the current representation of the virtual character such as the graphical representation in a game image frame or a numeric, geometric or mathematical representation. The character data 37 may also store attributes 90 such as shape data 44, color data 52, imaging data, position data (e.g., the spatial coordinates $(XYZ)_{VC}$ of the virtual character), material/texture data, physical state data, visibility data, lighting data (e.g., direction, position, color and/or intensity), sound data, motion data, collision data, environment data, timer data and/or other data associated with the virtual character.

Figure 22:
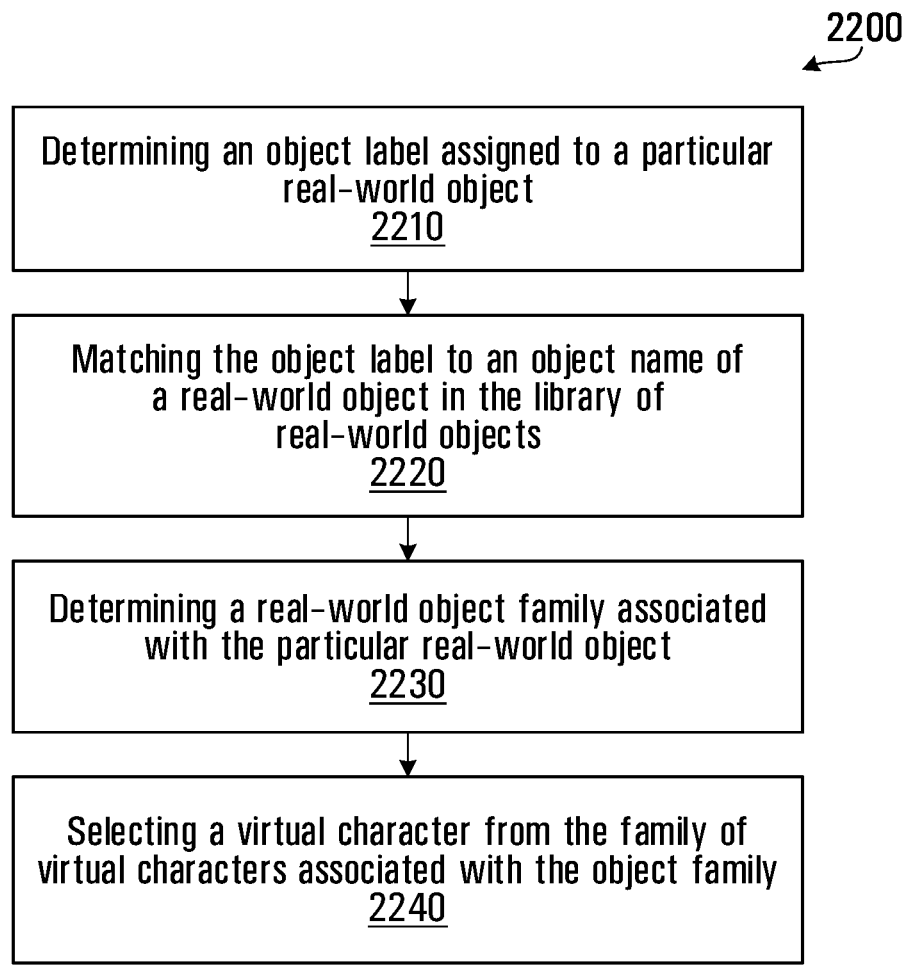
FIG. 22 is a flowchart illustrating steps of a virtual character selection algorithm, in accordance with a non-limiting embodiment.

Reference is now made to a flowchart in FIG. 22, showing steps in an algorithm for selecting the associated virtual character from a family of virtual characters $700_x$ associated with a given object family $501_x$ in which a real-world object in the library of real-world objects 300 has been categorized. The steps in the virtual character selection algorithm 2200 will now be described in further detail with reference to FIG. 22.

At step 2210, the mobile AR application 1000 is configured to identify the object label $60_x$ assigned to the particular real-world object as a result of it being detected by the CVM 1040 in step 630 (as discussed above). As such, at step 2210, the mobile AR application 1000 accesses the memory 14 and identifies the object label $60_x$ assigned to the particular real-world object in step 630.

In the example provided in step 630 above, the mobile AR application 1000 assigned the object label $60_x$ "remote control" to the real-world remote control 102. Thus, in accordance with step 2210, the mobile AR application 1000 accesses the memory 14 and identifies the object label $60_x$ "remote control" assigned to the real-world remote control 102. The next step is step 2220.

At step 2220, the mobile AR application 1000 is configured to access the library of real-world objects 300 and to match the object label $60_x$ assigned to the particular real-world object to the object name $50_x$ of a real-world object stored in the library of real-world objects 300.

For example, at step 2220, the mobile AR application 1000 is configured to match the object label $60_x$ assigned to the real-world remote control 102, namely "remote control" to the object name $50_x$ of a real-world object stored in the library of real-world objects 300.

As indicated above, the library of real-world objects 300 is assumed to include a real-world object identified with a "remote control" object name $50_x$. Accordingly, an output of step 2220 is a match between the object label $60_x$ "remote-control" assigned to the real-world remote control 102 and the object name $50_x$ "remote-control" of a real-world object stored in the library of real-world objects 300.

At step 2230, the mobile AR application 1000 is configured to determine the object family $501_x$ to which the real-world object stored in the library of real-world objects 300 has been categorized, the object name $50_x$ of the real-word object having been matched in step 2220 to the object label $60_x$ assigned to the particular real-world object. As such, the mobile AR application 1000 is configured to determine an association between the particular real-world object and an object family $501_x$.

In this example, it is assumed that the real-world object in the library of real-world objects 300 associated with the object name $50_x$ "remote control" has been categorized in a "living room objects" object family $501_x$. Thus, at step 2230, in this example, the mobile AR application 1000 determines that the real-world remote control 102 is associated with the "living room" object family $501_x$.

In this embodiment, each object family $501_x$ may have an associated family of virtual characters $700_x$ ("virtual character families"). The associated family of virtual characters $700_x$ may be a subset of virtual characters from the library of virtual characters 400. In the non-limiting embodiment of FIG. 5, the mobile AR application 1000 is configured to include at least 2 unique virtual characters associated with each virtual character/object family $700_x$, $501_x$. For example, the virtual character collection screen 500 shows a virtual character collection 900 comprising object families $501_1$, $501_2$, $501_3$, and $501_4$, families of virtual characters $700_1$, $700_2$, $700_3$, $700_4$ and $700_5$ and a plurality of unique virtual characters associated with each virtual character/object family $700_x$, $501_x$ (e.g., $71_1$, $71_2$, $71_3$, $71_4$ associated with virtual character family $701_1$/object family $501_1$).

At step 2240, the mobile AR application 1000 is configured to select the associated virtual character by selecting a virtual character from the family of virtual characters $700_x$ associated with the object family $501_x$ to which the particular real-world object is associated.

In some embodiments, the mobile AR application 1000 may be configured to randomly select a virtual character from the family of virtual characters $700_x$ to have an association with the particular real-world object.

In other embodiments, the mobile AR application 1000 is configured to select a virtual character from the family of virtual characters $700_x$ to have an association with the particular real-world object by implementing a selection/matching algorithm 1900 (to be described in further detail below). In yet other embodiments, the mobile AR application 1000 is configured implement the selection/matching algorithm 1900 without implementing the virtual character selection algorithm 2200 described above.

Figure 19:
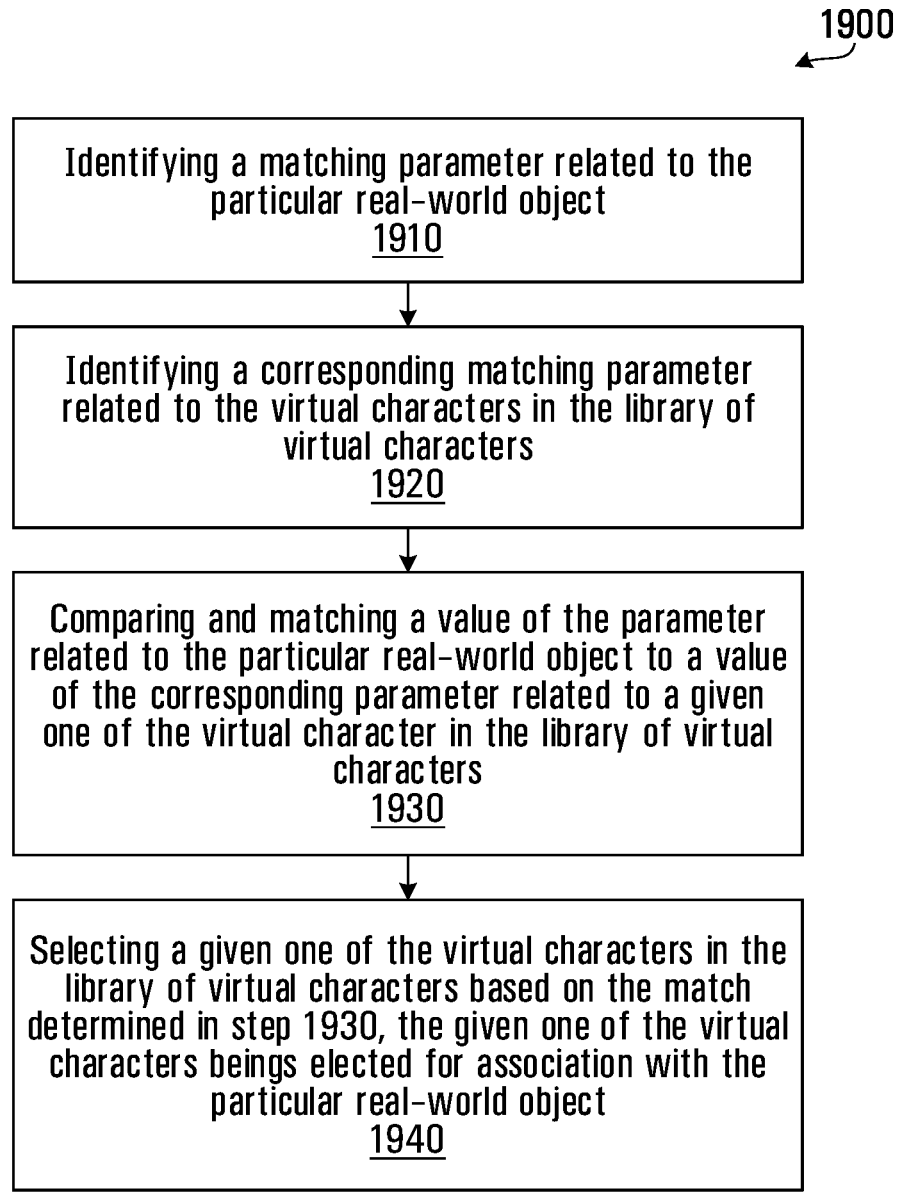
FIG. 19 is a flowchart illustrating steps of a selection/matching algorithm, in accordance with a non-limiting embodiment.

Reference is now made to the flowchart in FIG. 19, showing steps in the selection/matching algorithm 1900 executed by the at least one processor 12 of the mobile device 10. In some embodiments, the mobile AR application 1000 may be configured to execute the selection/matching algorithm 1900 to select a virtual character from the library of virtual characters 400 for association with the particular real-world object. In other embodiments, the mobile AR application 1000 may be configured to execute the selection/matching algorithm 1900 to select a virtual character from a subset of the library of virtual characters 400, namely from a family of virtual characters $700_x$. For the purposes of the present description, the selection/matching algorithm 1900 will be described below with respect to selecting a virtual character from the library of virtual characters 400.

At step 1910, the mobile AR application 1000 is configured to identify a matching parameter related to the particular real-world object and at step 1920, the mobile AR application 1000 is configured to identify a corresponding matching parameter related to the virtual characters in the library of virtual characters 400. Details regarding these matching parameters will be provided below. At step 1930, the mobile AR application 1000 is configured to compare and match a value of the parameter related to the particular real-world object to a value of the corresponding parameter related to a given one of the virtual character in the library of virtual characters 400. At step 1940, the mobile AR application 1000 is configured to select a given one of the virtual characters in the library of virtual characters 400 based on the match determined in step 1930, the given one of the virtual characters being selected for association with the particular real-world object.

Examples of implementation of the selection/matching algorithm 1900 will now be described in further detail.

As indicated above, at step 1910, the mobile AR application 1000 is configured to identify a matching parameter related to the particular real-world object. In one example, the matching parameter may be the object label $60_x$ assigned to the particular real-world object as a result of it being detected by the CVM 1040 in step 630 (as discussed above).

During game design, the game designer may encode a designation of the object label $60_x$ as a matching parameter for real-world object detected in the images captured by the ODM 1010. This designation may be encoded in the game data 35 stored in the memory 14.

As such, at step 1910, the mobile AR application 1000 accesses the memory 14 and identifies the object label $60_x$ assigned to the particular real-world object as the matching parameter related to the particular real-world object.

At step 1920, the mobile AR application 1000 is configured to identify a corresponding matching parameter related to the virtual characters in the library of virtual characters 400. In this example, the matching parameter is a candidate real-world object label $42_x$.

During initial game design, the game designer may designate one or more candidate real-world objects for each virtual character in the library of virtual characters 400. For a given virtual character in the library of virtual characters 400, the one or more candidate real-world objects correspond to real-world objects which may be detected by the CVM 1040 in the images captured by ODM 1010, and may be considered for association with the given virtual character.

At the time of game design, the game designer may access the library of virtual characters 400 and encode one or more real-world objects from the library of real-world objects 300 as one or more candidate real-world objects for each of the virtual characters in the library of virtual characters 400. This designation may be encoded in the game data 35 stored in the memory 14. As such, the one or more candidate real-world objects may be pre-established (set) by a designer/producer of the game.

Each of the one or more candidate real-world objects may comprise identification information such as the candidate real-world object label $42_x$. For each virtual character in the library of virtual characters 400, the candidate real-world object label $42_x$ of the one or more candidate real-world objects may be stored in the game data 35 as character data 37 stored in the memory 14.

Additionally, during game design, the game designer may encode a designation of the candidate real-world object label $42_x$ as a matching parameter for the virtual characters in the library of virtual characters 400. The game designer may also encode a designation of the candidate real-world object label $42_x$ as the corresponding matching parameter for the object label $60_x$ of the particular real-world object. This designation may be encoded in the game data 35 stored in the memory 14.

Returning now to the selection/matching algorithm 1900, at step 1920, the mobile AR application 1000 accesses the memory 14 and identifies the candidate real-world object label $42_x$ as the corresponding matching parameter for the object label $60_x$ of the particular real-world object.

At step 1930, the mobile AR application 1000 is configured to compare and match a value of the parameter related to the particular real-world object to a value of the corresponding parameter related to a given one of the virtual characters in the library of virtual characters 400. In this example, the mobile AR application 1000 is configured to match (i) a value of the candidate real-world object label $42_x$ for a given virtual character in the library of virtual characters 400 and (ii) the value of the object label $60_x$ assigned to the particular real-world object by the CVM 1040.

For example, the mobile AR application 1000 may be configured to compare the aforementioned labels by comparing a text string stored in the memory 14 associated with the object label $60_x$ to a text string stored in the memory 14 associated with the candidate real-world object label $42_x$ and identifying a number similarities between the text strings. The mobile AR application 1000 may be configured to require a threshold number of similarities to define a match between the text strings. Upon detection of a number of similarities above the threshold number of similarities, the mobile AR application 1000 may consider the candidate real-world object label $42_x$ to match the object label $60_x$ assigned to the particular real-world object. The threshold number of similarities may be set at the time of game design by the game designer and stored in the game data 35.

At step 1940, upon matching the object label $60_x$ of the particular real-world object and a candidate real-world object label $42_x$ of a given virtual character in the library of virtual characters 400, the mobile AR application 1000 is configured to select the given virtual character to have an association with the particular real-world object.

The selection/matching algorithm 1900 will be described in accordance with a non-limiting example for selecting the virtual character 104 for association with the real-world remote control 102 based on the object label $60_x$ and the candidate real-world object label $42_x$.

At step 1910, the mobile AR application 1000 is configured to identify a matching parameter related to the real-world remote control 102. As such, the mobile AR application 1000 accesses the memory 14 and identifies the object label $60_x$ assigned to the real-world remote control 102 as the matching parameter related to the real-world remote control 102. In this case, upon detection by the CVM 1040, the real-world remote control 102 is assigned the object label $60_x$ "remote control". Accordingly, at step 1910, the matching parameter for the real-world remote control 102 is identified as the object label $60_x$ "remote control".

At step 1920, the mobile AR application 1000 is configured to identify a corresponding matching parameter related to the virtual characters in the library of virtual characters 400. The mobile AR application 1000 accesses the memory 14 and identifies the candidate real-world object label $42_x$ as being the matching parameter for the virtual characters in the library of virtual characters 400 and as being the corresponding matching parameter for the object label $60_x$ assigned to the real-world remote control 102.

At step 1930, the mobile AR application 1000 is configured to compare and match a value of the object label $60_x$ assigned to the real-world remote control 102 with a value of the candidate real-world object label $42_x$ for a given one of the virtual characters in the library of virtual characters 400. In this example, the mobile AR application 1000 compares the text string "remote control" stored in the memory 14 associated with the object label $60_x$ of the real-world remote control 102 to the text strings stored in the memory 14 associated with the candidate real-world object label $42_x$ for each of the virtual characters in the library of virtual characters 400 to identify similarities between the text strings.

In this example, a text string stored in the memory associated with the candidate related real-world object label $42_x$ of virtual character 104 is "remote controls". The mobile AR application 1000 detects the similarities between the text string "remote control" associated with the object label $60_x$ and the text string "remote controls" associated with the candidate real-world object label $42_x$ for the virtual character 104. For the sake of the present example, it is assumed that the number of similarities detected by the AR application 1000 is above the required threshold number of similarities to categorize a match between the text strings. As such, the mobile AR application 1000 considers the candidate real-world object label $42_x$ "remote controls" associated with the virtual character 104 to match the object label $60_x$ "remote control" assigned to the real-world remote control 102.

At step 1940, upon matching the object label $60_x$ of the real-world remote control 102 and the candidate real-world object label $42_x$ of the virtual character 104, the mobile AR application 1000 selects the virtual character 104 from the library of virtual characters 400 to have an association with the real-world remote control 102.

In some embodiments, the associated virtual character may be selected to have a visual association with the particular real-world object. In other words, the associated virtual character may have visual characteristics that correspond to the real-world visual characteristics of the particular real-world object.

The visual characteristics may include, but are not limited to, a shape of the particular real-world object, a colour of the particular real-world object, or any other visual characteristic of the particular real-world object. The mobile AR application 1000 is configured to display the visual characteristics of the associated virtual character on the display 11 simultaneously with displaying the particular real-world object on the display 11.

In the illustrated example, the virtual character 104 is selected to have a visual association with the real-world remote control 102 and in this case, a shape of the virtual character 104 corresponds to a real-world shape of the real-world remote control 102. As shown in FIGS. 1C and 1D, the mobile AR application 1000 is configured to display the shape of the virtual character 104 on the display 11 simultaneously with displaying the shape of the real-world remote control 102 on the display 11.

In this example, the virtual character 104 is selected for visual association with the real-world remote control 102 further to the selection/matching algorithm 1900 being executed by the at least one processor 12 as described above. During game design, the game designer may have designated "remote controls" as a given one of the candidate real-world object label $42_x$ for the one or more candidate real-world objects designated for the virtual character 104 based on perceived similarities between the shape of the virtual character 104 and the shape of real-world remote controls.

In another example of implementation of this embodiment, the associated virtual character may have been selected for visual association with the particular real-world object further to the selection/matching algorithm 1900 being executed by the at least one processor 12 based on a matching parameter different from the object label $60_x$ and the candidate real-world object label $42_x$.

In this example, the CVM 1040 may be suitably trained to detect a shape of the particular real-world object. For instance, the CVM 1040 may be configured to extract shape data 64 associated with the particular real-world object from the camera data acquired in step 610 of the method 600. The shape data 64 may be stored in the memory 14 as part of the set of real-world object data 62. The shape data 64 may include, but is not limited to, boundary data, contour data, edge data, point cloud data and/or curvature data for the particular real-world object. During game design, the game designer may encode a designation of the shape data 64 as a matching parameter for real-world objects which may be detected in the images captured by the ODM 1010. This designation may be encoded in the game data 35 stored in the memory 14.

As previously indicated, the shape data 44 for each virtual character in the family of virtual characters 400 is included in the game data 35 stored in the memory 14 of the mobile device 10. The shape data 44 for each virtual character in the family of virtual characters 400 may include, but is not limited to, boundary data, contour data, edge data, point cloud data and/or curvature data for the virtual character.

During game design, the game designer may encode a designation of the shape data 44 as a matching parameter for the virtual characters in the library of virtual characters 400. The game designer may also encode a designation of the shape data 44 of the virtual characters as the corresponding matching parameter for the shape data 64 of the particular real-world object. This designation may be encoded in the game data 35 stored in the memory 14.

In one example, the shape of the associated virtual character may correspond to the shape of the particular real-world object based on matching of a value of (i) the shape data 64 of the particular real-world object and (ii) the shape data 44 of a given virtual character in the library of virtual characters 400.

In this example, at step 1910 the mobile AR application 1000 is configured to identify a matching parameter related to the particular real-world object. As such, the mobile AR application 1000 accesses the memory 14 and identifies the shape data 64 as the matching parameter related to the particular real-world object.

At step 1920, the mobile AR application 1000 is configured to identify a corresponding matching parameter related to the virtual characters in the library of virtual characters 400. As such, the mobile AR application 1000 accesses the memory 14 and identifies the shape data 44 as the corresponding matching parameter for the shape data 64 of the particular real-world object.

At step 1930, in this example, the mobile AR application 1000 is configured to compare and match a value of the shape data 64 of the particular real-world object and a value of the shape data 44 of a virtual character in the library of virtual characters 400. The mobile AR application 1000 may be configured to match the shape data 44, 64 by comparing a set of data points associated with the shape data 64 associated with the real-world object and a corresponding set of data points associated with the shape data 44 for each of the virtual characters in the library of virtual characters 400 and identifying similarities between these data points. Upon detection of a number of similarities above a threshold number of similarities, the mobile AR application 1000 may consider the shape data 64 of the real-world object to match the shape data 44 of a given one of the virtual characters in the library of virtual characters 400. The threshold number of similarities may be set at the time of game design by the game designer and stored in the game data 35.

At step 1940, upon matching the shape data 64 of the particular real-world object and the shape data 44 of a given virtual character in the library of virtual characters 400, the mobile AR application 1000 is configured to select the given virtual character from the library of virtual characters 400 and to have a visual association with the particular real-world object.

The selection/matching algorithm 1900 will be described in accordance with a non-limiting example as for selecting the virtual character 104 for visual association with the real-world remote control 102 based on shape data 64, 44.

At step 1910, the mobile AR application 1000 is configured to identify a matching parameter related to the real-world remote control 102. As such, the mobile AR application 1000 accesses the memory 14 and identifies the shape data 64 associated with the real-world remote control 102 as the matching parameter related to the real-world remote control 102. In this case, the CVM 1040 is configured to extract the shape data 64 for the remote control 102 from the camera data acquired in step 610 of the method 600.

At step 1920, the mobile AR application 1000 is configured to identify a corresponding matching parameter related to the virtual characters in the library of virtual characters 400. The mobile AR application 1000 accesses the memory 14 and identifies the shape data 44 of the virtual character as being the matching parameter for the virtual characters in the library of virtual characters 400 and as being the corresponding matching parameter for the shape data 64 associated with the real-world remote control 102.

At step 1930, the mobile AR application 1000 is configured to compare and match a value of the shape data 64 associated with the real-world remote control 102 with a value of the shape data 44 for a given one of the virtual characters in the library of virtual characters 400. In this example, the mobile AR application 1000 compares a set of data points associated with shape data 64 associated with the real-world remote control 102 and a corresponding set of data points associated with each of the virtual characters in the library of virtual characters 400 and detects similarities between these data points.

For the sake of the present example, it is assumed that the number of similarities detected by the AR application 1000 is above the required threshold number of similarities to categorize a match between the shape data 64, 44. As such, the mobile AR application 1000 considers the shape data 44 associated with the virtual character 104 to match the shape data 64 associated with the real-world remote control 102.

At step 1940, upon matching the shape data 64 associated with the real-world remote control 102 and the shape data 44 associated with the virtual character 104, the mobile AR application 1000 selects the virtual character 104 to have a visual association with the real-world remote control 102.

Accordingly, the virtual character 104 is selected to have a visual association with the real-world remote control 102 such that the virtual character 104 has visual characteristics that correspond to the real-world visual characteristics of the real-world remote control 102. In this example, as shown in FIGS. 1C and 1D, the shape of the virtual character 104 corresponds to the real-world shape of the real-world remote control 102 and the mobile AR application 1000 is configured to display the shape of the virtual character 104 on the display 11 simultaneously with displaying the shape of the real-world remote control 102 on the display 11.

In some embodiments, the associated virtual character is selected to have a visual association with the particular real-world object such that a color of the associated virtual character corresponds to a real-world color of the particular real-world object.

In one example of implementation of this embodiment, the CVM 1040 may be be suitably trained to detect to extract color data 66 associated with the particular real-world object from the camera data acquired by the ODM 1010 in step 610. The color data 66 may be included stored in the memory 14 as part of the set of real-world object data 62. The color data 66 may include the color of the particular real-world object as represented in accordance with color conventions known in the art, for example according to the Pantone® Matching System, cyan/magenta/yellow/black (CMYK) values, Red/Green/Blue (RGB) values or hexadecimal code (HEX) values. The color data 66 may also include other information such as saturation data and/or lightness data.

During game design, the game designer may encode a designation of the color data 66 as a matching parameter for real-world objects which may be detected in the images captured by the ODM 1010. This designation may be encoded in the game data 35 stored in the memory 14.

As previously indicated, the color data 52 for each virtual character in the family of virtual characters 400 is included in the game data 35 stored in the memory 14 of the mobile device 10. The colour data 52 for each virtual character in the family of virtual characters 400 may include, but is not limited to, the color of the particular real-world object as represented in accordance with color conventions known in the art. The color data 52 may also include other information such as saturation data and/or lightness data.

During game design, the game designer may encode a designation of the color 52 as a matching parameter for the virtual characters in the library of virtual characters 400. The game designer may also encode a designation of the color data 52 of the virtual characters as the corresponding matching parameter for the color data 66 of the particular real-world object. This designation may be encoded in the game data 35 stored in the memory 14.

In one example, the color of the associated virtual character may correspond to the color of the particular real-world object based on matching of a value of (i) the color data 66 of the particular real-world object and (ii) the color data 52 of a given virtual character in the library of virtual characters 400.

In this example, at step 1910 the mobile AR application 1000 is configured to identify a matching parameter related to the particular real-world object. As such, the mobile AR application 1000 is accesses the memory 14 and identifies the color data 66 as the matching parameter related to the particular real-world object.

At step 1920, the mobile AR application 1000 is configured to identify a corresponding matching parameter related to the virtual characters in the library of virtual characters 400. As such, the mobile AR application 1000 accesses the memory 14 and identifies the color data 52 as the corresponding matching parameter for the color data 66 of the particular real-world object.

At step 1930, in this example, the mobile AR application 1000 is configured to compare and match a value of the color data 66 of the particular real-world object and a value of the color data 52 of a virtual character in the library of virtual characters 400. The mobile AR application 1000 may be configured to match the color data 52, 64 by comparing a set of data points associated with color data 66 associated with the real-world object and a corresponding set of data points associated with each of the virtual characters in the library of virtual characters 400 and identifying similarities between these data points. Upon detection of a number of similarities above a threshold number of similarities, the mobile AR application 1000 may consider the color data 66 of the real-world object to match the color data 52 of a given one of the virtual characters in the library of virtual characters 400. The threshold number of similarities may be set at the time of game design by the game designer and stored in the game data 35.

At step 1940, upon matching the color data 66 of the particular real-world object and the color data 52 of a given virtual character in the library of virtual characters 400, the mobile AR application 1000 is configured to select the given virtual character from the library of virtual characters 400, the given one of the virtual characters being selected to have a visual association with the particular real-world object.

The selection/matching algorithm 1900 will be described in accordance with a non-limiting example as for selecting the virtual character 104 for visual association with the real-world remote control 102 based on color data 66, 52.

At step 1910, the mobile AR application 1000 is configured to identify a matching parameter related to the real-world remote control 102. As such, the mobile AR application 1000 accesses the memory 14 and identifies the color data 66 associated with the real-world remote control 102 as the matching parameter related to the real-world remote control 102. In this case, the CVM 1040 is configured to extract the color data 66 for the remote control 102 from the camera data acquired by the ODM 1010 in step 610 of the method 600.

At step 1920, the mobile AR application 1000 is configured to identify a corresponding matching parameter related to the virtual characters in the library of virtual characters 400. The mobile AR application 1000 accesses the memory 14 and identifies the color data 52 of the virtual character as being the matching parameter for the virtual characters in the library of virtual characters 400 and as being the corresponding matching parameter for the color data 66 associated with the real-world remote control 102.

At step 1930, the mobile AR application 1000 is configured to compare and match a value of the color data 66 associated with the real-world remote control 102 with a value of the color data 52 for a given one of the virtual characters in the library of virtual characters 400. In this example, the mobile AR application 1000 compares a set of data points associated with color data 66 associated with the real-world remote control 102 and a corresponding set of data points associated with each of the virtual characters in the library of virtual characters 400 and detects similarities between these data points.

For the sake of the present example, it is assumed that the number of similarities detected by the AR application 1000 is above the required threshold number of similarities to categorize a match between the color data 66, 52. As such, the mobile AR application 1000 considers the color data 52 associated with the virtual character 104 to match the color data 66 associated with the real-world remote control 102.

At step 1940, upon matching the color data 66 associated with the real-world remote control 102 and the color data 52 associated with the virtual character 104, the mobile AR application 1000 selects the virtual character 104 for visual association with the real-world remote control 102.

Accordingly, the virtual character 104 is selected to have a visual association with the real-world remote control 102 such that the virtual character 104 has visual characteristics that correspond to the real-world visual characteristics of the real-world remote control 102. In this example, the mobile AR application 1000 is configured to display the color of the virtual character 104 on the display 11 simultaneously with displaying the color of the real-world remote control 102 on the display 11.

Additionally or alternatively to the visual characteristics described above, in some embodiments, the associated virtual character may be represented as having other characteristics associated with the particular real-world object, for example other visual, movement, audible and/or haptic characteristics. Examples relating to these characteristics will be discussed in further details below.

In some embodiments, the associated virtual character may have other visual characteristics associated with the particular real-world object. In one non-limiting example, if the particular real-world object is a light source (e.g., a lamp, a lightbulb, a candle, a flashlight etc.), the associated virtual character may be represented with a glowing effect.

In some embodiments, the associated virtual character may be represented as having movement in the AR gaming environment 1005, and such movement being substantially similar to expected movement of the particular real-world object (for example, as actuated under some physical force). As such, the associated virtual character may have movement characteristics that correspond to real-world movement characteristics of the particular real-world object. The mobile AR application 1000 is configured to display the movement characteristics of the associated virtual character on the display 11 simultaneously with displaying the particular real-world object on the display 11.

In one non-limiting example, if the particular real-world object is a pendulum, the associated virtual character generated may be represented such that it has the appearance of swinging about a fixed point. Other movement of the associated virtual character may be possible such that the associated virtual character may appear to move about the AR gaming environment 1005. A suitable collision detection model may be implemented to govern interactions between the associated virtual character and other real-world objects in the AR gaming environment 1005.

In some embodiments, the associated virtual character may have an audible association with the particular real-world object. As such, the associated virtual character may have audible characteristics that correspond to the real-world audible characteristics of the particular real-world object.

In one non-limiting example, if the particular real-world object is a balloon, the associated virtual character may be represented as having a voice mimicking the effect of a voice under the effect of helium gas. The sound of the voice may be emitted by the mobile device 10 (e.g., via the loudspeaker 20).

In some embodiments, the associated virtual character may have a haptic association with the particular real-world object. As such, the associated virtual character may have haptic characteristics that correspond to real-world haptic characteristics of the particular real-world object. The mobile AR application 1000 is configured to display the haptic characteristics of the associated virtual character on the display 11 simultaneously with displaying the particular real-world object on the display 11.

For example, the associated virtual character may be represented by haptic feedback representing a characteristic of the particular real-world object, the haptic feedback being emitted by the mobile device 10 (for example, via a haptic feedback module 54 and/or the display 11/the touchscreen 16 of the mobile device 10). For instance, the mobile device 10 may be configured to convey signals representing texture through interactions between the player 1 and the display 11/the touchscreen 16 of the mobile device 10. According to one non-limiting example, if the particular real-world object has a barbed texture (e.g., a real-world cactus), the associated virtual character may be visually represented such that it is perceived as being "spiky" and the player 1 may experience a sharp sensation as they touch the display 11/the touchscreen 16 of the mobile device 10.

The associated virtual character 104 may have been selected for visual, movement, audible and/or haptic association with the particular real-world object further to the selection/matching algorithm 1900 being executed by the at least one processor 12, as described above. During game design, in addition to designating one or more candidate real-world objects for each of the virtual characters in the library of virtual characters 400, the game designer may have additionally encoded one or more visual, movement, audible and/or haptic characteristics for each virtual character in the library of virtual characters 400 based on perceived visual, movement, audible and/or haptic characteristics of the one or more candidate real-world objects designated for each of the virtual characters in the library of virtual characters 400. These characteristics may comprise one or more candidate characteristics 56 encoded in the game data 35 by the game designer.

Upon selection of the virtual character for association with the particular real-world object as a result of the selection/matching algorithm 1900, the mobile AR application 1000 may further be configured to select one or more visual, movement, audible, haptic characteristics of the one or more candidate characteristics 56 and implement the characteristics for the associated virtual character. As such, the visual, movement, audible, haptic characteristics of the associated virtual character may be displayed on the display 11/emitted by the loudspeaker 20/implemented by the haptic feedback module 54 simultaneously with displaying the particular real-world object on the display 11.

In other embodiments, the mobile AR application 1000 may be configured to present the player 1 with an indication of the one or more candidate characteristics 56 via the display 11 of the mobile device 10 and the mobile AR application 1000 may be configured to provide the player 1 with the opportunity to provide player inputs in order to select one or more of the candidate characteristics 56 to be implemented for the associated virtual character. The mobile AR application 1000 may provide the opportunity to provide input via the GUI 48.

In other embodiments, rather than implementing the selection/matching algorithm 1900 to select a virtual character from the library of virtual characters 400 to have a visual association with the particular real-world object, the mobile AR application 1000 may be configured to randomly select a virtual character from the library of virtual characters 400 to have an association with the particular real-world object.

In yet further embodiments, the mobile AR application 1000 may be configured to modify the character data 37 of a virtual character from the library of virtual characters 400 which has been selected for association with the particular real-world object (either randomly or through implementation of the selection/matching algorithm 1900).

For example, the mobile AR application 1000 may be configured to modify one or more of the representation 88 of the virtual character such as the graphical representation, the numeric, the geometric or the mathematical representation. Additionally or alternative, the mobile AR application 1000 may be configured to modify the attributes 90 of virtual character, for example, the shape data 44, the color data 52, the imaging data, the position data, the material/texture data, the physical state data, the visibility data, the lighting data (e.g., direction, position, color and/or intensity), the sound data, the motion data, the collision data, the environment data, the timer data and/or other data associated with the virtual character.

In one example of implementation, rather than modifying the character data 37 of the given virtual character from the library of virtual characters 400 which has been selected by the mobile AR application 1000, a duplicate of the character data 37 may be made and stored in the memory 14 and the duplicate of the character data 37 may be modified.

In another example of implementation of this embodiment, the character data 37 of the given one of the virtual characters in the library of virtual characters 400 may be modified such that the given one of the virtual characters has visual characteristics which correspond to the real-world visual characteristics of the particular real-world object. Accordingly, the character data 37 of the given one of the virtual characters may be modified such that the given one of the virtual characters has a visual association with the particular real-world object.

For example, the character data 37 of a given one of the virtual characters in the library of virtual characters 400 may be modified such that the shape data 44 and/or the color data 52 of the given one of the virtual characters in the library of virtual characters 400 respectively corresponds to the shape data 64 and/or the color data 66 of the particular real-world object.

An example of implementation of this embodiment will now be described in further detail. This implementation will be described with respect to modification of the shape data 44 however it should be appreciated that this implementation may additionally or alternatively include modification of the color data 52 of the given one of the virtual characters in the library of virtual characters 400.

In this example, the CVM 1040 may be suitably trained to detect a shape of the particular real-world. For instance, the CVM 1040 may be configured to extract the shape data 64 associated with the particular real-world object from the camera data acquired in step 610 of the method 600.

The mobile AR application 1000 may further be configured to select a given one of the virtual characters in the library of virtual characters 400 for association with the particular real-world object. In this example, the selection is assumed to be random. In other examples, the selection may have been made by implementing the selection/matching algorithm 1900 described above.

The mobile AR application 1000 is configured to access the shape data 44 stored in the memory 14 associated with the given one of the virtual characters in the library of virtual characters 400. In this example, the mobile AR application 1000 is configured to modify the shape data 44 stored in the memory 14 associated with the given on of the virtual characters in library of virtual characters 44 such that the shape data 44 is identical to the shape data 64 associated with the particular real-world object.

Accordingly, the given one of the virtual characters in the library of virtual characters 400 is selected and the character data 37 associated with the given one of the virtual characters has been modified such that the given one of the virtual characters has a visual association with the particular real-world object.

In other embodiments, the mobile AR application 1000 may be configured to "create" the associated virtual character rather than selecting it from the library of virtual characters 400.

In one example, the associated virtual character may be "created" by selecting character attributes from a character attributes database 68. In this example, during game design, the game designer may encode in the game data 35 the character attributes in the character attributes database 68. The character attributes may correspond to character data 37 for a virtual character. As such, the character attributes database 68 may comprise a plurality of representations 88 including graphical representations of the virtual character or numeric, geometric or mathematical representation. The character attributes database 68 may also store a plurality of attributes 90 such as shape data 44, color data 52, imaging data, position data, material/texture data, physical state data, visibility data, lighting data (e.g., direction, position, color and/or intensity), sound data, motion data, collision data, environment data, timer data and/or other data associated with the virtual character.

In this example, the mobile AR application 1000 is configured to select one or more attributes from the character attributes database 68 to store as the character data 37 in the memory 14 associated with the virtual character to be "created" for association with the particular real-world object. In this instance, the mobile AR application 1000 randomly selects the one or more attributes from the character attributes database 68.

Once the mobile AR application 1000 has selected the one or more attributes from the character attributes database 68 to store as the character data 37, an associated virtual character has been "created" for visual association with the particular real-world object In some embodiments, the associated virtual character may be "created" to have a visual association with the particular real-world object. In other words, the associated virtual character may have visual characteristics that correspond to the real-world visual characteristics of the particular real-world object.

For example, the character data 37 of the associated virtual character may be selected by the mobile AR application 1000 such that the shape data 44 and/or the color data 52 of the associated virtual character respectively corresponds to the shape data 64 and/or the color data 66 of the particular real-world object.

An example of implementation of this embodiment will now be described in further detail. This implementation will be described with respect to the determination of the shape data 44 of the associated virtual character "created" by the mobile AR application 1000 however it should be appreciated that this implementation may additionally or alternatively include the determination of the color data 52 of the associated virtual character "created" by the mobile AR application 1000.

In this example, the CVM 1040 may be suitably trained to detect a shape of the particular real-world object. For instance, the CVM 1040 may be configured to extract shape data 64 associated with the particular real-world object from the camera data acquired in step 610 of the method 600. The shape data 64 of the particular real-world object may be stored in the memory 14.

The mobile AR application 1000 is configured to access the shape data 64 of the particular real-world object stored in the memory 14 is configured to generate the shape data 44 for the associated virtual character such that the shape data 44 is identical to the shape data 64 associated with the particular real-world object. The shape data 44 for the associated virtual character is stored in the memory 14.

Once the mobile AR application 1000 has generated the character data 37, an associated virtual character has been "created" for visual association with the particular real-world object.

The mobile AR application 1000 may also be configured to maintain a record of the particular real-world object and the associated virtual character in the memory 14. Accordingly, with reference to FIGS. 11-13, various tables stored in the memory 14 may contain information regarding the set of detectable real-world objects 58, the associated virtual character and the relationship between the particular real-world object and the associated virtual character.

Specifically, with reference to FIG. 11, a table 1100 stored in the memory 14 may contain information regarding the library of real-world objects 300 including information regarding each of the real-world objects in the set of detectable real-world objects 58. Each of the real-world objects in the table 1100 may be identified by the object name $50_x$ as shown in column 1101. Additionally, the real-world objects in the set of detectable real-world objects 58 which have been detected by the ODM 1010 may be identified by an object ID 1111.

The table 1100 may include a column 1105 indicating the object family $501_x$ to which each of the real-world objects belong. The object label $60_x$ assigned to the real-world objects by the CVM 1040 may be included in a column of the table 1100 (for example, column 1107 of FIG. 11). The object label $60_x$ may be assigned by the CVM 1040 as a result of the given real-world object being detected. For example, the real-world remote control 102 may be part of a 'living room' object family $501_x$ and may be assigned a 'remote control' object label $60_x$. Other suitable forms of categorization of the real-world objects may be implemented.

As will be further described below, the output of the CVM 1040 may be configured to include a degree of confidence 800 which represents the level of certainty with which the CVM 1040 has correctly identified the real-world object. The degree of confidence 800 may be stored in the memory 14 and this information may be included in column 1113 of table 1100.

As will also be discussed below, a composition of the set of detectable real-world objects 58 may vary over time. Thus, the table 1100 may include an indication of whether a real-world object is currently part of the set of detectable real-world objects 58. For example, this information may be stored in column 1103 of table 1100.

The table 1100 may also include an indication of whether a real-world object in the library of real-world objects 300 has been detected and/or whether the associated virtual character has been released from/spawned by the real-world object. Additionally, information about the status of each of the real-world objects in the library of real-world objects 300 has (e.g., whether it has been detected, whether it has not been detected, whether it is undetectable as it is not part of the set of detectable real-world objects 58) may be included in the table 1100.

With reference to FIG. 12, a table 1200 stored in the memory 14 may contain information regarding each virtual character in the library of virtual characters 400. Each of the virtual characters in the table 1200 may be identified by a name/an object ID 1201.

As indicated above, in some embodiments, the mobile AR application 1000 may be configured to categorize each virtual character into families of virtual characters $700_x$ ("virtual character families"). The table 1200 may indicate the family of virtual characters $700_x$ to which each virtual character belongs. This information may be included in table 1200, for example in column 1203.

The table 1200 may also contain information related to the candidate real-world object labels $42_x$, the character data 37 and the candidate characteristics 58 discussed above.

This information may be included in the columns 1205, 1207 and 1209 of the table 1200, respectively.

The table 1200 may also contain an indication of a status of each of the virtual characters, for example, if the virtual character has been generated from/spawned by a particular real-world object or if it is deemed locked by the mobile AR application 1000 and as such cannot be generated from/spawned by a particular real-world object (as shown in FIG. 12, in column 1207 of table 1200)

With reference to FIG. 13, a table 1300 stored in the memory 14 may contain information regarding the connection or association between the particular real-world object and the associated virtual character. The table 1300 may include an indication of the particular real-world object and the associated virtual character generated from/spawned by the particular real-world object. For example, the table 1300 may associate the object IDs of the real-world object and the virtual object (as shown in FIG. 13, in columns 1301 and 1303 of table 1300). Additional information such as an object label $60_x$ of the real-world object and the object family $501_x$ to which the real-world object belongs may be included in the table 1300 (as shown in FIG. 13, in columns 1305 and 1307 of table 1300).

As will be further discussed below, the mobile AR application 1000 may be configured to attribute a point value to the particular real-world object and/or to the associated virtual character. The information regarding the point value may be stored in table 1300 (fore example, in column 1311).

The table 1300 may also include an indication of a player who has detected the real-world object (column 1313) and a time at which the associated virtual character was generated in the AR gaming environment 1005 (column 1315).

The table 1300 may also include an indication of spatial coordinates $(XYZ)_{RW}$ of the particular real-world object and of spatial coordinates $(XYZ)_1$ of the player at a time of generation $t=t_{gen}$ of the associated virtual character. The spatial coordinates $(XYZ)_{RW}$ of the particular real-world object may be stored in the memory 14 as part of the real-world object data 62. The table 1300 may also include an indication of a distance between the player 1 and the particular real-world object at a time of detection $t=t_{det}$ of the real-world object.

The table 1300 may also include an indication of the current spatial coordinates $(XYZ)_{RW}$ of the particular real-world object and an indication of the current spatial coordinates $(XYZ)_{VC}$ of the associated virtual character released from/spawned by the particular real-world object.

The mobile AR application 1000 may also be configured to generate visual effects corresponding to the associated virtual character being released from/spawned by the particular real-world object. A non-limiting example of a visual effect comprises a "virtual flourish", indicating that the associated virtual character is about to be released from/spawned by the particular real-world object. Such virtual flourish can include, but is not limited to, a Computer Generated Imagery (CGI) element being displayed on the display 11 in the vicinity of the particular real-world object, an auditory and/or haptic signal generated on the mobile device 10, or any other signal suitable for indicating to the player 1 that the associated virtual character is about to be released from/spawned by the particular real-world object.

The mobile AR application 1000 may be configured to represent the associated virtual character by a CGI element that appears together with motion lines to provide an effect which aims to indicate to the player 1 that the associated virtual character is being released from/spawned by the particular real-world object. The associated virtual character may emanate from the anchor 46 that was created at step 640. In some embodiments, this effect can be further enhanced by way of an effect which increases the size of the associated virtual character as the distance between the associated virtual character and the particular real-world object is increased. In some embodiments, other effects may also be added, including, but not limited to, changing "facial expressions" on the associated virtual character, such as grimacing, opening or closing of eyes, etc.

In the illustrated example embodiment, as shown in FIG. 1B, the mobile AR application 1000 may be configured to generate a virtual flourish 103 (e.g., "sparkles") indicating that the virtual character 104 is about to be released from the real-world remote control 102.

As shown in FIG. 1C, the virtual character 104 appears together with motion lines 105 to provide an effect which aims to indicate to the player 1 that the virtual character 104 is being "generated from" the real-world remote control 102. Also, between FIGS. 1C and 1D, the size of the virtual character 104 is increased as the distance between the virtual character 104 and the real-world remote control 102 is increased. In addition, the virtual character 104 is portrayed with "eyes" that are shown to change from closed to open between images 100C and 100D in FIGS. 1C and 1D. Finally, FIG. 1D shows the virtual character 104 having been fully released from the real-world remote control 102.

Other effects may also be added in other embodiments described below with respect to the particular real-world object and the associated virtual character.

For example, an effect which conveys the appearance of the associated virtual character being released from/spawned by the particular real-world object may be added. For instance, the mobile AR application 1000 may be configured to create an effect according to which the associated virtual character appears to "escape" from an aperture in the particular real-world object. In yet another example, an effect of resistance may be created such that player input may be required to "pull" the associated virtual character out of the particular real-world object. In other embodiments, any of the aforementioned effects, or a combination thereof, may be further enhanced by way of an effect which sees the associated virtual character being stretched as it is progressively "extracted" from the particular real-world object, before regaining its normal shape. Additional effects may include an appearance of a transformation of the particular real-world object into the associated virtual character. For example, the particular real-world object may appear to fold or unfold into the associated virtual character.

In other embodiments, the mobile AR application 1000 may be configured to display information relating to the associated virtual character on the display 11 of the mobile device 10 as it is being generated or after it has been released from/spawned by the particular real-world object. Such information may include, but is not limited to, a name of the associated virtual character, a point value of the associated virtual character or a name of a "virtual character collection" to which a virtual character belongs (as described in more detail below).

In order to accentuate the appearance of the above-described effects, the mobile AR application 1000 may be configured to alter the image presented on the display 11 to make it appear out of focus or darkened while the associated virtual character is being released from/spawned by the particular real-world object.

Once the associated virtual character has been released from/spawned by the particular real-world object, the anchor 46 placed generally at the position of the particular real-world object may be removed.

The next step is step 660.

Step 660

In some embodiments, the mobile AR application 1000 may be configured to advance the player's gameplay further to the associated virtual character being released from/spawned by the particular real-world object.

Figure 5:
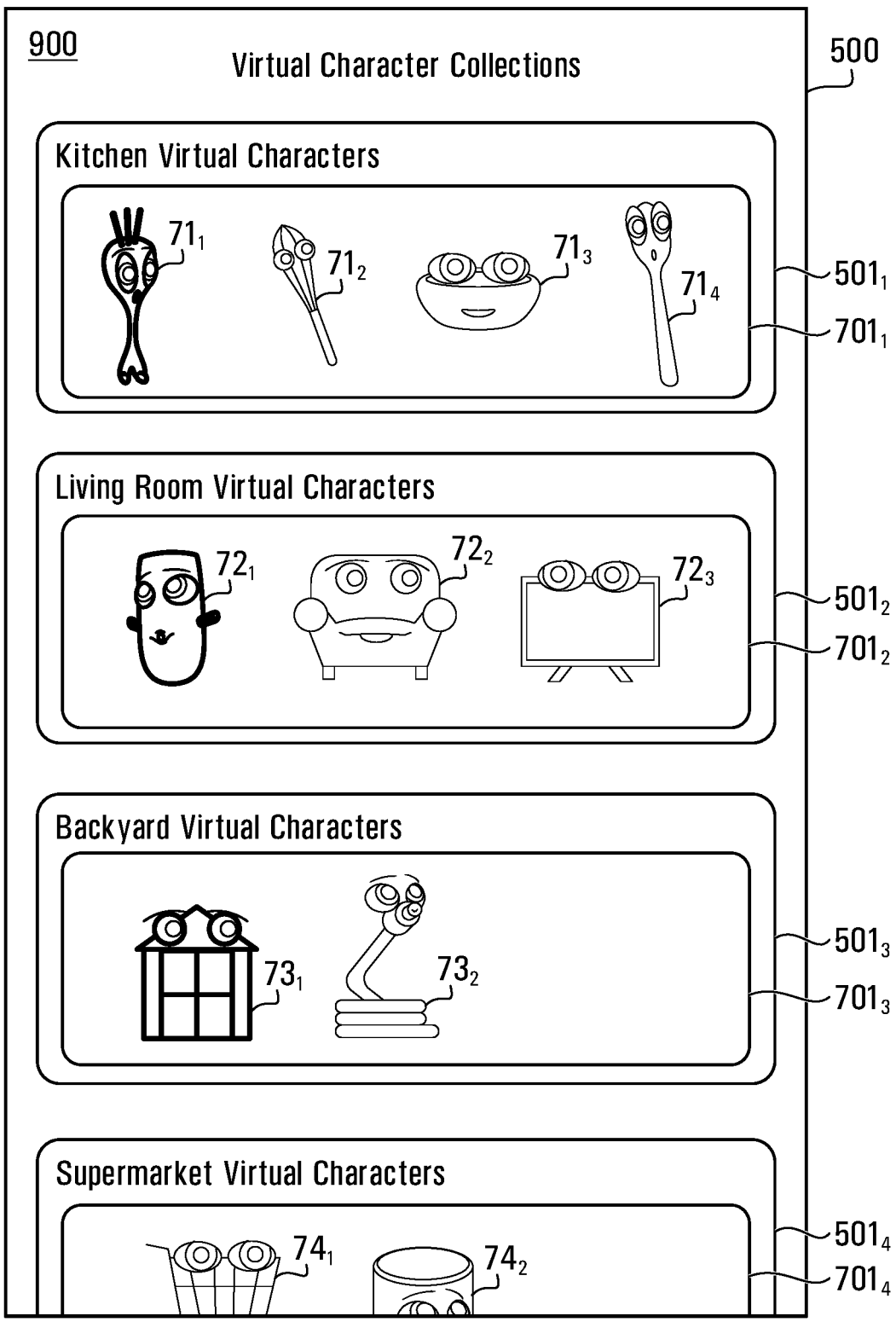
FIG. 5 depicts another non-limiting example content of a virtual character collection screen generated by the AR application.

For example, the associated virtual character may be considered "collected", and the mobile AR application 1000 may increase the player's score or may add the associated virtual character to a "virtual character collection" associated with the player 1. With reference to FIG. 5, the virtual character collection 900 may be a data container in which various aspects of gameplay may be recorded and presented to the player 1, for example on a "virtual character collection screen" 500.

In some embodiments, the mobile AR application 1000 may be configured to provide the player 1 with an opportunity to provide input to access the virtual character collection screen 500. For example, input may be provided by the player 1 via the GUI 48 to access the virtual character collection screen 500. Responsive to the player input, the mobile AR application 1000 may be configured cease displaying the images of the scene that are being captured and presented by the mobile AR application 1000 on the display 11 of the mobile device 10 and to begin displaying the virtual character collection screen 500. Similarly, when the virtual character collection screen 500 is displayed on the display 11 of the mobile device 10, player input may be provided by the player 1 via the GUI 48 to cease displaying the virtual character collection screen 500 and to begin displaying the images of the scene that are being captured and presented by the mobile AR application 1000 on the display 11.

Collected virtual characters may be highlighted in some way or may be presented in bold (for example, as shown in FIG. 5). Other methods of conveying to the player 1 that certain virtual characters have been collected may be used.

During the gaming session, the mobile AR application 1000 may also be configured to maintain a record of all real-world objects which have an association with a virtual character. The mobile AR application 1000 may also be configured to maintain a record of the real-world objects in the set of detectable real-world objects 58 that have yet to be detected during the gaming session. The mobile AR application 1000 may also be configured to keep a record of the virtual characters which may be associated with the real-world objects in the set of detectable real-world objects 58 that have yet to be detected during the gaming session. Any combination of similar information may be shown on the virtual character collection screen 500 and presented to the player 1.

The mobile AR application 1000 may further be configured to present each virtual character family $700_x$ to the player 1 through the virtual character collection screen 500. In particular, the virtual character collection screen 500 may present information relating to the player's virtual character collection 900, and may further present the virtual characters $71_x$, $72_x$, $73_x$, $74_x$, $75_x$ in object families $501_x$, which, as described above, may be related to physical locations in the real-world (for example virtual characters $71_x$, of object family $501_1$ and virtual characters $72_x$ of object family $72_x$).

In some embodiments, gameplay can be further advanced by the unlocking of additional virtual character families $700_x$. For example, unlocking additional virtual character families $700_x$ may be a result of the player 1 having collected a given number of virtual characters and/or the player 1 having collected all the virtual characters in a given virtual character family $700_x$. In another example, unlocking additional virtual character families $700_x$ may also be a result of detecting a specific combination of real-world objects. For example, the specific combination of real-world objects may be identified as a specific combination of object labels $60_x$ (assigned to real-world objects) or a threshold number of real-world objects part of one or more object families $501_x$ may be required to proceed.

Returning now to the situation in which the associated virtual character has been released from/spawned by the particular real-world object (see step 650), the associated virtual character may be added to the virtual character collection 900. This may be done by the mobile AR application 1000 autonomously, without player input, for example immediately or after a predetermined time delay following its release/spawning. In other embodiments, input from the player 1 may be required in order for the associated virtual character to be added to the virtual character collection 900. For example, the player 1 may be required to touch the associated virtual character on the display 11/the touchscreen 16, or to touch the particular real-world object associated with the associated virtual character (which would be detected by the camera), or to touch some other portion of the display 11/the touchscreen 16.

In some embodiments, a real-world object may be designated as a real-world representation of the virtual character collection 900. For example, a real-world object from a family of objects $501_x$ categorized as "storage" (e.g., a drawer, a cabinet, a box, etc.) may be associated with the virtual character collection 900. As such, the virtual character collection screen 500 comprising the virtual character collection 900 may appear as being released from/spawned by the real-world object. Additionally, as virtual characters are collected, the mobile AR application 1000 may be configured to cause an effect whereby such collected virtual characters are represented as moving towards and/or into the real-world object when they are to be added to the virtual character collection 900.

In other embodiments, the player's gameplay may be further advanced using a point-based system. For instance, the player 1 may be required to accumulate points to unlock further virtual character families $700_x$ once a threshold number of points has been met.

Returning now to the situation in which the associated virtual character has been released from/spawned by the particular real-world object (see step 650), the mobile AR application 1000 may be configured to attribute a point value to the particular real-world object and/or to the associated virtual character. In some embodiments, the point value may be attributed based on a concentration of real-world objects in the scene. For example, if the particular real-world object is located in an area of higher concentration of detectable real-world objects (in terms of a number of detectable real-world objects per unit area or per unit volume that exceeds a predetermined threshold), then the attributed point value may be lower than if the particular real-world object were located in an area of lower concentration of detectable real-world objects.

In other embodiments, the point value may depend on the physical distance between the player 1 and the particular real-world object, relative to other detectable real-world objects in the scene. For example, given two detectable real-world objects at different physical distances from the player, a lower point value would be attributed to an associated virtual character released from/spawned by the closer of the two detectable real-world objects. This may impel player 1 to move physically (in the real world) in order to achieve a higher score.

In other embodiments, the point value attributed to the associated virtual character release from/spawned by the particular real-world object may change as a function of time. For example, the point value may decrease as a function of the duration of time required for the player 1 to find/detect the particular real-world object. The duration of time may be computed from a time of launch of the mobile AR application 1000 or a set amount of gameplay time.

In another example, if a plurality of detectable real-world objects detected in the camera images, a point value of the virtual characters released from/spawned by each of the real-world objects may be based a count of a particular object label $60_x$ assigned to each of the plurality of real-world objects. For example, given three detectable real-world objects assigned an object label $60_1$ and one detectable real-world object assigned an object label $60_2$, a point value associated with the detectable real-world object assigned object label $60_2$ may be higher than a point value associated with the detectable real-world objects assigned object label $60_1$.

It will be appreciated by the skilled reader that the above-described method of generating a virtual character 104 and effects described with respect to virtual character (i.e., steps 610 to 660) may be applied to virtual characters 204, 304, 404 of FIGS. 2A to 2B, 3A to 3E and 4A to 4C. As shown in FIGS. 1A to 1D, 2A to 2B, 3A to 3E and 4A to 4C, each virtual character (or virtual character) 104, 204, 304, 404 can be released from/associated with a different real-world object 102, 202, 302, 402, respectively.

Figure 2A:
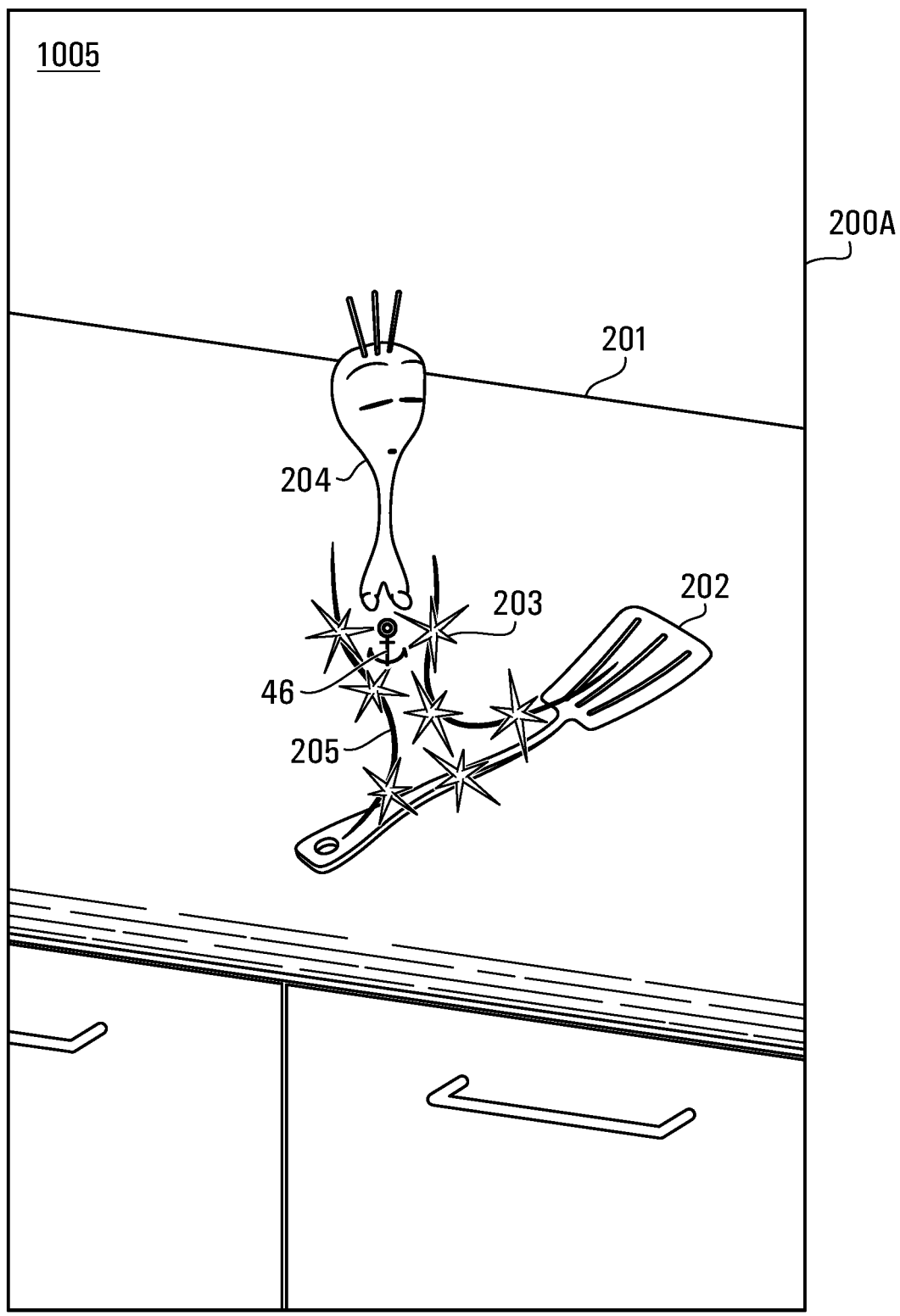
FIGS. 2A and 2B illustrate images of a second scene presented by the AR application, in accordance with a non-limiting embodiment.

For example, FIG. 2A shows an image 200A of a scene that may be captured and presented by the mobile AR application 1000 on the display 11 of the mobile device 10. The image 200A is shown to include a real-world cabinet 201 and a real-world spatula 202.

In the illustrated example embodiment, the camera images include the real-world cabinet 201 and the real-world spatula 202. For the sake of the present example, only the real-world remote spatula 202 is assumed to be in the set of detectable real-world objects 58.

At step 610, the ODM 1010 captures images from the camera feed (i.e. a video frame) of the mobile device 10. At step 620, the mobile AR application 1000 is configured to process the camera images received and eventually the real-world spatula 202 is detected in the scene at step 630 as a result of a positive output of the CVM 1040. At step 640, the AR API 1020 of the mobile AR application 1000 is configured to provide an anchor 46 to be established generally at the position of the real-world spatula 202 to provide an anchor for an eventual virtual character 204 to be associated with the real-world spatula 202.

At step 650, the mobile AR application 1000 creates an association between the real-world spatula 202 and the virtual character 204. In this example, the associated virtual character 204 is selected to have a visual association with the real-world spatula 202 such that a shape of the virtual character 204 corresponds to a shape to the real-world spatula 202. The virtual character 204 may have been selected from the library of virtual characters 400 in accordance with the selection/matching algorithm 1900 executed by the at least one processor 12 or may have been "created" by the mobile AR application 1000, as described above.

A visual effect, namely a virtual flourish 203, corresponding to the virtual character 204 being released from/spawned by the real-world spatula 202 is shown in FIG. 2A. The virtual character 204 appears together with motion lines 205 to provide an effect which aims to indicate to the player 1 that the virtual character 204 is being "generated from" the real-world spatula 202.

Figure 2B:
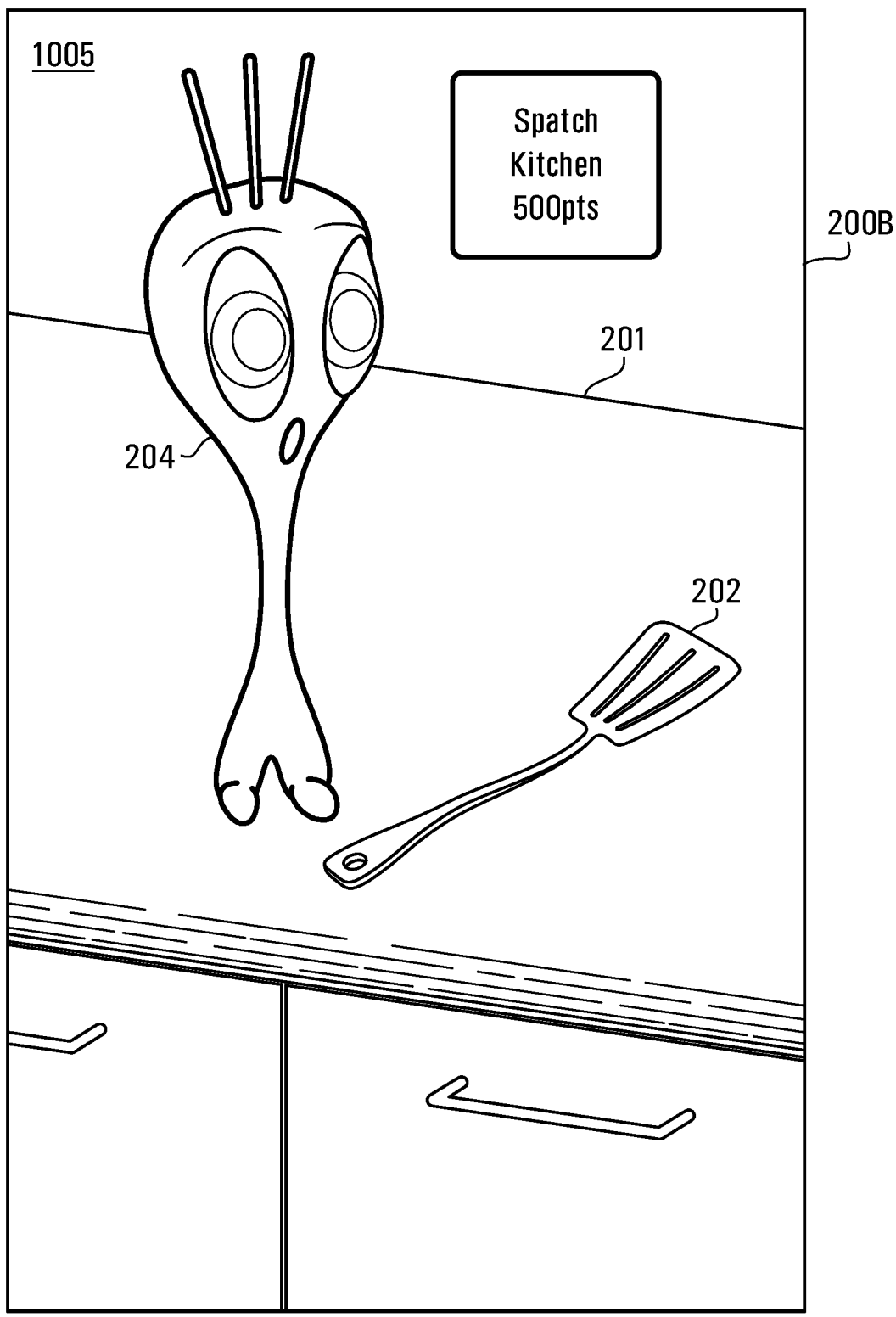

As shown in the illustrated embodiment presented in FIG. 2B, attributes related to the virtual character 204 are displayed on the display 11 of the mobile device 10 after it has been released from/spawned by the real-world spatula 202. In this embodiment, the mobile AR application 1000 is configured to display a name/identifier of the virtual character 204 (i.e., "spatch" in FIG. 2B), a point value of the virtual character 204 (i.e., "500 pts" as shown in FIG. 2B) and a name of a "virtual character collection" to which a virtual character 204 belongs (i.e., "Kitchen" as shown in FIG. 2B).

Once, the virtual character 204 has been released from/spawned by the real-world spatula 202, the virtual character 204 may be added to the virtual character collection 900.

Figure 3A:
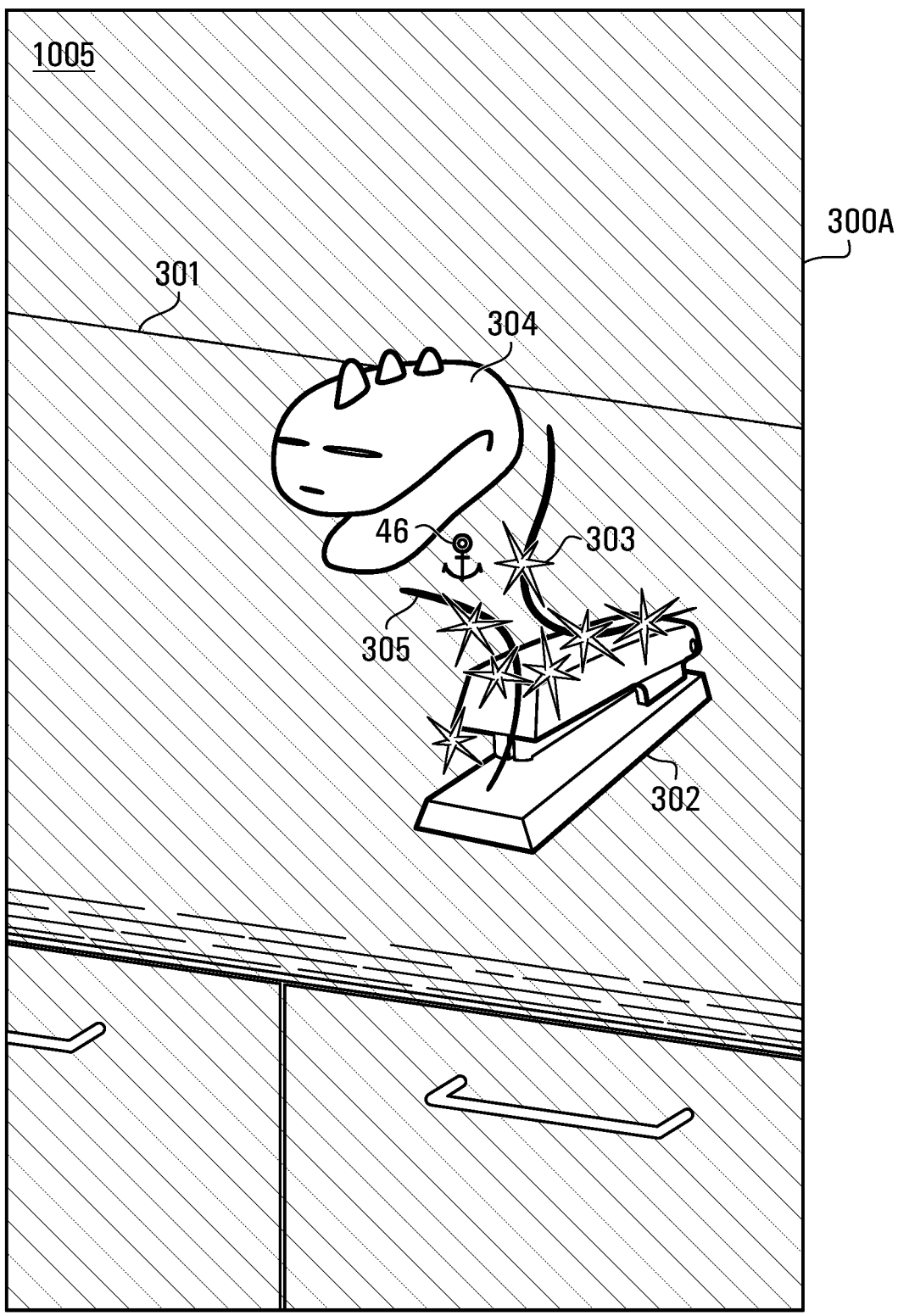
FIGS. 3A to 3D illustrate images of a third scene presented by the AR application, in accordance with a non-limiting embodiment.

In another example, FIG. 3A shows an image 300A of another scene that may be captured and presented by the mobile AR application 1000 on the display 11 of the mobile device 10. The image 300A is shown to include a real-world cabinet 301 and a real-world stapler 302.

In the illustrated example embodiment, the camera images include the real-world cabinet 301 and the real-world stapler 302. For the sake of the present example, both the real-world stapler 302 and the real-world cabinet 301 are assumed to be in the set of detectable real-world objects 58.

At step 610, the ODM 1010 captures images from the camera feed (i.e. a video frame) of the mobile device 10. At step 620, the mobile AR application 1000 is configured to process the camera images received and eventually the real-world stapler 302 is detected in the scene at step 630 as a result of a positive output of the CVM 1040. At step 640, the AR API 1020 of the mobile AR application 1000 is configured to provide an anchor 46 to be established generally at the position of the real-world stapler 302 to provide an anchor for an eventual virtual character 304 to be associated with the real-world stapler 302.

At step 650, the mobile AR application 1000 creates an association between the real-world stapler 302 and the virtual character 304. In this example, the associated virtual character 304 is selected to have a visual association with the real-world stapler 302 such that a shape of the virtual character 304 corresponds to a shape to the real-world stapler 302. The virtual character 304 may have been selected from the library of virtual characters 400 in accordance with the selection/matching algorithm 1900 executed by the at least one processor 12 or may have been "created" by the mobile AR application 1000, as described above.

A visual effect, namely a virtual flourish 303, corresponding to the virtual character 304 being released from/spawned by the real-world stapler 302 is shown in FIG. 3A. The virtual character 304 appears together with motion lines 305 to provide an effect which aims to indicate to the player 1 that the virtual character 304 is being "generated from" the real-world stapler 302.

Additionally, in order to accentuate the appearance of the virtual flourish 303 and the motion lines 305, in this embodiment, the mobile AR application 1000 is configured to alter the image presented on the display 11 to make it appear darkened while the virtual character 304 is being released from/spawned by the real-world stapler 302.

Once, the virtual character 304 has been released from/spawned by the real-world stapler 302, the virtual character 304 may be added to the virtual character collection 900. FIG. 3E shows the virtual character collection screen 500 in which the virtual character collection 900 is shown. The virtual character collection screen 500 shows the virtual character 304 part of an object family $501_5$. The virtual character 304 is virtual character 304 part of virtual character family $700_5$.

Figure 3B:
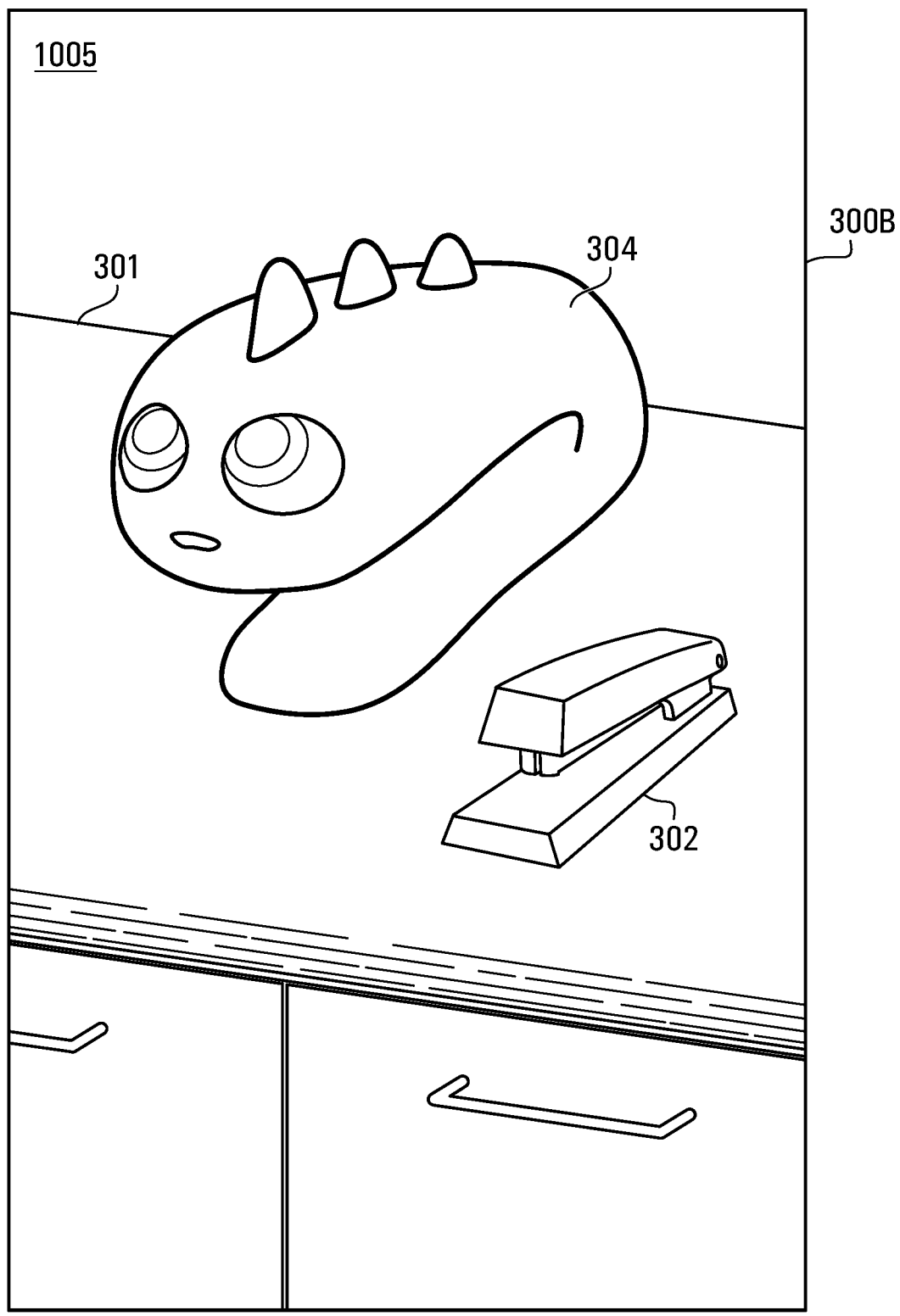

In the illustrated embodiment of FIG. 3B, a real-world object has been for association with a virtual object representing the virtual character collection 900. As such, in this embodiment, a real-world cabinet 301 is configured to have an association with a virtual object representing the virtual character collection 900. As such, as shown in FIG. 3C the virtual character collection screen 500 comprising the virtual character collection 900 appears as being released from/spawned by the real-world cabinet 301, as will be further described below.

Accordingly, at step 610, the ODM 1010 captures images from the camera feed (i.e. a video frame) of the mobile device 10. At step 620, the mobile AR application 1000 is configured to process the camera images received and eventually the real-world cabinet 301 is detected in the scene at step 630 as a result of a positive output of the CVM 1040. Prior to proceeding to step 640, the mobile AR application 1000 may be configured to determine whether the object label $60_x$ assigned to the real-world cabinet 301 corresponds to an object label $60_x$ assigned to a real-world object part of the set of detectable real-world objects 58 categorized as a candidate object family (for example, a family of objects $501_x$ categorized as "storage"). In the affirmative, the method proceeds to step 640 wherein the AR API 1020 of the mobile AR application 1000 is configured to provide an anchor 46 to be established generally at the position of the real-world cabinet 301 to provide an anchor for an eventual virtual object 804 representing the virtual character collection 900.

Figure 3C:
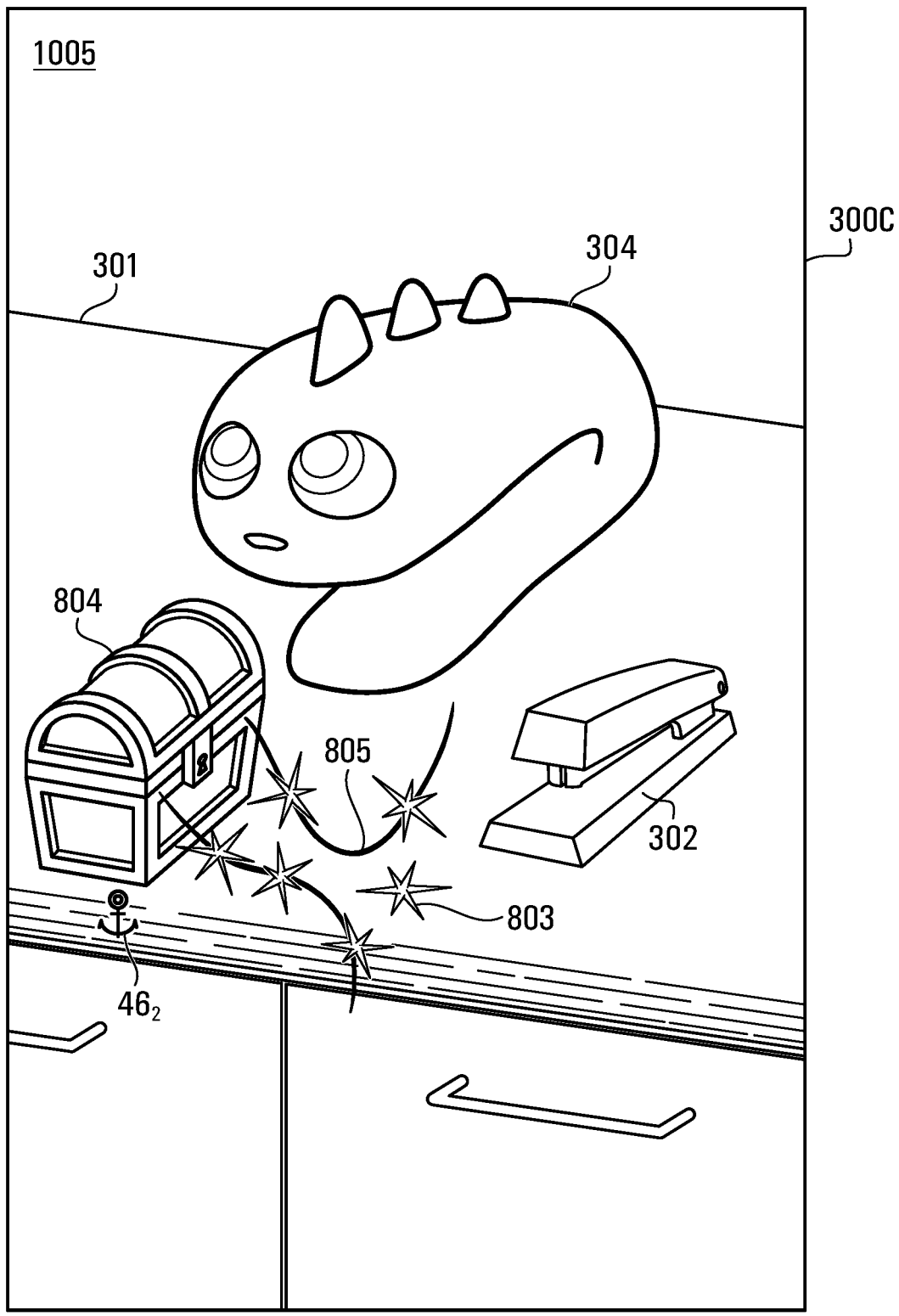

At step 650, the mobile AR application 1000 creates a record in the memory 14 associating the real-world cabinet 301 and the virtual object 804 representing the virtual character collection 900, as shown in FIG. 3C.

A visual effect, namely a virtual flourish 803, corresponding to the virtual object 804 being released from/spawned by the real-world cabinet 301 is shown in FIG. 3A. The virtual character 803 appears together with motion lines 805 to provide an effect which aims to indicate to the player 1 that the virtual object 804 is being "generated from" the real-world cabinet 301.

Figure 3D:
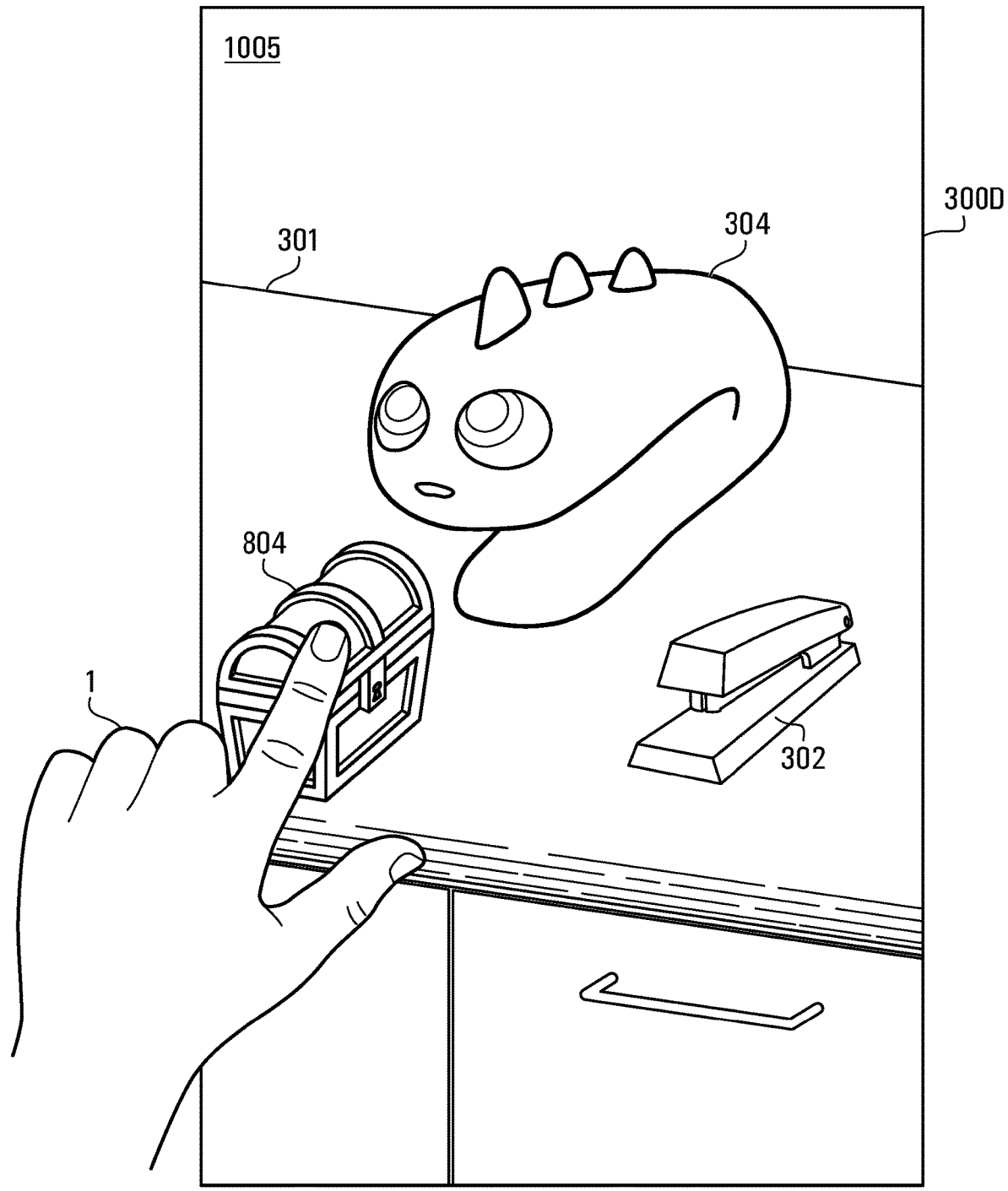
Figure 3E:
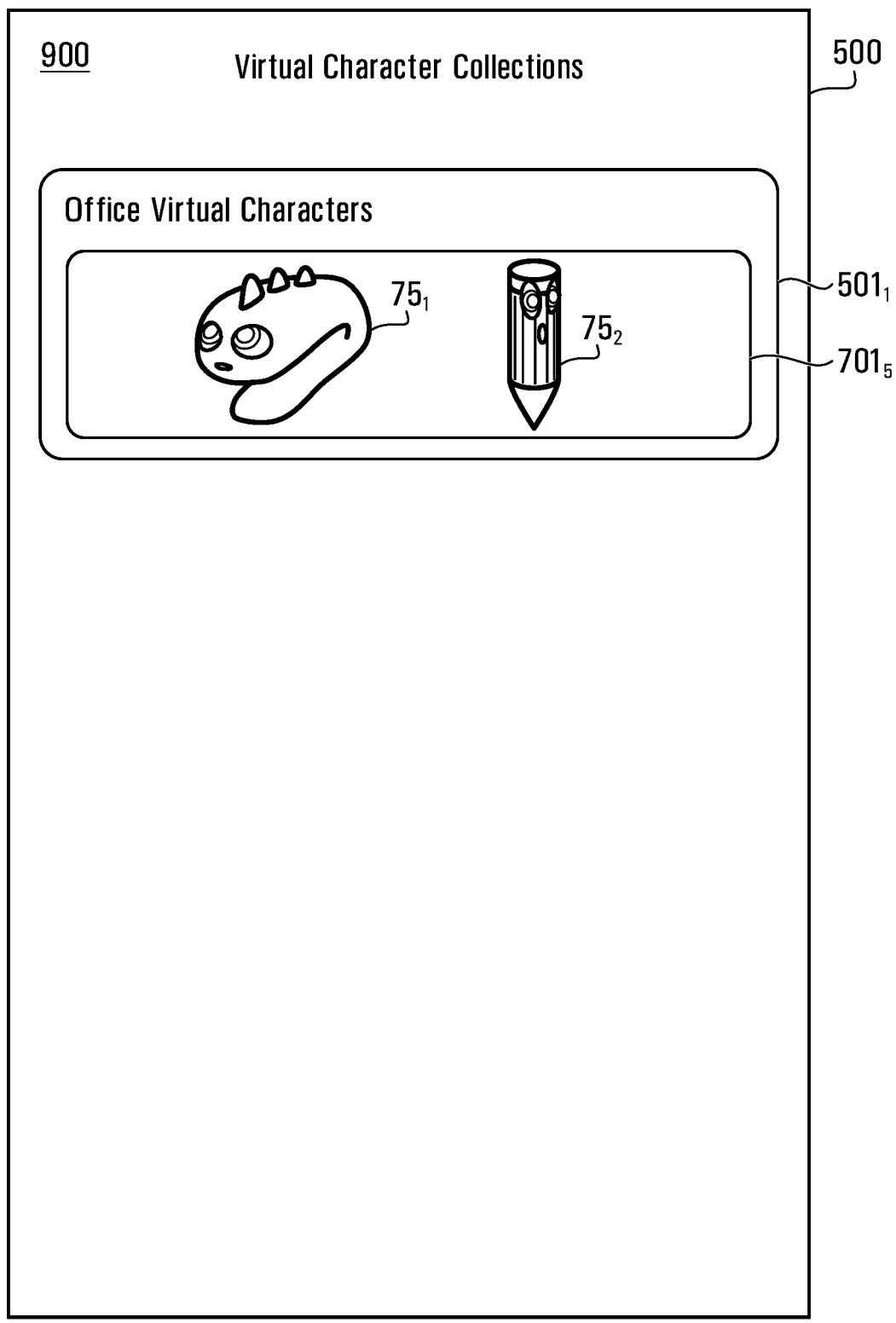
FIG. 3E depicts a non-limiting example content of a virtual character collection screen generated by the AR application.

The mobile AR application 1000 may be configured to provide the player 1 with an opportunity to provide activation input via the virtual object 804 to cause the virtual character collection screen 500 to be displayed to the player 1 and to show the virtual character collection 900. For example, the player 1 may provide activation input by touching the virtual object 804, as shown in FIG. 3D. Upon detection of the activation input from the player 1, the mobile AR application 1000 may be configured to display the virtual character collection screen 500 to present the virtual character collection 900 to the player 1, as shown in FIG. 3E.

Figure 4A:
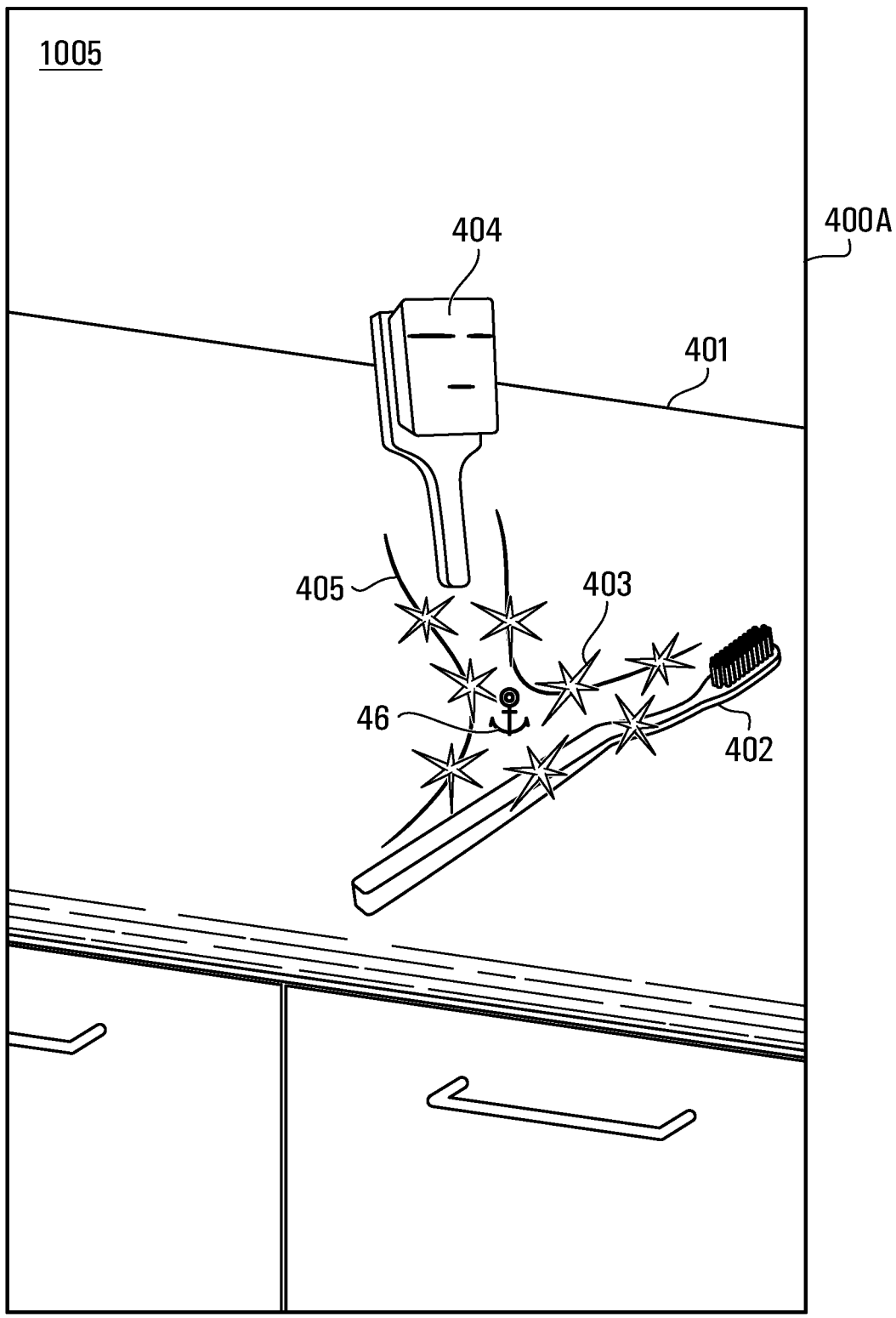
FIGS. 4A to 4C illustrate images of a fourth scene presented by the AR application, in accordance with a non-limiting embodiment.
Figure 4B:
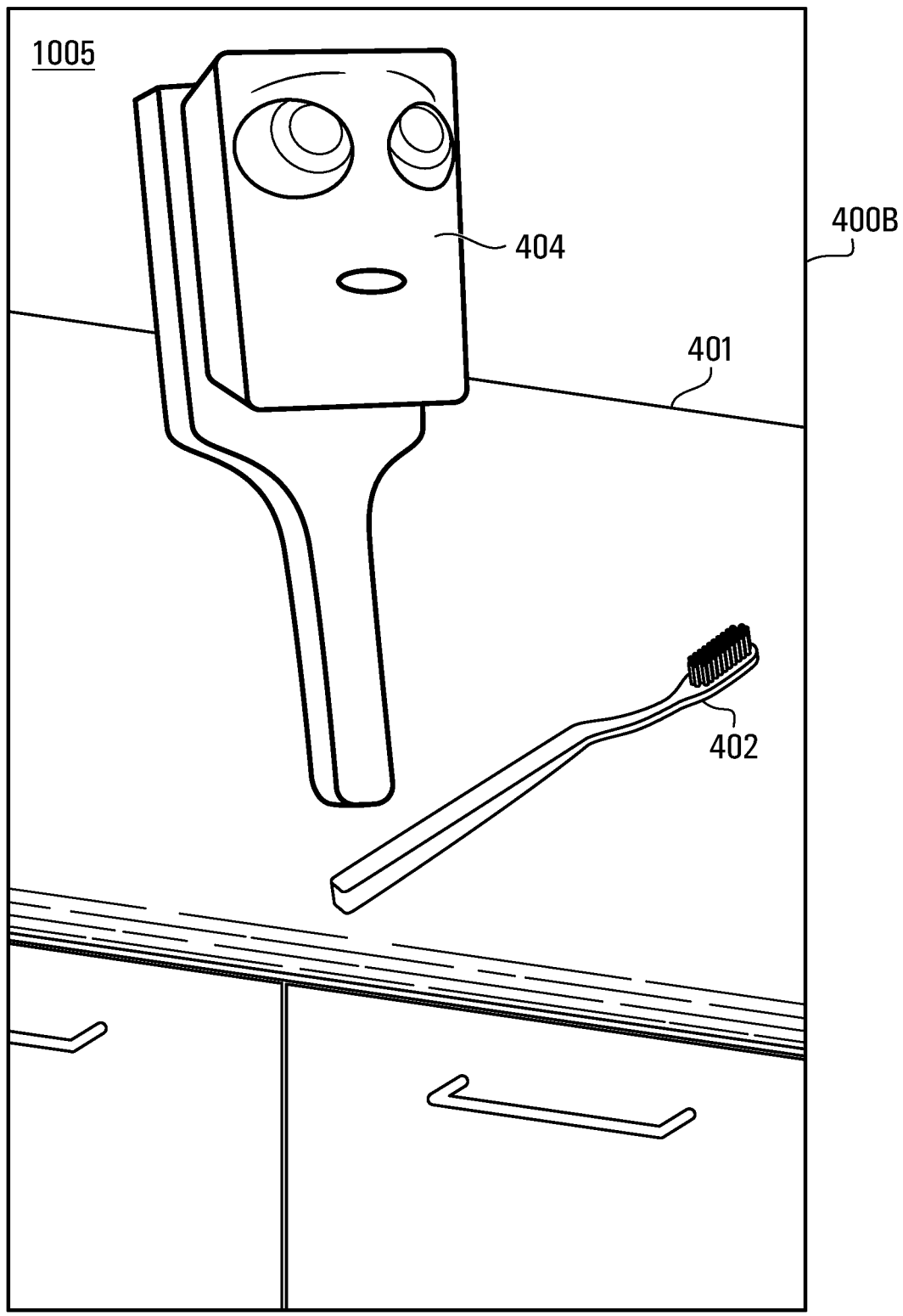

In yet another example, FIG. 4A shows an image 400A of a scene that may be captured and presented by the mobile AR application 1000 on the display 11 of the mobile device 10. The image 400A is shown to include a real-world cabinet 401 and a real-world toothbrush 402.

In the illustrated example embodiment, the camera images include the real-world cabinet 401 and the real-world toothbrush 402. For the sake of the present example, only the real-world toothbrush 402 is assumed to be in the set of detectable real-world objects 58.

At step 610, the ODM 1010 captures images from the camera feed (i.e. a video frame) of the mobile device 10. At step 620, the mobile AR application 1000 is configured to process the camera images received and eventually the real-world toothbrush 402 is detected in the scene at step 630 as a result of a positive output of the CVM 1040. At step 640, the AR API 1020 of the mobile AR application 1000 is configured to provide an anchor 46 to be established generally at the position of the real-world toothbrush 402 to provide an anchor for an eventual virtual character 404 to be associated with the real-world toothbrush 402.

At step 650, the mobile AR application 1000 creates an association between the real-world toothbrush 402 and the virtual character 404. In this example, the associated virtual character 404 is selected to have a visual association with the real-world toothbrush 402 such that a shape of the virtual character 404 corresponds to a shape to the real-world toothbrush 402. The virtual character 404 may have been selected from the library of virtual characters 400 in accordance with the selection/matching algorithm 1900 executed by the at least one processor 12 or may have been "created" by the mobile AR application 1000, as described above.

A visual effect, namely a virtual flourish 403, corresponding to the virtual character 404 being released from/spawned by the real-world toothbrush 402 is shown in FIG. 4A. The virtual character 404 appears together with motion lines 405 to provide an effect which aims to indicate to the player 1 that the virtual character 404 is being "generated from" the real-world toothbrush 402.

Figure 4C:
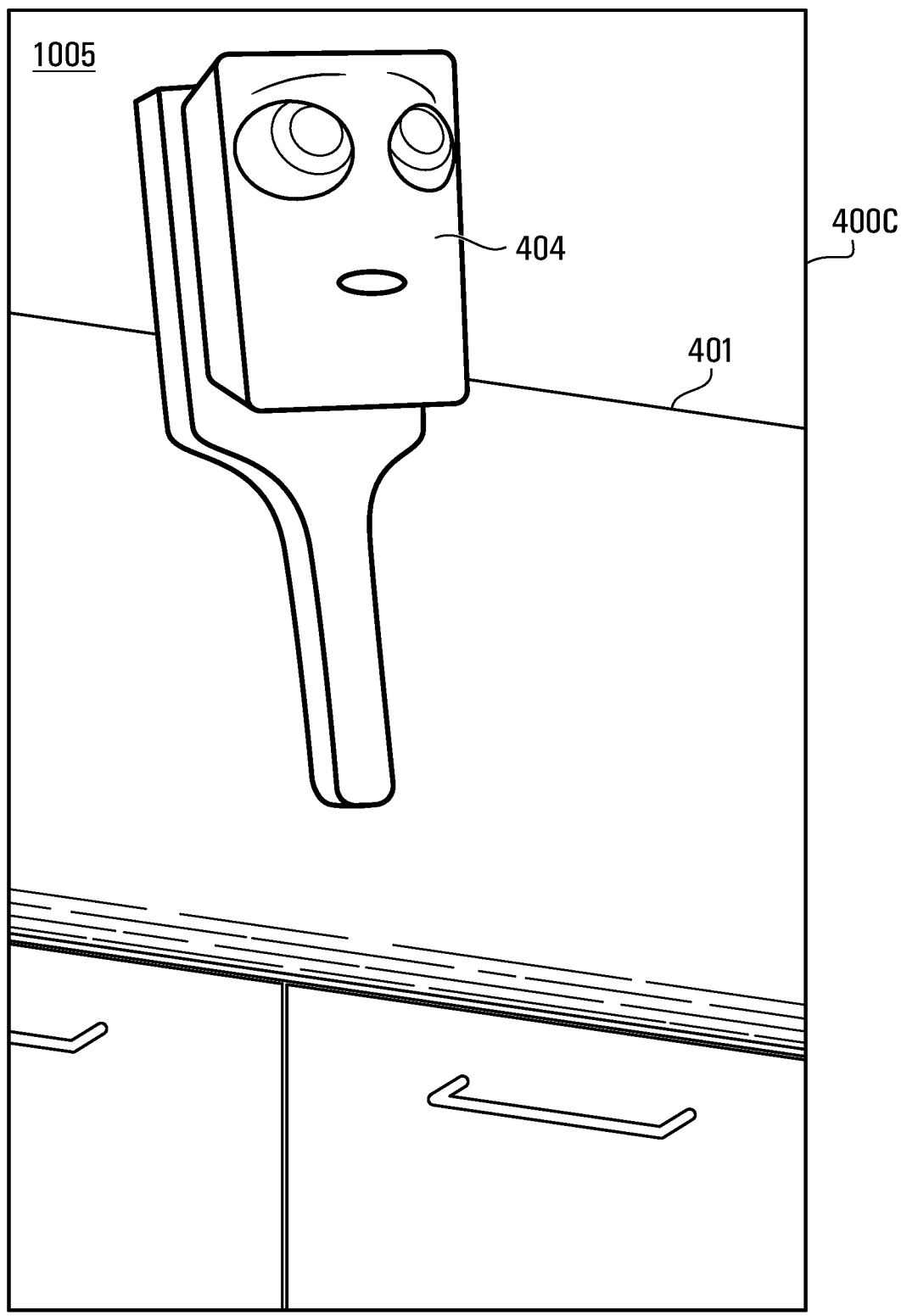

As shown in FIG. 4C, the virtual character 404 may remain in the image of the scene presented on the display 11 even in the event that the real-world toothbrush 402 is no longer in a field of view of the camera 26 and as such no longer presented on the display 11. In such cases, the spatial coordinates $(XYZ)_{RW}$ of the real-world toothbrush 402 and the spatial coordinates $(XYZ)_{VC}$ of the virtual character 404 may be different. Once the virtual character 404 has been released from/spawned by the real-world toothbrush 402, the virtual character 404 may be added to the virtual character collection 900.

In some embodiments, further to a first virtual character being released from/spawned by a first real-world object, a second real-world object may be detected by the CVM 1040 of the mobile AR application 1000. Upon detection of the second real-world object, a second virtual character may be released from/spawned by the second real-world object. As such, the mobile AR application 1000 creates an association between the first real-world object and the first virtual character, and also creates another association between the second real-word object and the second virtual character. It is also possible that the second real-world object is detected before the first virtual character has been released form/spawned by the first real-world object, resulting in two concurrent spawning operations.

Related Real-World Objects and Related Virtual Characters

In other embodiments, a plurality of related real-world objects may be detected by the CVM 1040 at step 630 of the method 600. The plurality of related real-world objects may be related by virtue of a visible relationship in the real-world. For instance, the plurality of real-world objects may be in physical contact in the real-world (e.g., physically connected). For example, the plurality of real-world objects may be visibly related in the real-world. In such embodiments, the mobile AR application 1000 may be configured to create an association between the plurality of related real-world objects and a plurality of related virtual characters, each virtual character being associated with its respective real-world object.

Figure 17A:
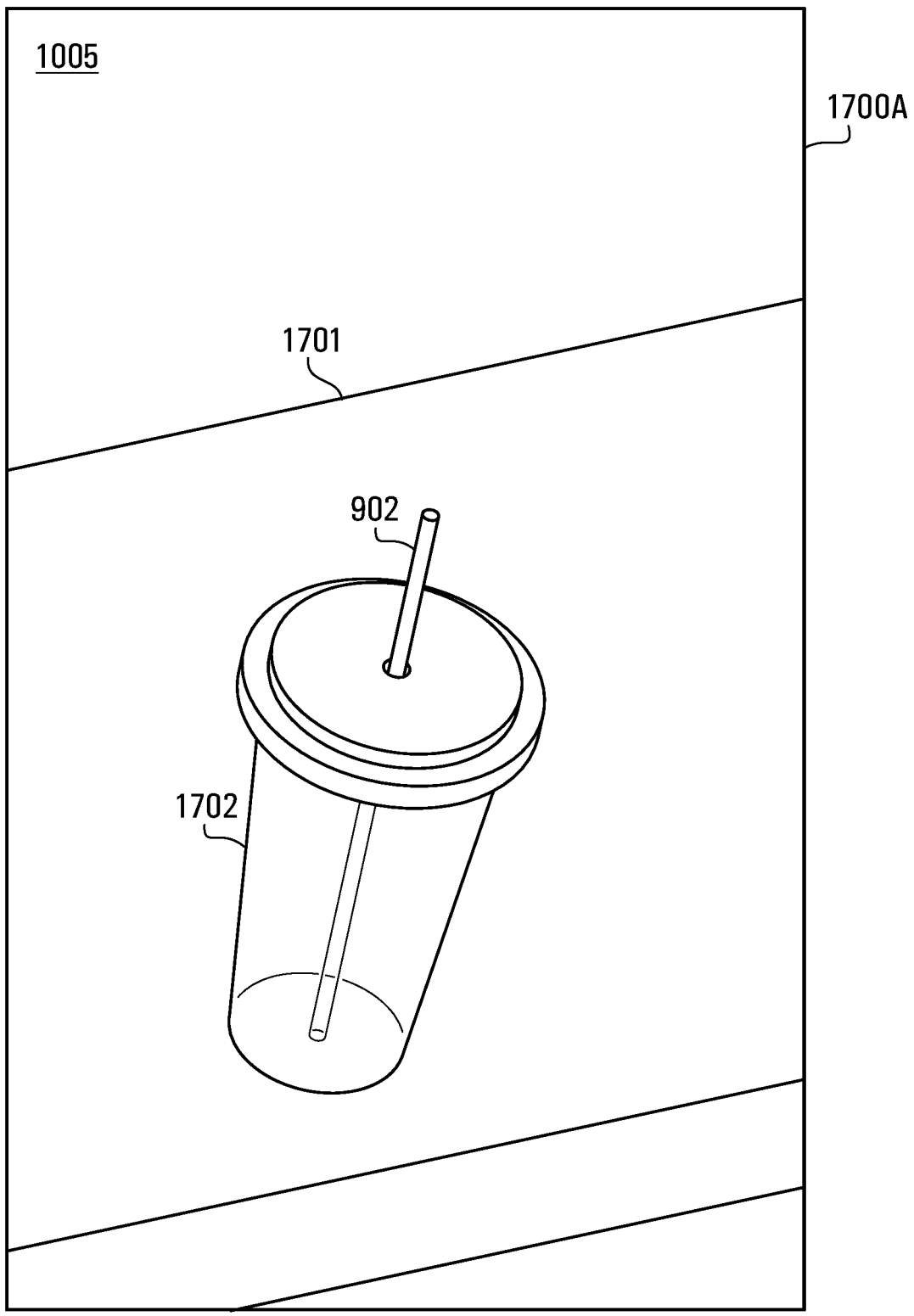
FIGS. 17A to 17C illustrate images of a fifth scene presented by the AR application, in accordance with a non-limiting embodiment.

In one example of implementation of this embodiment, FIG. 17A shows an image 1700A of a scene that may be captured and presented by the mobile AR application 1000 on the display 11 of the mobile device 10. The image 1700A is shown to include a real-world straw 902 located within a real-world cup 1702 and a table 1801. For the sake of the present example, only the real-world real-world straw 902 and the real-world cup 1702 are assumed to be in the set of detectable real-world objects 58.

At step 610, the ODM 1010 captures images from the camera feed (i.e. a video frame) of the mobile device 10. At step 620, the mobile AR application 1000 is configured to process the camera images received and eventually the real-world straw 902 is detected in the scene at step 630 as a result of a positive output of the CVM 1040.

While still continuing to execute step 630, the CVM 1040 similarly detects a second real-world object, namely the real-world cup 1702. As such, step 630, may include detection of a plurality of real-world objects.

In this example, upon detection of the real-world cup 1702, at step 640, the AR API 1020 of the mobile AR application 1000 is configured to provide an anchor 461 to provide an anchor for an eventual virtual character 904 to be associated with the real-world straw 902 and an anchor 462 to provide an anchor for an eventual virtual character 1704 to be associated with the real-world cup 1702.

Figure 17B:
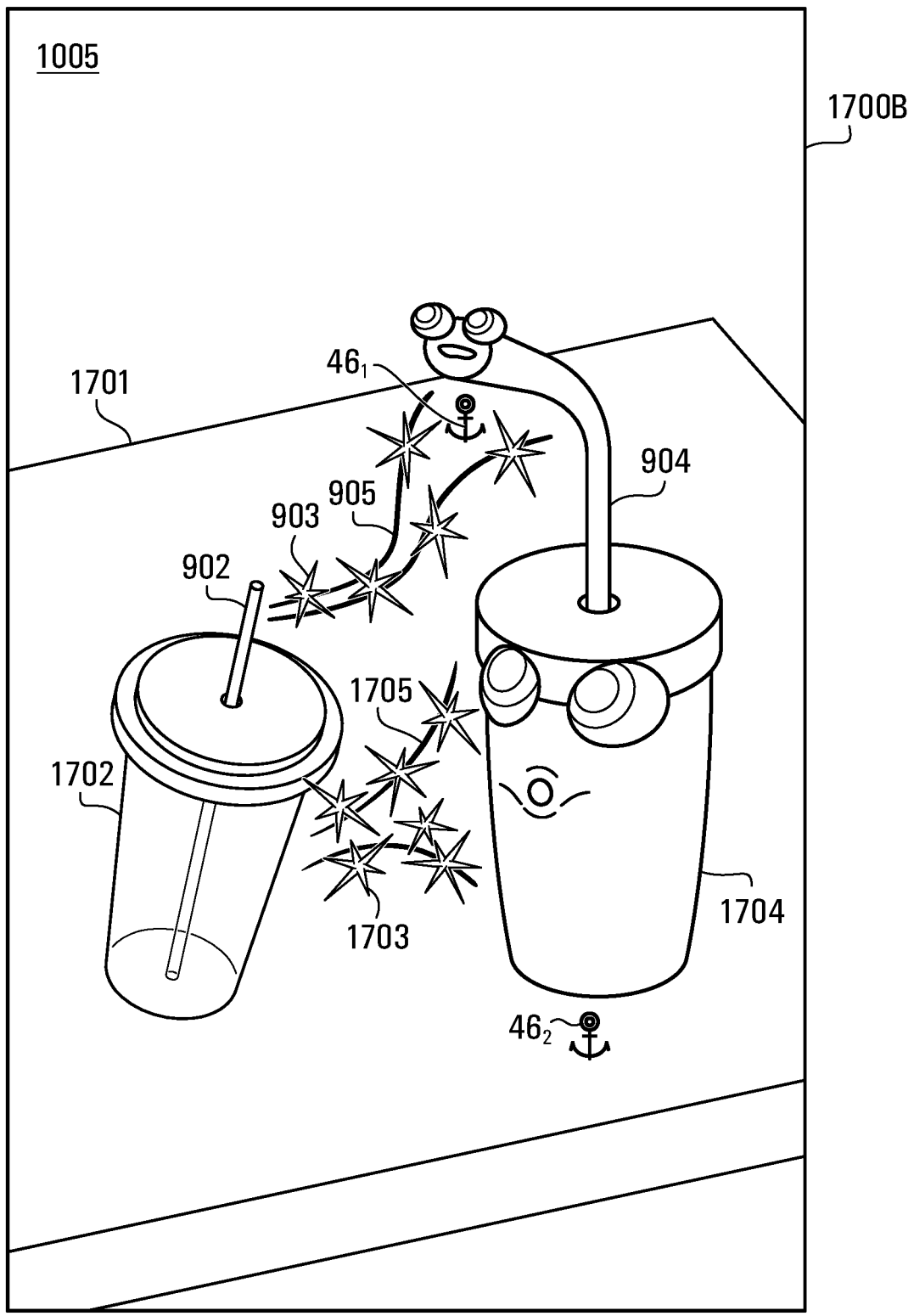

At step 650, the mobile AR application 1000 creates an association between the real-world straw 902 and the virtual character 904 and an association between the real-world cup 1702 and the virtual character 1704. As shown in FIG. 17B, a shape of the virtual character 904 corresponds to the shape of to the real-world straw 902 and a shape of the virtual character 1704 corresponds to the shape of the real-world cup 1702. That is, virtual character 904 is straw-shaped and virtual character 1704 is cup-shaped. The virtual characters 904, 1704 may have been selected from the library of virtual characters 400 in accordance with the selection/matching algorithm 1900 executed by the at least one processor 12 or may have been "created" by the mobile AR application 1000, as described above.

Figure 17C:
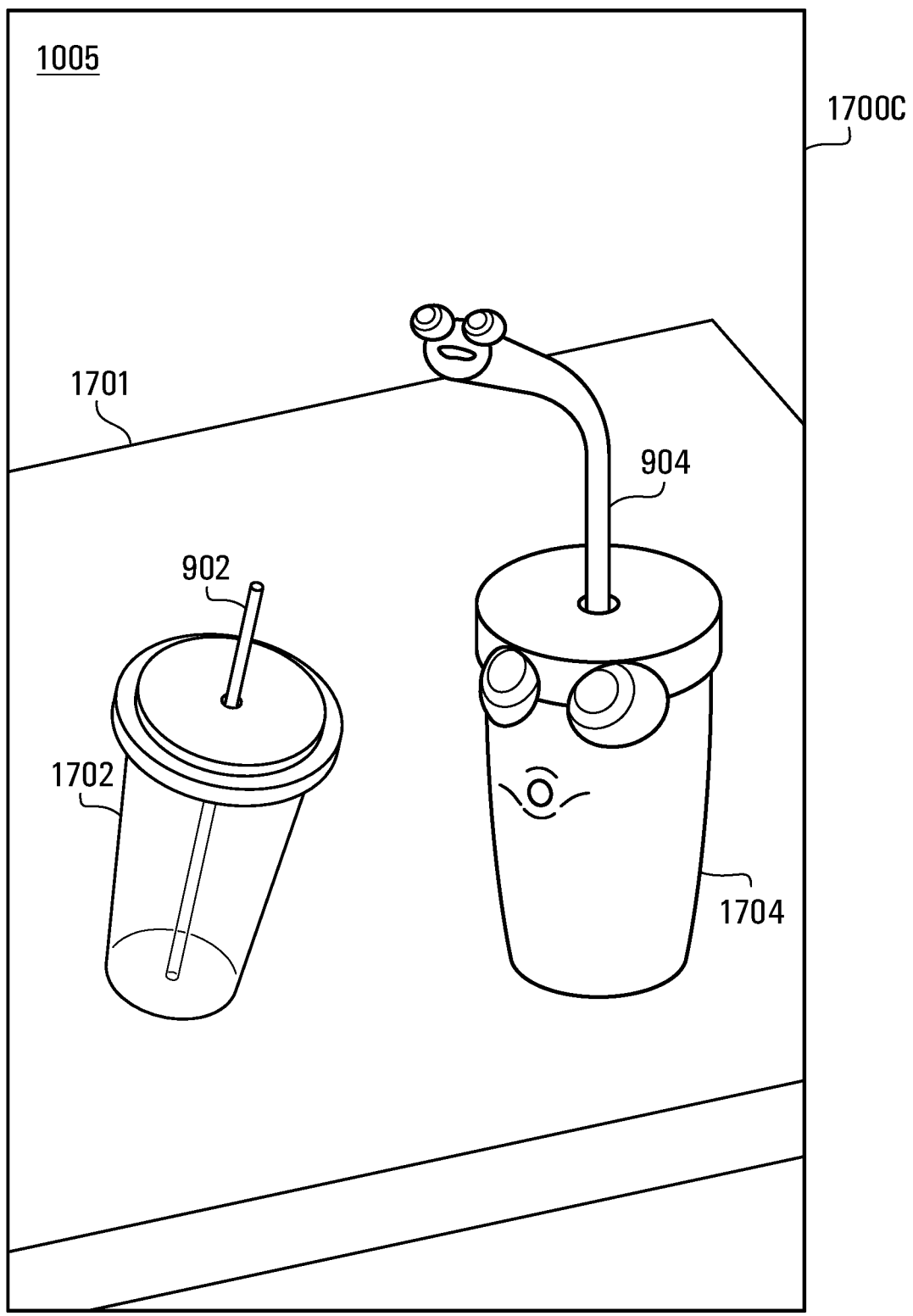

In the illustrated example embodiment, as shown in FIG. 17B, the mobile AR application 1000 may be configured to generate a virtual flourish 903 (e.g., "sparkles") indicating that the virtual character 904 is about to be released from the real-world straw 902 and a virtual flourish 1703 indicating that the virtual character 1004 is about to be released from the real-world cup 1702. As shown in FIG. 17B, each of the virtual character 904, 1104 appear together with motion lines 905, 1705 to provide an effect which aims to indicate to the player 1 that the virtual characters 904, 1704 are being "generated from" the real-world remote straw 902 and the real-world cup 1702. Finally, FIG. 17C shows the virtual characters 904, 1704 having been fully released from the real-world remote straw 902 and real-world cup 1702.

Once the associated virtual characters 904, 1704 have been released from/spawned by the particular real-world objects 902, 1702, the associated virtual characters 904, 1704 may be added to the virtual character collection 900.

Single Real-World Object and Plural Virtual Characters

Whereas in some embodiments, the mobile AR application 1000 may be configured to create an association between a single real-world object and a single virtual character, in other embodiments, the mobile AR application 1000 may be configured to create an association between a single real-world object and a plurality of virtual characters.

Figure 18A:
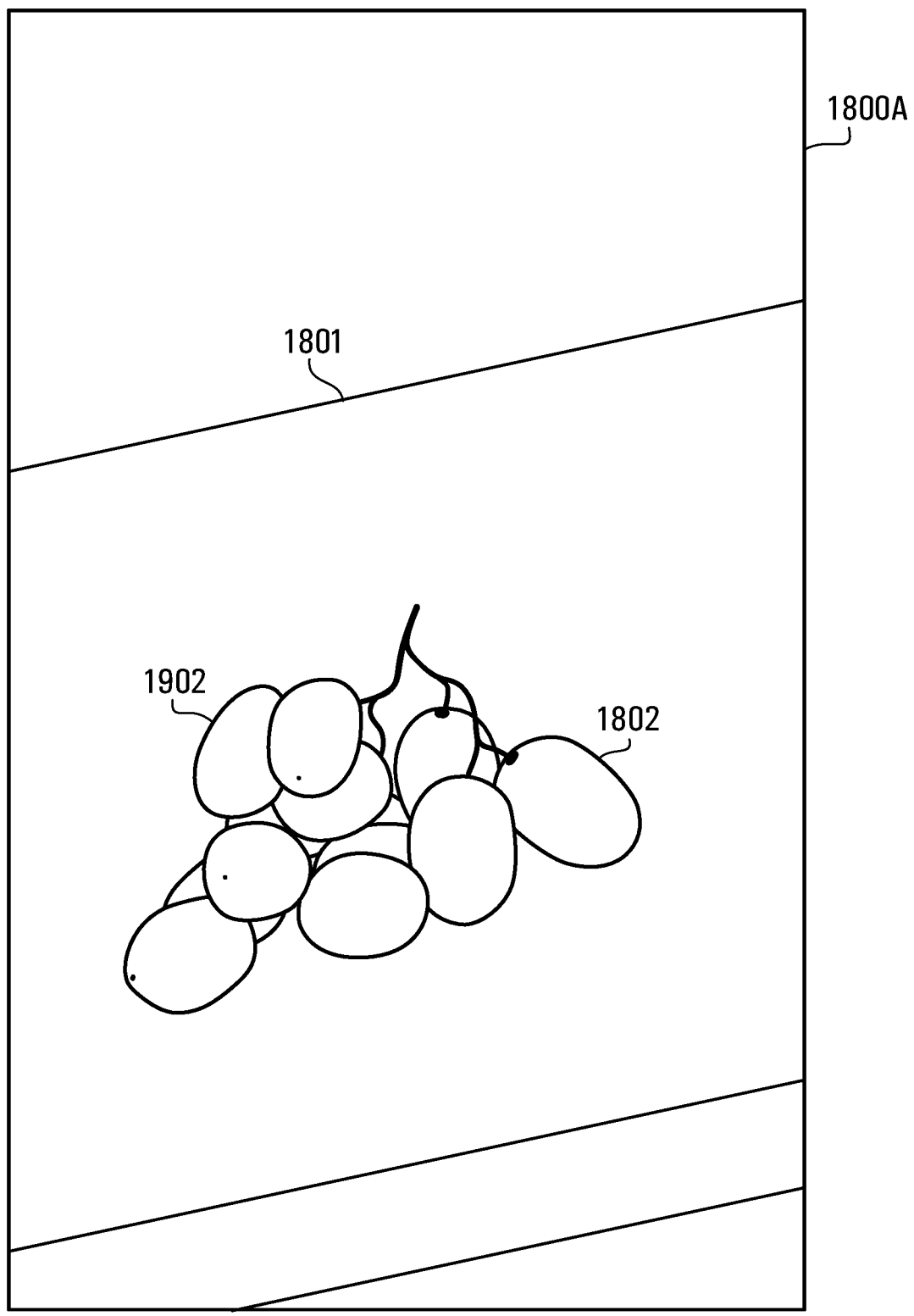
FIGS. 18A to 18C illustrate images of a sixth scene presented by the AR application, in accordance with a non-limiting embodiment.

In one non-limiting example, FIG. 18A shows an image 1800A of a scene that may be captured and presented by the mobile AR application 1000 on the display 11 of the mobile device 10. The image 1800A is shown to include a real-world cluster of grapes 1802 and a table 1701. For the sake of the present example, only the real-world cluster of grapes 1802 is assumed to be in the set of detectable real-world objects 58.

At step 610, the ODM 1010 captures images from the camera feed (i.e. a video frame) of the mobile device 10. At step 620, the mobile AR application 1000 is configured to process the camera images received and eventually the real-world cluster of grapes 1802 is detected in the scene at step 630 as a result of a positive output of the CVM 1040. In this embodiment, the suitably trained CVM 1040 may also detect that the real-world cluster of grapes 1802 comprises individual real-world grapes 1902.

At step 640, the AR API 1020 of the mobile AR application 1000 is configured to provide a plurality of anchors 46$_x$ to be established generally at the position of the real-world cluster of grapes 1802 to provide an anchor for the eventual plurality of virtual characters 1804$_x$ to be associated with the real-world cluster of grapes 1802.

At step 650, the mobile AR application 1000 creates an association between the real-world cluster of grapes 1802 and the plurality of virtual characters 1804$_x$. The mobile AR application 1000 also creates an association between the individual real-world grapes 1902 and respective ones of the plurality of virtual characters 1804$_x$. The virtual characters 1804$_x$ may have been selected from the library of virtual characters 400 in accordance with the selection/matching algorithm 1900 executed by the at least one processor 12 or may have been "created" by the mobile AR application 1000, as described above.

Figure 18B:
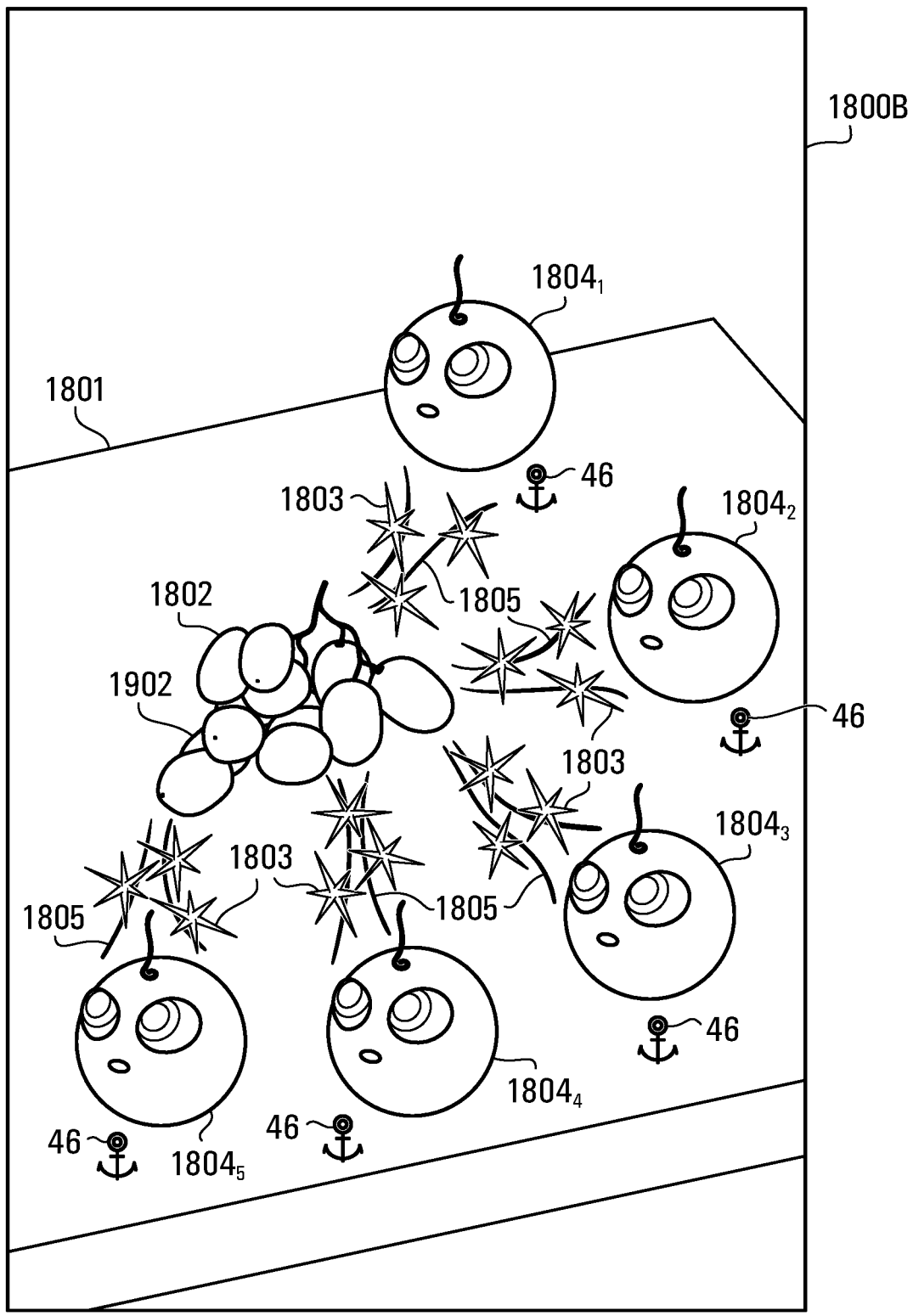
Figure 18C:
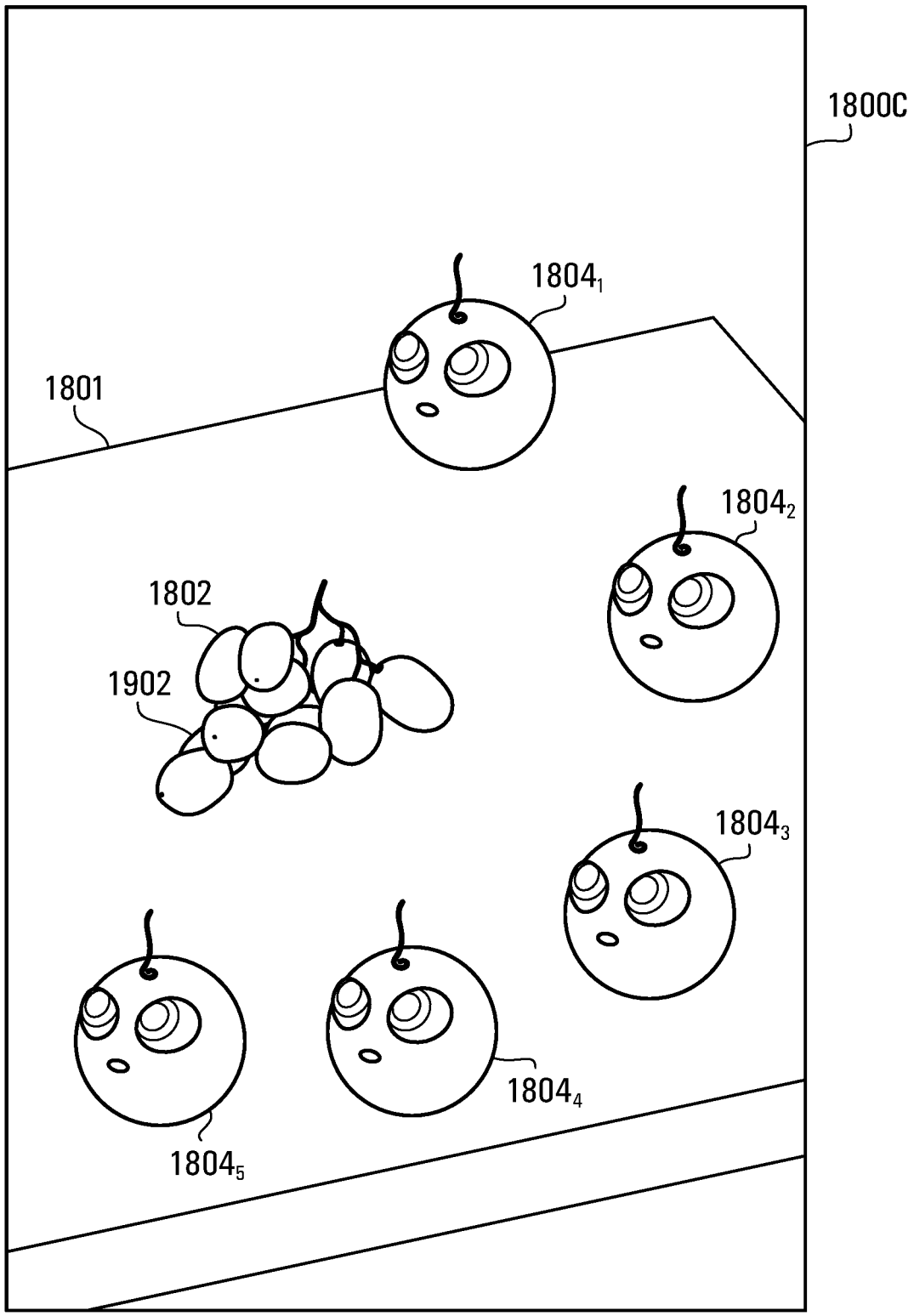

In the illustrated example embodiment, as shown in FIG. 17B, the mobile AR application 1000 may be configured to generate a virtual flourish 1803 (e.g., "sparkles") indicating that the virtual characters 1804$_x$ are about to be released from the real-world cluster of grapes 1802/individual grapes 1902. As shown in FIG. 18B, each of the virtual characters 1804$_x$ appear together with motion lines 1805 to provide an effect which aims to indicate to the player 1 that the virtual characters 1804$_x$ are being "generated from" the real-world cluster of grapes 1802/individual grapes 1902. Finally, FIG. 18C shows the virtual characters 1804$_x$ having been fully released from the real-world cluster of grapes 1802/individual grapes 1902.

Once, the associated virtual characters 1804$_x$ have been released from/spawned by the real-world cluster of grapes 1802/individual grapes 1902, the associated virtual characters 1804$_x$ may be added to the virtual character collection 900.

Set of Detectable Real-World Objects

A size of the set of detectable real-world objects 58 may be quantified as the total number of real-world objects in the set of detectable real-world objects 58 at a given time during a gaming session. In some embodiments, the size of the set of detectable real-world objects 58 may change (e.g., increase, decrease) over the course of a gaming session.

For example, upon detection of a specific combination of real-world objects in the image data, a size of the set of detectable real-world objects 58 may change. The combination of real-world objects may be characterized as a specific combination of object labels 60$_x$ assigned to the real-world objects by the CVM 1040. For example, the mobile AR application 1000 may be configured to increase the size of the set of detectable real-world objects 58 upon detection of a threshold number of real-world objects in a particular object family 501$_x$. In accordance with a non-limiting example of this embodiment, upon detection of a number of real-world objects in a particular object family 501$_x$ (for example, the kitchen object family 501$_1$) meeting or exceeding the threshold number of real-world objects encoded in the game data 35, the size of the set of detectable real-world objects 58 may increase.

In other embodiments, a composition of the set of detectable real-world objects 58 may vary with time (i.e., the particular real-world objects in the set of detectable real-world objects 58 may vary with time).

In some embodiments, a real-world object may be detectable for a limited period of time. For example, the real-world object may be part of the set of detectable real-world objects 58 for a limited period of time. Accordingly, the mobile AR application 1000 may be configured to maintain membership in the set of detectable real-world objects 58 based on a timer for each real-world object. As such, the mobile AR application 1000 may be configured to assign to each real-world object an expiry time, to monitor the expiry time and to remove the real-world object from the set of detectable real-world objects 58 once the expiry time has been reached or exceeded. Similarly, the mobile AR application 1000 is configured to remove a real-world object from the set of detectable real-world objects 58 once it has released/spawned a virtual character.

In some embodiments, the expiry time assigned to a real-world object may also vary during a gaming session. For example, the expiry time of areal-world object may increase or decrease as a function of the object label 60$_x$ assigned to the real-world object and the total number real-world objects which have been detected and assigned this same object label 60$_x$. For example, a variable may be stored in the memory 14 to track the number of objects which have been detected and have been assigned a particular object label 60$_x$.

The mobile AR application 1000 may be configured to change the expiry time assigned to real-world objects assigned this particular object label 60$_x$ based on the value of the variable. For example, upon meeting or exceeding a threshold number of real-world objects assigned a particular object label 60$_x$, the mobile AR application 1000 may be configured to reduce the expiry time assigned to real-world objects assigned this particular object label 60$_x$. Accordingly, the time period during which an object assigned the particular object label 60$_x$ may be part of the set of detectable real-world objects 58 may be changeable during a gaming session.

Accordingly, the mobile AR application 1000 may be configured to change the expiry time of the real-world objects in the set of detectable real-world objects 58 upon detection of a real-world object in step 630, based on the object label 60$_x$ assigned to the real-world object.

In some embodiments, a virtual character may not be released from/spawned by the real-world object unless a threshold degree of confidence 800$_x$ is met or exceeded at the object detection step (step 630 of the method 600). As indicated above, a degree of confidence 800 represents the level of certainty with which the CVM 1040 has identified the object. Specifically, the degree of confidence 800 represents the level of certainty with which the object label 60$_x$ assigned by the CVM 1040 indeed corresponds with the particular real-world object which as been detected. The real-world object data 62 for each real-world object includes the object label 60$_x$ (e.g. "remote control", "spatula") and the degree of confidence 800 (e.g. 0-100%).

In this example, generating the virtual character in the AR gaming environment 1005 occurs once the threshold degree of confidence 800$_x$ is met or exceeded. Accordingly, the mobile AR application 1000 is configured to identify real-world objects within the captured image by processing the image data with the CVM 1040. The mobile AR application 1000 is configured to determine to whether or not the degree of confidence 800 attributed to a given real-world object is above a predetermined threshold value 800$_x$ (e.g. 65%). If the degree of confidence 800 of a given real-world object is below the threshold degree of confidence $800_x$, the method does not proceed to step 640 and as such, the virtual character is not generated. If, however, a determination is made that the degree of confidence 800 of a particular real-world object is equal or above the predetermined threshold degree of confidence $800_x$, the virtual character may be generated.

Detection Events

In some embodiments, after an associated virtual character has been released from/spawned by a particular real-world object particular, the particular real-world object may subsequently be included in an image from the camera feed (i.e. a video frame) of the mobile device 10 and as such the particular real-world object may be detected by the CVM 1040 for a second time.

In one example of implementation of this embodiment, upon detecting the particular real-world object in the image a second time, the mobile AR application 1000 is configured to retain the association between the associated virtual character and the particular real-world object without generating a new virtual character having an association with the particular real-world object. In this way, a second virtual character having an association with the particular real-world object is not generated, and the mobile AR application 1000 is configured to retain the association between the associated virtual character and the particular real-world object as the associated virtual character continues to be displayed on the display 11 (or even as the associated the virtual character is no longer displayed on the display 11).

Accordingly, prior to proceeding to step 640, the method may additionally include a step of accessing a record stored in the memory 14 in view of determining whether an associated virtual character has been released from/spawned by the real-world object detected in step 630. In the affirmative, the method does not proceed to step 640 in this embodiment. In the negative, the method may proceed to step 640.

In another example of implementation of this embodiment, upon detecting the particular real-world object in the image a second time (possibly after a threshold amount of time has elapsed), the mobile AR application 1000 may be configured to create an association between the particular real-world object and a second virtual character. Accordingly, information regarding a first association between the particular real-world object and the first associated virtual character and a second association between the particular real-world object and a second associated virtual character will be included in table 1300 stored in the memory 14 of the mobile device 10.

In some embodiments, the mobile AR application 1000 is configured to retain the association between the first associated virtual character and the particular real-world object and to generate the second associated virtual character as the first associated virtual character continues to be displayed on the display 11. In other embodiments, the mobile AR application 1000 is configured to retain the association between the first associated virtual character and the particular real-world object and to generate the second associated virtual character as the first associated virtual character is no longer displayed on the display 11.

In some embodiments, the second associated virtual character may have the same point value as the first associated virtual character. In other embodiments, the second associated virtual character may have a different point value from the first associated virtual character.

In some embodiments, after an associated virtual character has been released from/spawned by a first real-world object assigned a particular object label $60_x$ by the CVM 1040, a second real-world object may appear in an image from the camera feed (i.e. a video frame) of the mobile device 10 and may be assigned the same particular object label $60_x$ which was assigned to the first real-world object.

For example, considering a first real-world object and a second real-world object detected by the CVM 1040 and to which a particular object label $60_1$ has been assigned, the mobile AR application 1000 may be configured not to create an association between a new virtual character and the second real-world object. As such, the mobile AR application 1000 is configured to retain the association between the associated virtual character and the first real-world object without generating a new virtual character having an association with the second real-world object. This association is retained in the event that the associated virtual character continues to be displayed on the display 11 or even in the event that the associated virtual character is no longer displayed on the display 11.

Accordingly, prior to proceeding to step 640, the method may additionally include a step of accessing a record stored in the memory 14 in view of determining whether an associated virtual character has been released from/spawned by a real-world object assigned the object label $60_1$ which has been assigned to the second real-world object. In the affirmative, the method does not proceed to step 640. In the negative, the method proceeds to step 640.

In another example of implementation of this embodiment, the mobile AR application 1000 may be configured to create an association between a new virtual character and the second real-world object assigned object label $60_1$.

As such, the mobile AR application 1000 is configured to retain the association between the associated virtual character and the first real-world object and generate a new virtual character having an association with the second real-world object. This association is retained in the event that the associated virtual character continues to be displayed on the display 11 or even in the event that the associated virtual character is no longer displayed on the display 11.

In some embodiments, the new virtual character may have the same point value as the first associated virtual character. In other embodiments, the new virtual character may have a different point value as the first associated virtual character.

In some embodiments, the mobile AR application 1000 may be configured to limit the number of times that a particular real-world object may be detected. In other embodiments, the mobile AR application 1000 may be configured to limit the number of virtual characters associated with a particular real-world object. In yet other embodiments, the mobile AR application 1000 may be configured to limit the number virtual characters associated with real-world objects assigned a particular object label $60_x$.

Thus, the mobile AR application 1000 may be configured to store variables in the memory 14 to track these values. In one example, the mobile AR application 1000 may store a variable in the memory 14 to track a number of times that a particular real-world object has been detected. In another example, the mobile AR application 1000 may store a variable in the memory 14 to track a number of virtual characters associated with a particular real-world object. In yet another example, the mobile AR application 1000 may store a variable in the memory 14 to track a number of real-world objects to which a particular object label $60_x$ has been associated. The mobile AR application 1000 may be configured to increment these variables during a gaming session as real-world objects are detected and/or associations are created between real-world objects and virtual characters.

Prior to proceeding to step 640, the method may include a step of determining whether a threshold limit has been met or exceeded based on the current value of the variable. If the threshold limit has been met or exceeded, the method may not proceed to step 640. If the threshold limit has not been met, the method may proceed to step 640.

In some embodiments, the ODM 1010 may capture an image from the camera feed of the mobile device 10 in which a plurality of real-world objects from the set of detectable real-world objects 58 may simultaneously be present. As such, upon processing the camera image, the mobile AR application 1000 is may eventually detect a plurality of real-world objects.

In one example, upon detection of a plurality of real-world objects, the mobile AR application 1000 may be configured to provide the player 1 with an opportunity to select a particular one of the plurality of real-world objects as being the real-world object from which a virtual character is to be released/spawned. For example, the player 1 may carry out a selection by touching a portion of the display 11/the touchscreen 16 that displays the particular (i.e., to-be-selected) real-world object. In other examples, the player 1 may carry out a selection by touching other portions of the display 11/the touchscreen 16, or through any other suitable mechanism.

In another example, upon detection of a plurality of real-world objects, the mobile AR application 1000 may be configured to randomly select a particular one of the plurality of real-world objects as being the object from which a virtual character is to be released/spawned.

In yet another example, upon detection of a plurality of real-world objects, the mobile AR application 1000 may be configured to carry out a real-world object selection algorithm 1400 to select a particular one of the plurality of real-world objects as being the real-world object from which a virtual character is to be released/spawned.

Figure 14:
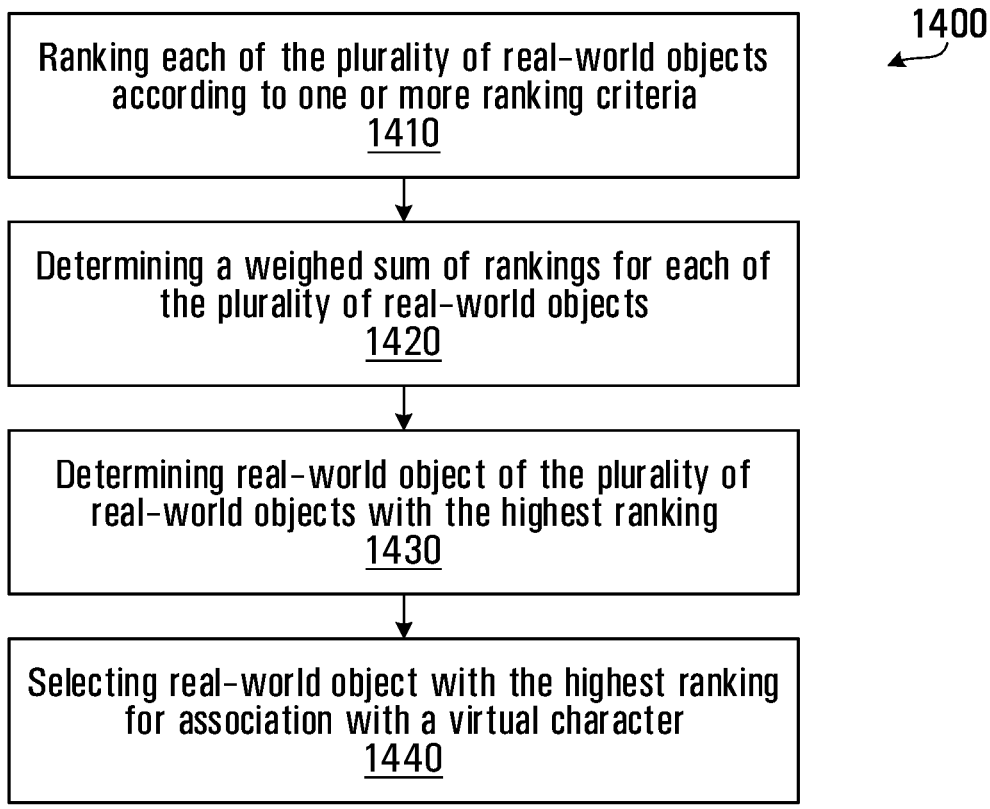
FIG. 14 is a flowchart illustrating steps of a real-world object selection algorithm, in accordance with a non-limiting embodiment.

Reference is now made to the flowchart in FIG. 14 showing steps in the real-world object selection algorithm 1400 executed by the mobile AR application 1000. At step 1410, each of the plurality of real-world objects is ranked based on one or more criteria:

A count of the occurrences of a particular object label $60_x$
  The mobile AR application 1000 may be configured to store in the memory 14 a count of the occurrences of a particular object label $60_x$ being assigned to a real-world object during the gaming session. The mobile AR application 1000 may be configured to access the memory 14 to determine the count of the occurrences of a particular object label $60_x$, for example object label $60_1$ and may further be configured to assign a ranking to each of the plurality of real-world objects detected in the scene based on the count of the particular object label $60_x$. A lower count may be associated with a higher ranking.
A degree of confidence 800 associated with the particular real-world object
  As previously discussed, the mobile AR application 1000 is configured to store in the memory 14 the degree of confidence 800 attributed to a real-world object upon its detection by the CVM 1040. The mobile AR application 1000 may be configured to access the memory 14 to determine the degree of confidence 800 for each of the real-world objects detected in the scene and may further be configured to assign a ranking to each of the plurality of real-world objects detected in the scene based on the degree of confidence 800. A higher degree of confidence 800 may be associated with a higher ranking.
A proximity of a given real-world object to other real-world objects
  The mobile AR application 1000 may be configured to determine the distance between each of the real-world objects detected in the scene.
Real-world objects at a further distance from other real-world objects may garner a higher rating than real-world objects which are at a closer distance to each other.
Other criteria may be considered when rating the plurality of real-world objects.

In some embodiments, the mobile AR application 1000 may be configured to assign a weight W to each of the criteria. In some instances, the weight W of each of the criteria may be the same. In other instances, the weight of each of the criteria may be different.

As such, at step 1420, the mobile AR application 1000 may be configured to determine a weighed sum of rankings for each of the plurality of real-world objects.

At step 1430, the real-world object of the plurality of real-world objects with the highest rating is determined and at step 1440 this real-world object is selected for association with a virtual character.

Conditions for Generation of Virtual Character

As indicated above, in some embodiments, once the particular real-world object is detected by the mobile AR application 1000, the mobile AR application 1000 may be configured to provide the player 1 with an opportunity to provide input relating to the particular real-world object.

For example, in some embodiments, a face 3 of the player 1 may have to be present concurrently with the particular real-world object in the image data captured from the camera feed such that it may be detected by the CVM 1040 in order for the method 600 to proceed to step 640.

Figure 20A:
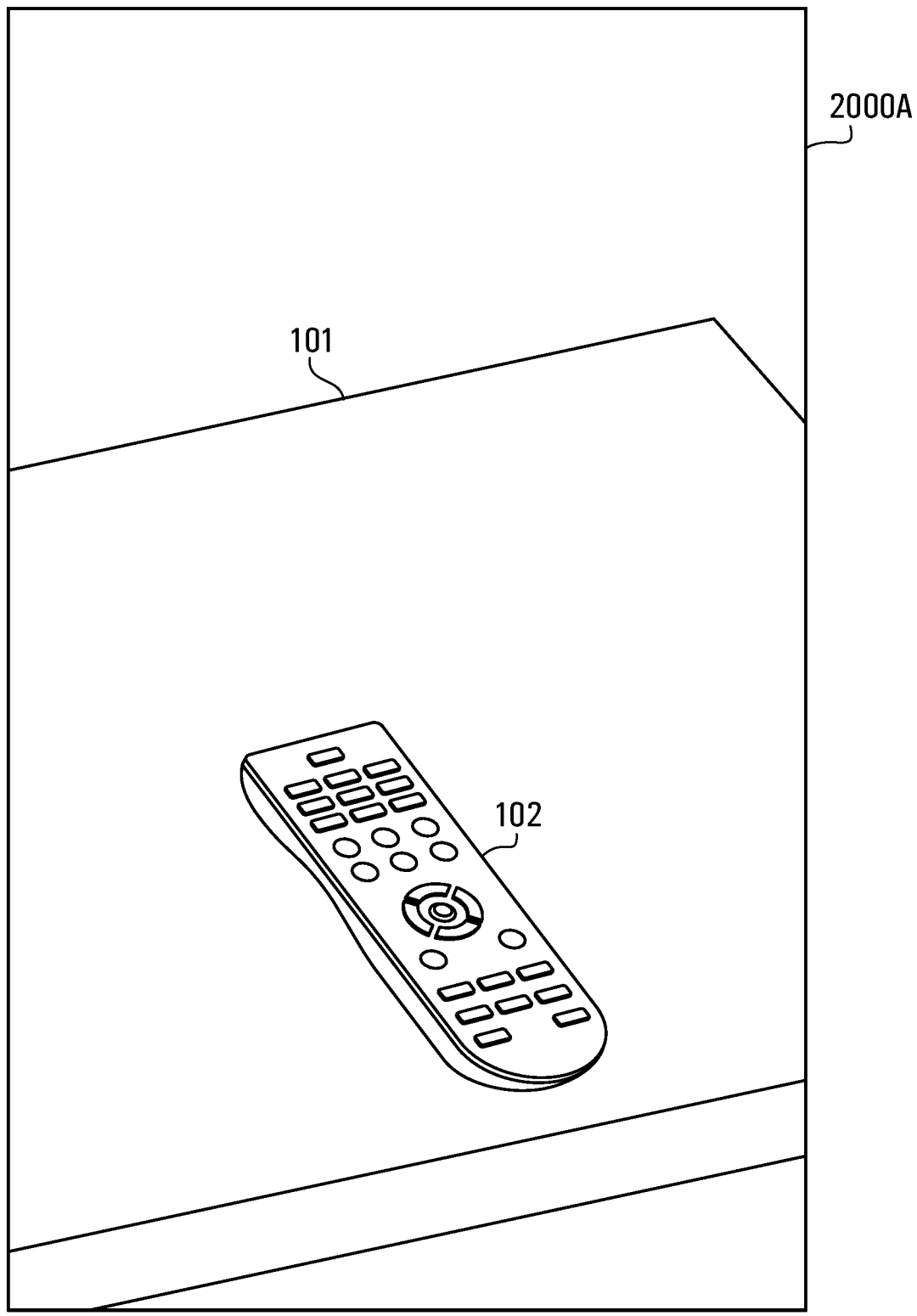
FIGS. 20A to 20E 20D illustrate images of a seventh scene presented by the AR application, in accordance with a non-limiting embodiment.

For example, FIG. 20A shows an image 2000A of a scene that may be captured and presented by the mobile AR application 1000 on the display 11 of the mobile device 10. The image 2000A is shown to include a real-world table 2001 and a real-world remote control 102. In the illustrated example embodiment, the camera images include the real-world cabinet 201 and the real-world remote control 102. For the sake of the present example, only the real-world remote control 102 is assumed to be in the set of detectable real-world objects 58.

At step 610, the ODM 1010 captures images from the camera feed (i.e. a video frame) of the mobile device 10. At step 620, the mobile AR application 1000 is configured to process the camera images received and eventually the real-world remote control 102 is detected in the scene at step 630 as a result of a positive output of the CVM 1040.

In this embodiment, the mobile AR application 1000 is configured to request that the player include their face 3 in the capture images. The mobile AR application 1000 may emit this request via a message displayed on the display 11 of the mobile device and/or an audible cue emitted by the loudspeaker 20 of the mobile device 10 and/or via haptic feedback emitted by the haptic feedback module 54.

Figure 20B:
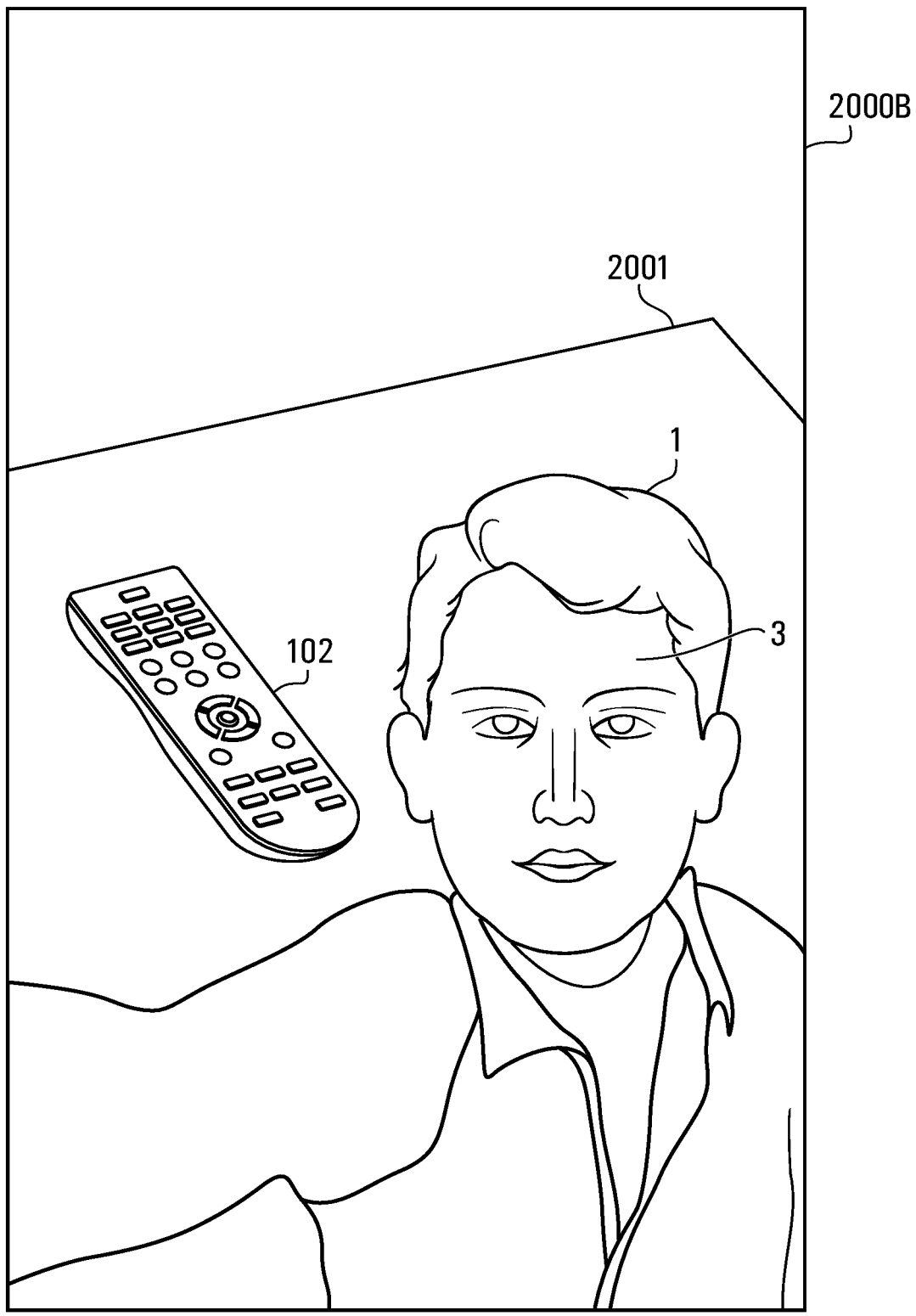
Figure 20C:
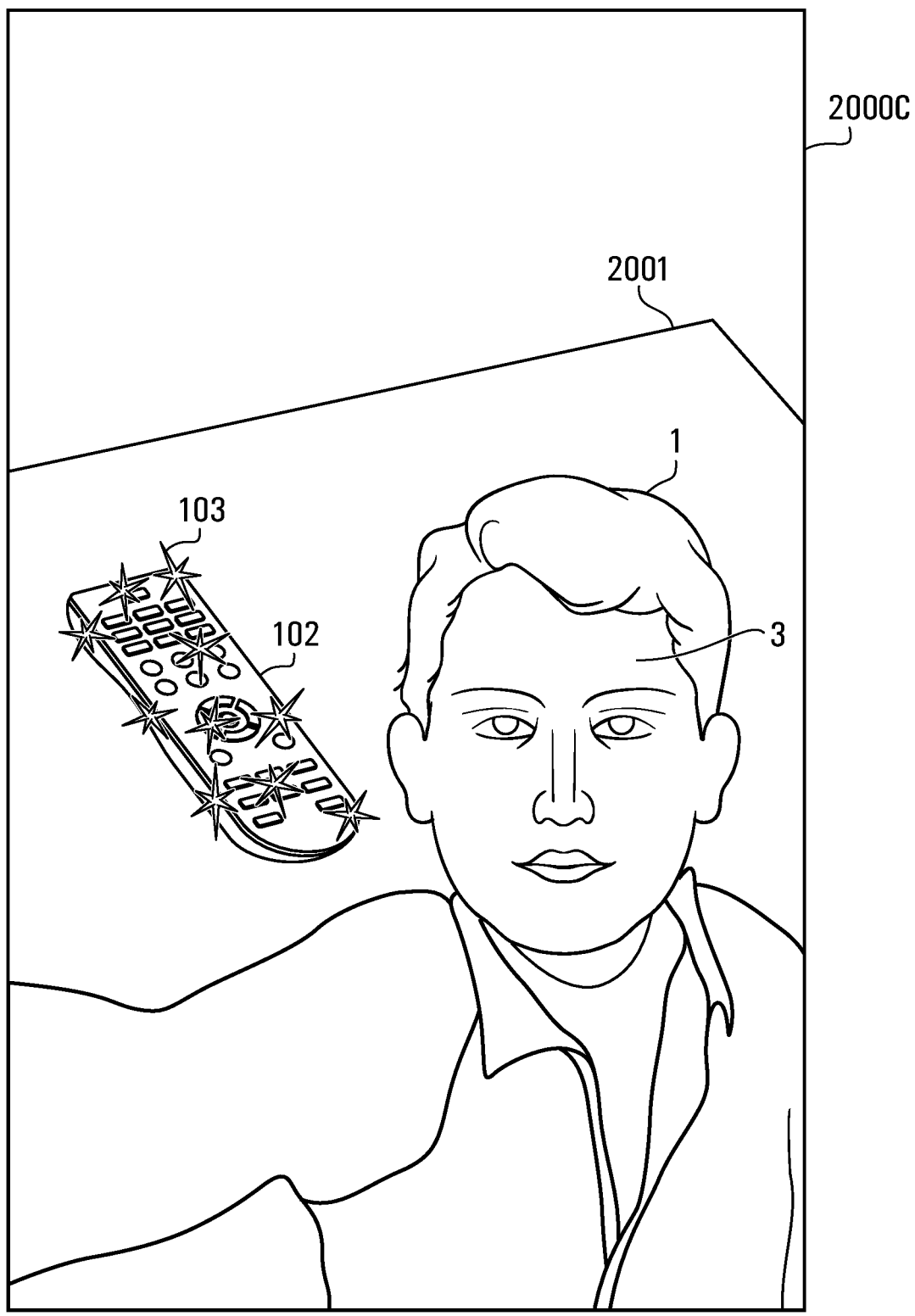

FIG. 20B shows an image 2000B of a scene that may be captured and presented by the mobile AR application 1000 on the display 11 of the mobile device 10 in which both the face of the player 3 and the real-world remote control 102 are included.

The mobile AR application 1000 is configured to process the camera images received and eventually the face 3 of the player 1 and the real-world remote control 102 are both detected in the scene at step 630 as a result of a positive output of the CVM 1040. At step 640, the AR API 1020 of the mobile AR application 1000 is configured to provide an anchor 46 to be established generally at the position of the real-world remote control 102 to provide an anchor for an eventual virtual character 104 to be associated with the real-world remote control 102.

Figure 20D:
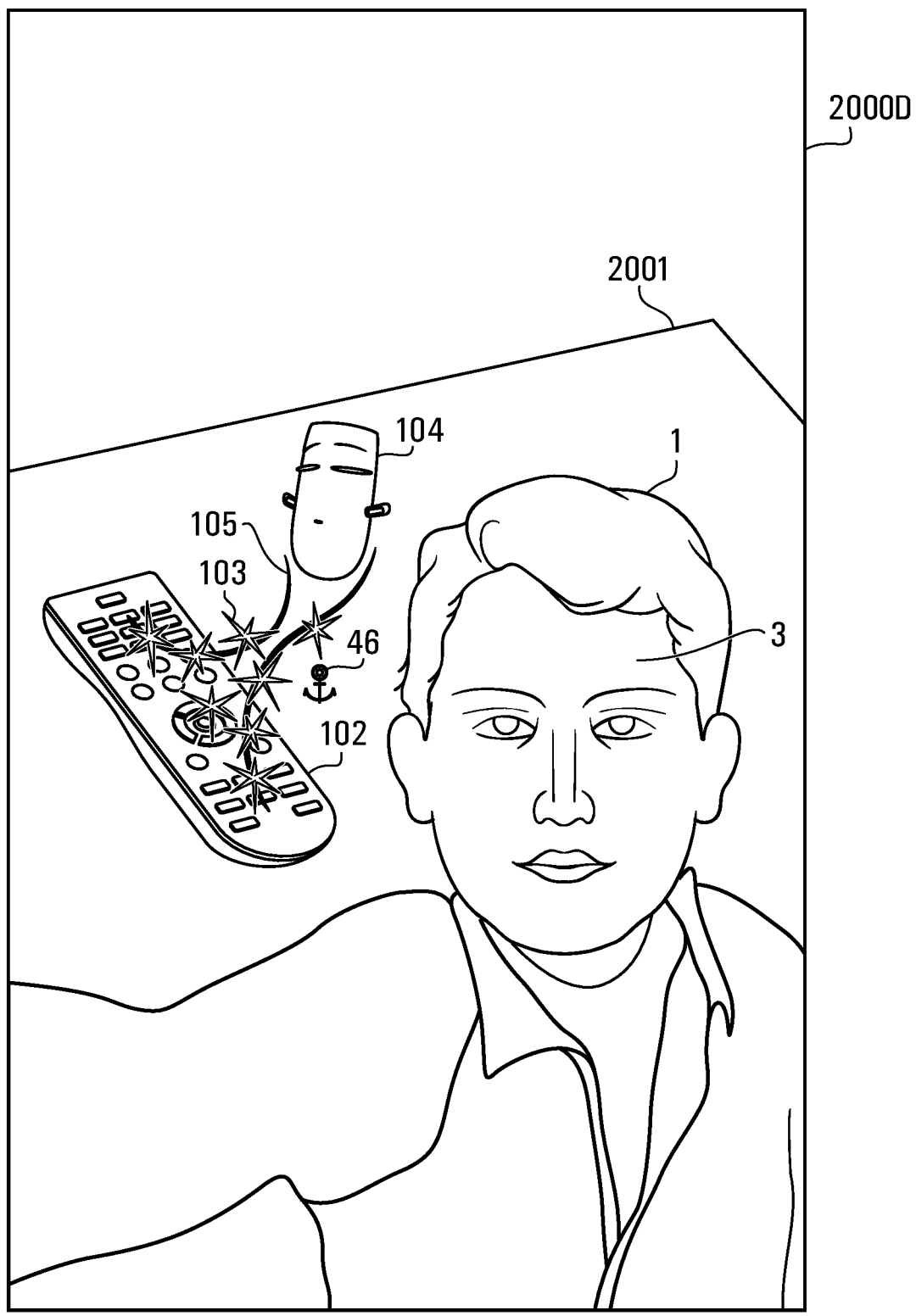
Figure 20E:
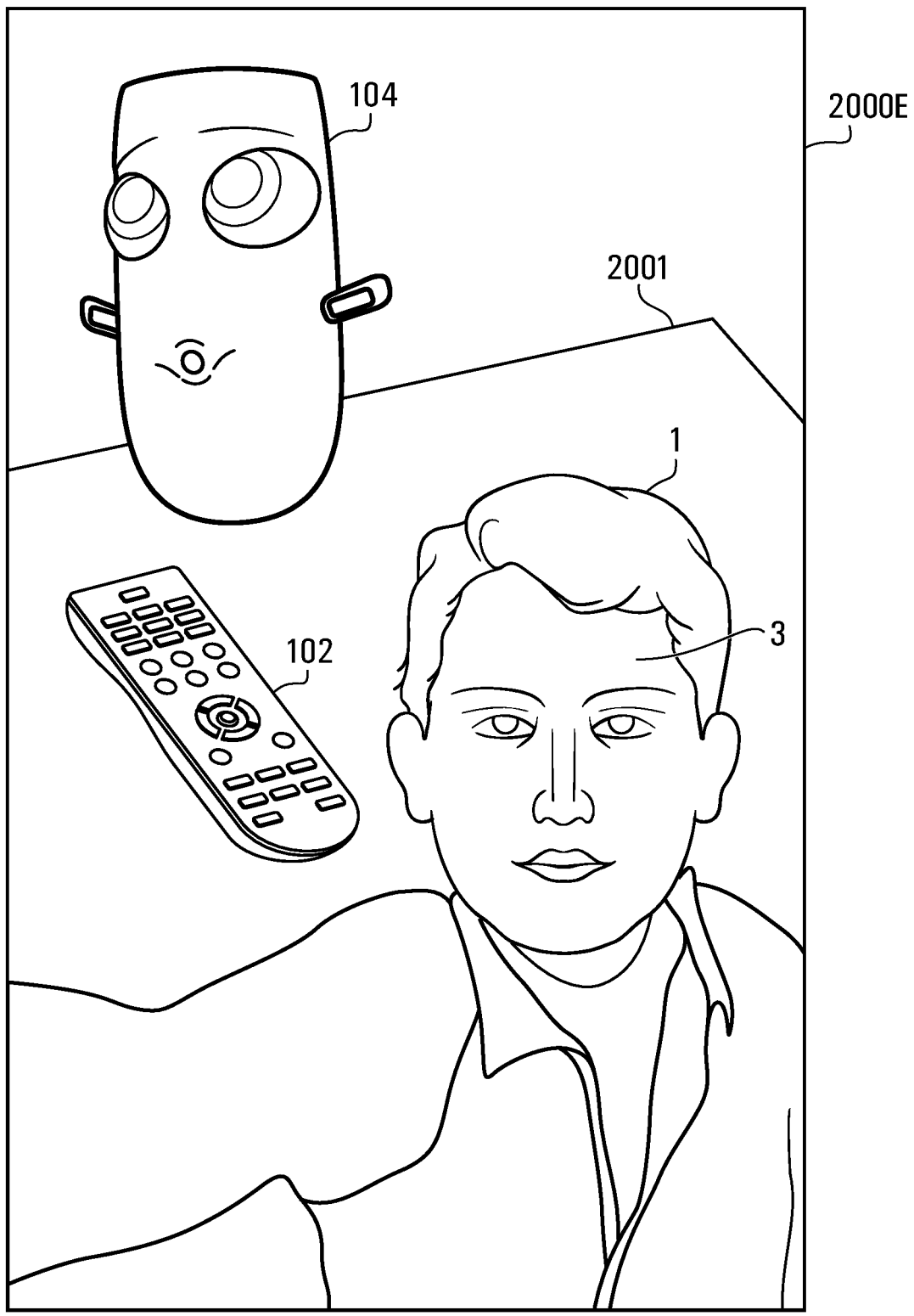
Figure 21:
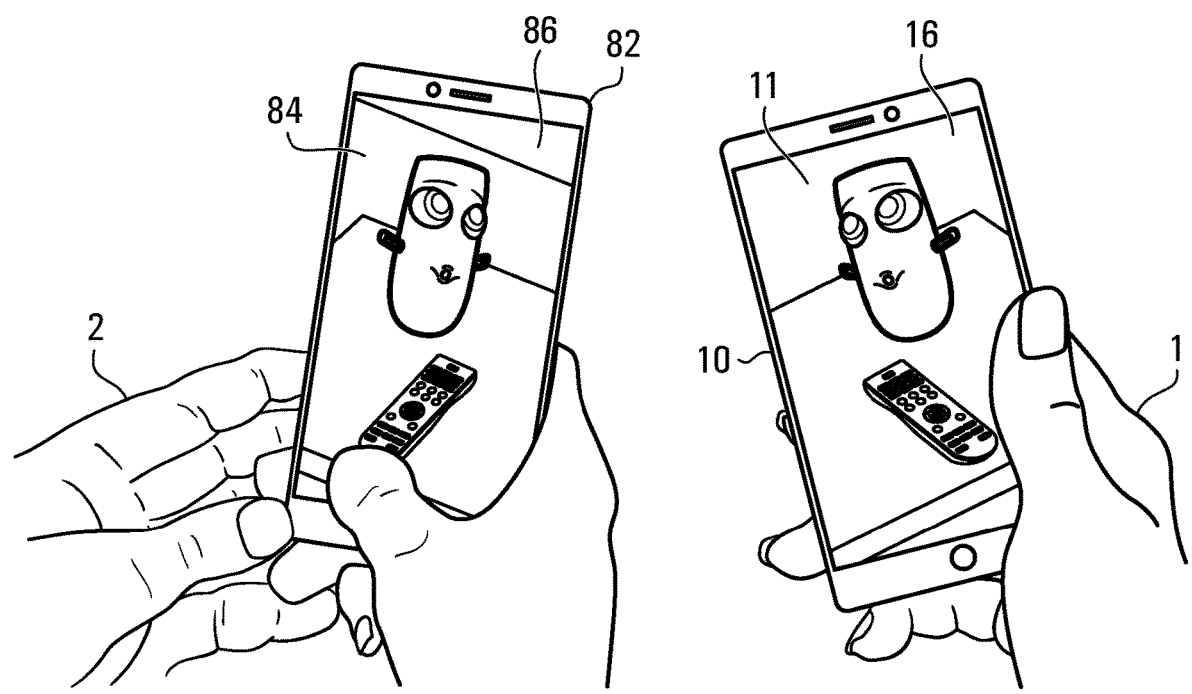
FIG. 21 depicts a shared AR experience between a first and a second player, in accordance with a non-limiting embodiment.

At step 640, the AR API 1020 of the mobile AR application 1000 is configured to provide an anchor 46 to be established generally at the position of the real-world spatula 202 to provide an anchor for an eventual virtual character 204 to be associated with the real-world remote control 102. A visual effect, namely a virtual flourish 103, corresponding to the virtual character 204 being released from/spawned by the real-world remote control 102 is shown in FIG. 20D. The virtual character 104 appears together with motion lines 105 to provide an effect which aims to indicate to the player 1 that the virtual character 104 is being "generated from" the real-world remote control 102.

At step 650, the mobile AR application 1000 creates an association between the real-world remote control 102 and the virtual character 104.

In other embodiments, once the particular real-world object is detected, the mobile AR application 1000 may provide the player 1 with an opportunity to provide input to prevent an association from being created between the particular real-world object and the virtual character. For example, the player 1 may touch a portion of the display 11/the touchscreen 16 on which the particular real-world object is displayed. In other examples, the player 1 may provide input by touching other portions of display 11/the touchscreen 16, or through any other suitable mechanism.

As such, prior to proceeding with step 640, the method 600 may include a step of detecting player input requesting to prevent creation of an association between the real-world object and a virtual character. If such an input is detected, the method does not proceed to step 640. In the absence of such an input, the method proceeds to step 640.

In some embodiments, at step 640, the mobile AR application 1000 may be configured to select a position of the anchor 46 so as to minimize an appearance of the associated virtual character concealing or obstructing other detectable real-world objects appearing in the real-world scene.

Figure 15:
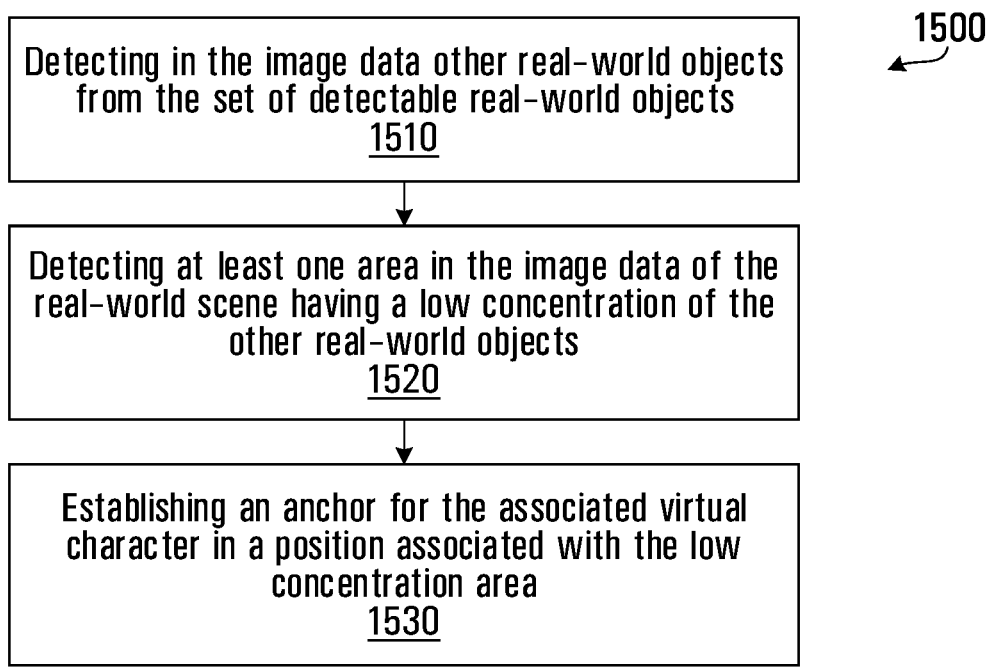
FIG. 15 is a flowchart illustrating steps of a positioning algorithm, in accordance with a non-limiting embodiment.

FIG. 15 is a flowchart illustrating steps in the algorithm 1500 that may be implemented by the at least one processor 12 of the mobile device 10 in order to position the anchor 46.

At step 1510, the mobile AR application 1000 is configured to detect, in the image data, other real-world objects from the set of detectable real-world objects 58. At step 1520, the mobile AR application 1000 is configured to detect at least one area in the image data of the real-world scene having a low concentration of the other real-world objects (a "low concentration area"). At step 1530, the mobile AR application 1000 establishes the anchor 46 for the associated virtual character in a position associated with the low concentration area.

Interactions within the AR Gaming Environment

In some embodiments, the mobile AR application 1000 may be configured to provide the player 1 with an opportunity to provide input to manipulate an associated virtual character (i.e., character manipulation input). For example, the player 1 may touch a portion of the display 11/the touchscreen 16 on which the associated virtual character is displayed. In other examples, the player 1 may provide input by touching other portions of the display 11/the touchscreen 16, or through any other suitable mechanism.

The associated virtual character may be manipulated in a variety of different ways, including repositioning the associated virtual character or modifying the associated virtual character (e.g., modifying one or more of a color, a shape, a size, a scale, a direction/orientation etc.).

In one example of implementation of this embodiment, in response to detecting the character manipulation input from the player 1, the mobile AR application 1000 may be configured to represent the associated virtual character with an effect which aims to indicate to the player 1 that the associated virtual character is responsive to the character manipulation input. In some embodiments, the effect may include, but is not limited to, changing "facial expressions" of the associated virtual character, such as grimacing, opening or closing of eyes, etc., or changing the posture of the associated virtual character.

In some embodiments, the player 1 and the associated virtual character may "interact". For example, the associated virtual character may provide the impression to the player 1 of "following" the player 1 in the real world. For example, as the player 1 moves in the real-world, the mobile AR application 1000 may be configured to maintain a given distance between the associated virtual character and the player 1. For instance, spatial coordinates $(XYZ)_1$ of the player 1 may be recorded in the memory 14. As previously indicated, the spatial coordinates $(XYZ)_{VC}$ of the associated virtual character may also be recorded in the memory 14. The distance between the player 1 and the associated virtual character may be maintained by maintaining a given distance between the spatial coordinates $(XYZ)_1$ of the player 1 and the spatial coordinates $(XYZ)_{VC}$ of the associated virtual character.

In some embodiments, a shared AR experience may be established such that two or more devices may be running the mobile AR application 1000 in the same physical space and two or more players operating these devices may experience a substantially identical virtual world from different perspectives in real-time.

For example, a first player, the player 1, may operate the mobile device 10 running the mobile AR application 1000 and a second player, player 2, may operate a mobile device 82 running the mobile AR application 1000. In this example, the player 1 and the player 2 are in the same physical space and a shared AR experience has been established. In this embodiment, although the mobile device 10 of the player 1 may have detected the particular real-world object, the associated virtual character is displayed on both mobile devices 10, 82.

In one example of implementation of this embodiment, if the player 2 provides character manipulation input via a display 84/a touchscreen 86 of the mobile device 82 to manipulate the associated virtual character, the mobile AR application 1000 may be configured to prevent implementation of such character manipulation.

In this embodiment, the associated virtual character may provide the impression to the player 2 of "running away" from the player 2 in the real world. For example, as the player 2 moves in the real-world, the mobile AR application 1000 may be configured to maintain a given distance between the associated virtual character and the player 2. For instance, spatial coordinates $(XYZ)_2$ of the player 1 may be recorded in the memory 14. The distance between the player 2 and the associated virtual character may be maintained by maintaining a given distance between the spatial coordinates $(XYZ)_2$ of the player 2 and the spatial coordinates $(XYZ)_{VC}$ of the associated virtual character. Additionally, an orientation of the associated virtual character may be such that the associated virtual character appears to be "facing away" from the player 2.

In some embodiments, the mobile AR application 1000 may be configured such that a plurality of associated virtual characters may appear together on the display 11 of the mobile device 10. In such embodiments, the mobile AR application 1000 may be configured to represent the associated virtual characters as interacting with each other. For example, the plurality of associated virtual characters may "battle" each other. This interaction may be triggered and/or controlled as a result of player input being provided, or independently of player input.

Figure 16:
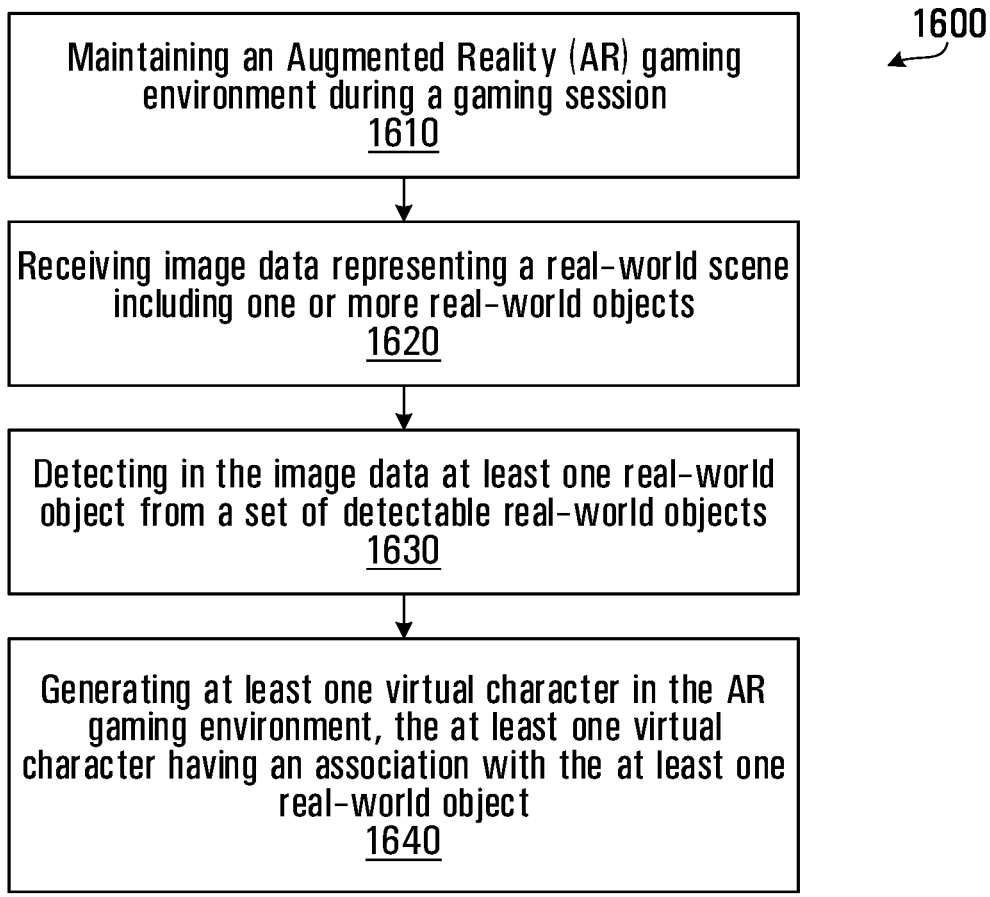
FIG. 16 is a flowchart showing steps of a method executed by the AR application, in accordance with a non-limiting embodiment.

With reference therefore to FIG. 16, it will be appreciated that there has been provided a method 1600 for execution by at least one processor. At step 1610, the method includes maintaining an Augmented Reality (AR) gaming environment during a gaming session. At step 1620, the method includes receiving image data representing a real-world scene including one or more real-world objects. At step 1630, the method includes detecting in the image data at least one real-world object from a set of detectable real-world objects. At step 1640, the method includes upon detection of the at least one real-world object in the image data, generating at least one virtual character in the AR gaming environment, the at least one virtual character having an association with the at least one real-world object.

As a result of the above-described methods, systems and applications, the mobile AR application 1000 has a concrete and tangible effect in the real world, by compelling players to physically move their mobile devices in order to locate real-world objects that will trigger the generation of virtual characters in the gaming environment. Moreover, since geolocation is not a requirement for gameplay or advancement, the game can be played under poor mobile network conditions or even offline, such as at a cottage in the woods or on an aircraft.

The description and drawings merely illustrate the principles of the invention. It will thus be appreciated that those skilled in the art will be able to devise various arrangements that, although not explicitly described or shown herein, embody the principles of the invention and are included within its scope, as defined in the appended claims.

Furthermore, all examples recited herein are principally intended to aid the reader in understanding the principles of the invention and are to be construed as being without limitation to such specifically recited examples and conditions. For example, the present disclosure describes embodiments of the invention with reference to the analysis of various desktop objects. It will however be appreciated by the skilled reader that the present invention can also advantageously be used to search other types and forms of objects in other environments.

Moreover, all statements herein reciting principles, aspects, and embodiments of the invention, as well as specific examples thereof, are intended to encompass equivalents thereof. For example, the functions of the various elements shown in the figures, including any functional blocks labelled as "module", "plugin" or "application program interface" may be provided through the use of dedicated hardware as well as hardware capable of executing software in association with appropriate software.

Furthermore, while the aforementioned description refers to mobile devices, a person of skill in the art would readily recognize that steps of various above-described methods can be performed by any number of computing devices, such as video cameras, digital cameras, infrared cameras, desktop computers, laptop computers, tablets, smartphones, smart watches or other wearables. Herein, some embodiments are also intended to cover program storage devices, e.g., digital data storage media, which are, machine or computer readable and encode machine-executable or computer-executable programs of instructions, wherein said instructions perform some or all of the steps of the above-described methods. The embodiments are also intended to cover computers programmed to perform said steps of the above-described methods.

Those skilled in the art will appreciate that when a processor is described as being "configured" to carry out an action or process, this can mean that the processor carries out the action or process by virtue of executing computer-readable instructions that are read from device memory where these computer-readable instructions are stored.

Those skilled in the art should appreciate that any feature of any embodiment disclosed herein may combined with (e.g., used instead of or in addition to) any feature of any other embodiment disclosed herein in some examples of implementation. Certain additional elements that may be needed for operation of some embodiments have not been described or illustrated as they are assumed to be within a purview of those ordinarily skilled in the art. Moreover, certain embodiments may be free of, may lack and/or may function without any element that is not specifically disclosed herein.

Although various embodiments and examples have been presented, this was for purposes of description, but should not be limiting. Various modifications and enhancements will become apparent to those ordinarily skill in the art.

The invention claimed is:

1. A method for execution by a processor of a computing system, comprising:
   maintaining an Augmented Reality (AR) gaming environment during a gaming session;
   receiving image data representing a real-world scene including one or more real-world objects;
   detecting in the image data at least one real-world object;
   after the receiving and as a result of the detecting, assigning an object identifier to the at least one real-world object, the object identifier being indicative of the at least one real-world object having been detected;
   determining whether the object identifier assigned to the at least one real-world object is a part of a set of detectable real-world objects that is categorized as a candidate object family:
   in an affirmative, associating the at least one real-world object with a detectable real-world object from the set of detectable real-world objects based on the object identifier assigned to the at least one real-world object; and
   generating at least one virtual character in the AR gaming environment, the at least one virtual character having an association with the at least one real-world object based on the associating the at least one real-world object to the detectable real-world object in the set of detectable real-world objects.

2. The method of claim 1, further comprising storing in memory the association of the at least one virtual character with the at least one real-world object.

3. The method of claim 1, further comprising simultaneously displaying the at least one virtual character and the at least one real-world object on a display screen.

4. The method of claim 1, wherein the at least one real-world object comprises a particular real-world object, wherein the at least one virtual character comprises a particular virtual character and wherein the at least one virtual character having an association with the at least one real-world object comprises the particular virtual character having visual characteristics that correspond to real-world visual characteristics of the particular real-world object.

5. The method of claim 4, further comprising displaying the visual characteristics of the particular virtual character on a display screen simultaneously with displaying the particular real-world object on the display screen.

6. The method of claim 1, wherein the at least one real-world object comprises a particular real-world object, wherein the at least one virtual character comprises a particular virtual character and wherein the at least one virtual character having an association with the at least one real-world object comprises the particular virtual character having movement characteristics that correspond to real-world movement characteristics of the particular real-world object.

7. The method of claim 6, further comprising displaying the movement characteristics of the particular virtual character on a display screen simultaneously with displaying the particular real-world object on the display screen.

8. The method of claim 1, wherein the at least one real-world object comprises a particular real-world object, wherein the at least one virtual character comprises a particular virtual character and wherein the at least one virtual character having an association with the at least one real-world object comprises the particular virtual character having audible characteristics that correspond to real-world audible characteristics of the particular real-world object.

9. The method of claim 1, wherein the at least one virtual character comprises a single virtual character.

10. The method of claim 1, wherein the at least one virtual character comprises a plurality of virtual characters, the plurality of virtual characters having an association with the at least one real-world object.

11. The method of claim 1, wherein the at least one real-world object comprises at least one first real-world object, wherein the object identifier comprises a first object identifier, wherein the at least one virtual character comprises at least one first virtual character, and wherein the method further comprises:
    detecting in the image data at least one second real-world object;
    after the receiving and as a result of the detecting, assigning a second object identifier to the at least one second real-world object, the second object identifier being indicative of the at least one second real-world object having been detected;
    associating the at least one second real-world object to a real-world object in the set of detectable real-world objects wherein the associating is carried out based on the second object identifier assigned to the at least one second real-world object; and
    generating at least one second virtual character in the AR gaming environment, the at least one second virtual character having an association with the at least one second real-world object based on the associating the at least one second real-world object to the second real-world object in the set of detectable real-world objects.

12. The method of claim 1, wherein the method further comprises storing in memory an indication of the at least one real-world object and an indication of the at least one virtual character generated in the AR gaming environment upon detection of the at least one real-world object.

13. The method of claim 1, wherein each of the real-world objects from the set of detectable real-world objects is assigned at least one object family.

14. The method of claim 13, wherein the at least one object family to which a given one of the real-world objects in the set of detectable real-world objects is assigned is based on an expected physical location for the given real-world object.

15. The method of claim 1, wherein generating the at least one virtual character in the AR gaming environment comprises:
    determining at least one object family associated with the at least one real-world object from the set of detectable real-world objects, the at least one object family being associated in memory with a set of virtual characters; and
    selecting the at least one virtual character from the set of virtual characters associated with the at least one object family.

16. The method of claim 1, wherein generating the at least one virtual character in the AR gaming environment further comprises establishing an anchor in association with a position of the at least one real-world object to anchor the at least one virtual character to the at least one real-world object.

17. The method of claim 1, wherein the at least one virtual character comprises a first virtual character and wherein the method further comprises:
    detecting the at least one real-world object in the image for a second time; and
    in response to detecting the at least one real-world object for the second time, retaining the association between the at least one virtual character having and the at least one real-world object without generating a new virtual character having an association with the at least one real-world object.

18. The method of claim 1, wherein the at least one virtual character comprises a first virtual character and wherein the method further comprises:
    detecting the at least one real-world object in the image for a second time; and
    in response to detecting the at least one real-world object for the second time, retaining the association between the at least one virtual character and the at least one real-world object and generating an additional virtual character having an association with the at least one real-world object.

19. The method of claim 1, wherein the at least one real-world object comprises a first real-world object, wherein the object identifier comprises a first object identifier, wherein the at least one virtual character comprises a first virtual character and wherein the method further comprises:
    detecting in the image data at least one second real-world object;
    after the receiving and as a result of the detecting, assigning a second object identifier to the at least one second real-world object, the second object identifier being indicative of the at least one second real-world object having been detected, the second object identifier being the same as the first object identifier; and
    without an additional virtual character being generated in the AR gaming environment, associating the at least one second real-world object to a real-world object in the set of detectable real-world objects wherein the associating is carried out based on the second object identifier assigned to the at least one second real-world object.

20. The method of claim 1, wherein the method further comprises:
maintaining a first record of real-world objects that are detected during the gaming session; and
providing a player with a representation of the contents of the first record.

21. The method of claim 20, wherein the method further comprises:
maintaining a second record of the real-world objects in the set of detectable real-world objects that have yet to be detected during the gaming session; and
providing the player with a representation of the contents of the second record.

22. The method of claim 1, wherein the method further comprises:
maintaining a first record of the virtual characters that are generated during the gaming session; and
providing a player with a representation of the contents of the first record.

23. The method of claim 22, wherein the method further comprises:
maintaining a second record of the virtual characters associated with the real-world objects in the set of detectable real-world objects that have yet to be detected during the gaming session; and
providing the player with a representation of the contents of the second record.

24. A gaming device comprising at least one processor and a memory storing instructions for execution by the processor, at least one input device configured to receive input from a user, at least one output device configured for providing output to the user, the at least one processor configured to execute the instructions in the memory for implementing an interactive computer program that generates the output in response to the received input and, the interactive computer program including at least one process that comprises:
maintaining an Augmented Reality (AR) gaming environment during a gaming session;
receiving image data representing a real-world scene including one or more real-world objects;
detecting in the image data at least one real-world object;
after the receiving and as a result of the detecting, assigning an object identifier to the at least one real-world object, the object identifier being indicative of the at least one real-world object having been detected;
determining whether the object identifier assigned to the at least one real-world object is a part of a set of detectable real-world objects that is categorized as a candidate object family;
in an affirmative, associating the at least one real-world object with a detectable real-world object from the set of detectable real-world objects based on the object identifier assigned to the at least one real-world object; and
generating at least one virtual character in the AR gaming environment, the at least one virtual character having an association with the at least one real-world object based on the associating the at least one real-world object to the detectable real-world object in the set of detectable real-world objects.

25. A non-transitory computer-readable storage medium comprising computer-readable instructions which, when read and executed by at least one processor of a gaming device, cause a gaming device to carry out a method in an interactive computer program that comprises:
maintaining an Augmented Reality (AR) gaming environment during a gaming session;
receiving image data representing a real-world scene including one or more real-world objects;
detecting in the image data at least one real-world object;
after the receiving and as a result of the detecting, assigning an object identifier to the at least one real-world object, the object identifier being indicative of the at least one real-world object having been detected;
determining whether the object identifier assigned to the at least one real-world object is a part of a set of detectable real-world objects that is categorized as a candidate object family;
in an affirmative, associating the at least one real-world object with a detectable real-world object from the set of detectable real-world objects based on the object identifier assigned to the at least one real-world object; and
generating at least one virtual character in the AR gaming environment, the at least one virtual character having an association with the at least one real-world object based on the associating the at least one real-world object to the detectable real-world object in the set of detectable real-world objects.

26. The method of claim 1, wherein each of the one or more real-world objects possess a 3-dimensional (3D) shape and color, and the at least one virtual character resembles the at least one real-world object having characteristics corresponding to the 3D shape and color of the at least one real-world object.

* * * * *